United States Patent
Harris et al.

(10) Patent No.: US 10,998,590 B2
(45) Date of Patent: May 4, 2021

(54) SYSTEMS AND METHODS FOR BATTERY THERMAL MANAGEMENT UTILIZING A VAPOR CHAMBER

(71) Applicant: Romeo Systems, Inc., Vernon, CA (US)

(72) Inventors: W. Porter Harris, Santa Monica, CA (US); Qian Wang, Los Angeles, CA (US); Berton Vite, Huntington Beach, CA (US); W. Hunter Greene, Los Angeles, CA (US)

(73) Assignee: ROMEO SYSTEMS, INC., Vernon, CA (US)

( * ) Notice: Subject to any disclaimer, the term of this patent is extended or adjusted under 35 U.S.C. 154(b) by 495 days.

(21) Appl. No.: 15/815,975

(22) Filed: Nov. 17, 2017

(65) Prior Publication Data

US 2018/0145382 A1  May 24, 2018

Related U.S. Application Data

(60) Provisional application No. 62/424,054, filed on Nov. 18, 2016.

(51) Int. Cl.
  *H01M 10/6557*  (2014.01)
  *H01M 10/613*   (2014.01)
  (Continued)

(52) U.S. Cl.
  CPC ..... *H01M 10/6557* (2015.04); *H01M 10/613* (2015.04); *H01M 10/625* (2015.04);
  (Continued)

(58) Field of Classification Search
  CPC .. H01M 10/613; H01M 10/643; H01M 10/65; H01M 10/655; H01M 10/6552;
  (Continued)

(56) References Cited

U.S. PATENT DOCUMENTS 8,852,772 B2  10/2014  McDonald
9,510,623 B2  12/2016  Tucker et al.
(Continued)

FOREIGN PATENT DOCUMENTS

CN  105990620  10/2016
DE    4102532   6/1992
(Continued)

OTHER PUBLICATIONS

PCT; International Search Report and the Written Opinion dated May 9, 2018 in the International Application No. PCT/US2017/062253.
(Continued)

*Primary Examiner* — Stephan J Essex
(74) *Attorney, Agent, or Firm* — Snell & Wilmer L.L.P.

(57) ABSTRACT

Thermal management systems for batteries utilize vapor chambers having wicking components therein. An exemplary thermal management system includes a vapor chamber containing a working fluid and wicking components. A plurality of battery cells are disposed at least partially in the vapor chamber. A cold plate is coupled to the vapor chamber, and a heat pump is coupled to the cold plate. A capillary tube may be utilized to facilitate movement of vapor and working fluid in the thermal management system. Via use of exemplary systems, improved thermal management for batteries is provided.

17 Claims, 34 Drawing Sheets

(51) Int. Cl.
  *H01M 10/625*    (2014.01)
  *H01M 10/643*    (2014.01)
  *H01M 10/6567*   (2014.01)
  *H01M 10/6569*   (2014.01)

(52) U.S. Cl.
  CPC ..... *H01M 10/643* (2015.04); *H01M 10/6567* (2015.04); *H01M 10/6569* (2015.04); *H01M 2220/20* (2013.01)

(58) Field of Classification Search
  CPC ......... H01M 10/6556; H01M 10/6557; H01M 10/6567–6569
  See application file for complete search history.

(56) References Cited

U.S. PATENT DOCUMENTS

| | | | |
|---|---|---|---|
| 9,865,907 B2 | 1/2018 | Xiang | |
| 2003/0017383 A1* | 1/2003 | Ura | H01M 2/105 429/120 |
| 2007/0218353 A1* | 9/2007 | Straubel | H01M 10/6569 429/120 |
| 2012/0164492 A1 | 6/2012 | Lachenmeier | |
| 2013/0130074 A1 | 5/2013 | Timmons | |
| 2014/0335381 A1 | 11/2014 | Krolak | |
| 2015/0280295 A1 | 10/2015 | Bhunia et al. | |
| 2016/0073506 A1 | 3/2016 | Coakley et al. | |
| 2016/0104925 A1 | 4/2016 | Xiang | |
| 2017/0352935 A1 | 12/2017 | Perdu | |
| 2018/0083330 A1 | 3/2018 | Xiang | |
| 2019/0037928 A1 | 2/2019 | Thomas | |

FOREIGN PATENT DOCUMENTS

| | | |
|---|---|---|
| EP | 355345 | 10/2019 |
| FR | 3030121 A1 | 6/2016 |
| JP | 200260474 | 9/2009 |

OTHER PUBLICATIONS

PCT; International Search Report and Written Opinion in the International Application No. PCT/US2017/067395 dated May 24, 2018.

International Preliminary Report on Patentability in the International Application No. PCT/US2017/062253 dated May 21, 2019.

USPTO; Non-Final Office Action in the U.S. Appl. No. 15/847,505 dated Oct. 15, 2019.

USPTO; Final Office Action in the U.S. Appl. No. 15/847,505 dated Mar. 10, 2020.

USPTO; Notice of Allowance in the U.S. Appl. No. 15/847,505 dated Jun. 22, 2020.

EP; Extended European Search Report in the EP Application No. 17871285.7 dated May 19, 2020.

Restriction Requirement in the U.S. Appl. No. 15/847,505 dated Jul. 12, 2019.

EP; Extended European Search Report in the EP Application No. 17886018.5 dated Aug. 14, 2020.

\* cited by examiner

Direction of gravitational force and/or accelerative force with respect to system 100

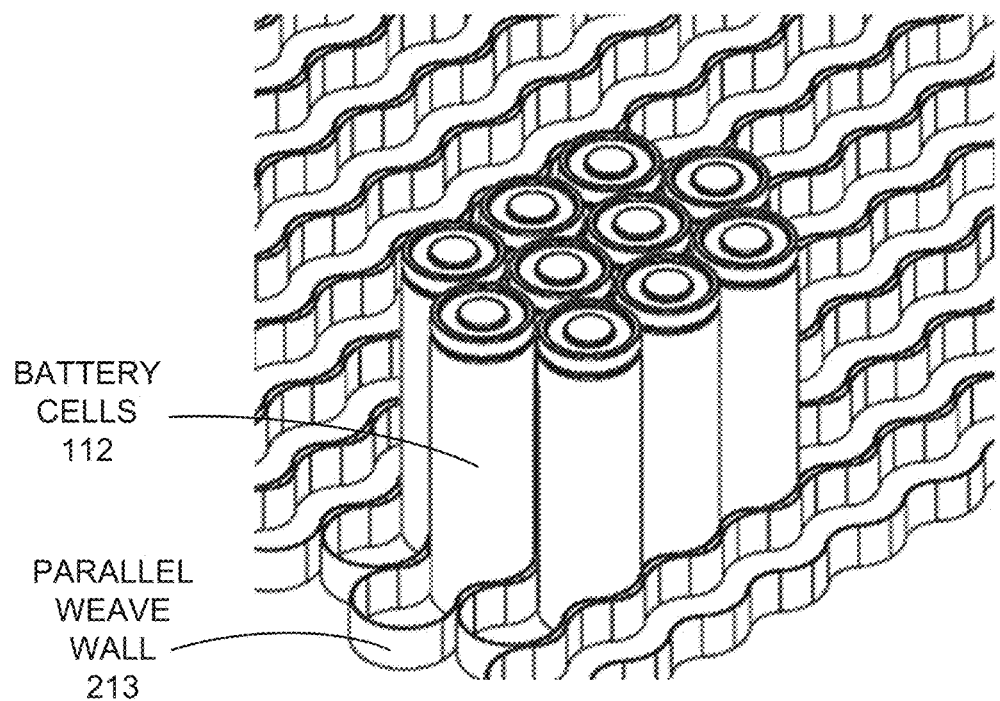
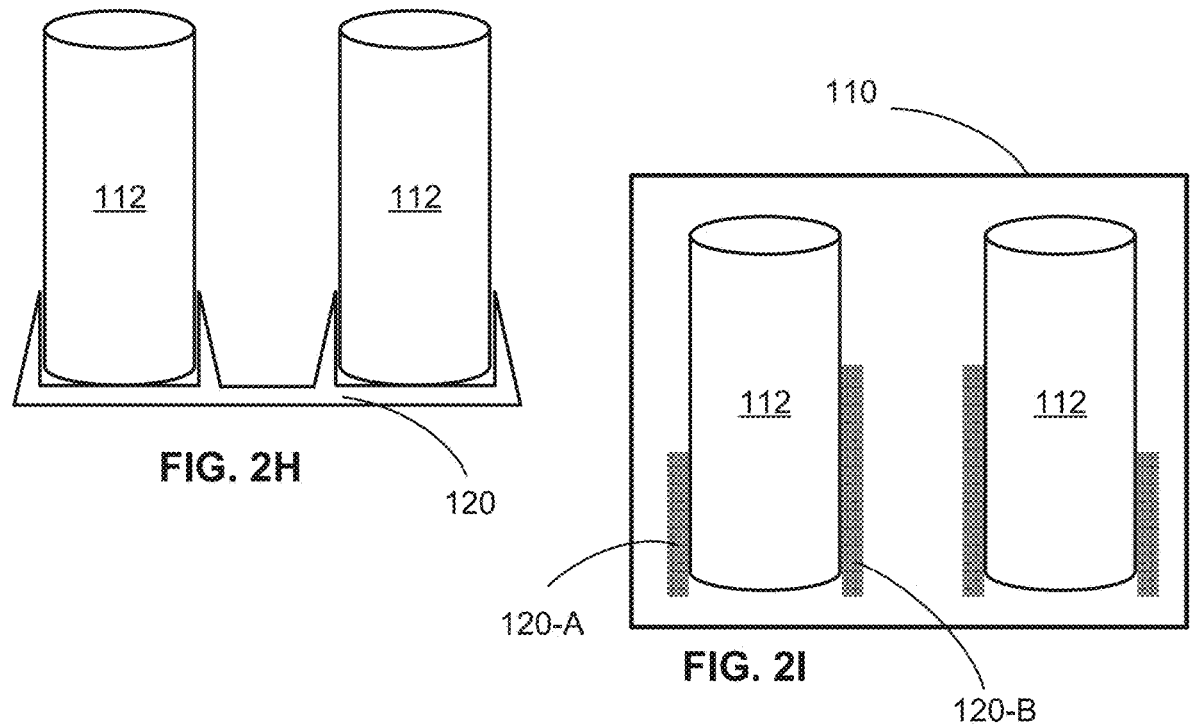

SYSTEMS AND METHODS FOR BATTERY THERMAL MANAGEMENT UTILIZING A VAPOR CHAMBER

CROSS-REFERENCE TO RELATED APPLICATIONS

This application claims priority to, and the benefit of, U.S. Provisional Application Ser. No. 62/424,054 filed on Nov. 18, 2016, entitled "SYSTEMS AND METHODS FOR BATTERY THERMAL MANAGEMENT UTILIZING A VAPOR CHAMBER". The entire contents of the foregoing application are hereby incorporated by reference for all purposes.

TECHNICAL FIELD

The present disclosure relates to thermal management, and in particular thermal management of battery packs.

BACKGROUND

Prior approaches to thermal management of battery packs and cells, particularly in vehicle applications, have attempted to provide rapid and well-controlled heating and/or cooling of battery packs as desired. However, these prior approaches have been limited in their ability to maintain battery cells within a desirable temperature range during operation, to control maximum and minimum cell temperatures, to achieve an operational setpoint temperature, or to ensure a limited range of thermal variability between cells in a battery pack. Accordingly, improved systems and methods for thermal management of battery packs and other electrical devices remain desirable.

SUMMARY

In an exemplary embodiment, a thermal management system comprises a vapor chamber comprising a housing, a wicking material, and a working fluid; and a battery pack comprising a plurality of battery cells. Each of the plurality of battery cells is disposed at least partially within the vapor chamber. Each battery cell contacts a portion of the wicking material, and the working fluid changes phase within the vapor chamber in order to carry heat away from the battery cells.

In another exemplary embodiment, a method for thermal regulation of a battery pack comprises disposing a plurality of battery cells at least partially within a vapor chamber, the plurality of battery cells forming a battery pack, and the vapor chamber comprising a housing, a wicking material, and a working fluid; and contacting each of the plurality of battery cells with at least a portion of the wicking material. During charging or discharging of the battery pack, the working fluid changes phase within the vapor chamber in order to carry heat away from the battery cells.

In another exemplary embodiment, a thermal management system for an individual battery cell comprises a coldwell comprising a housing, a wicking material, and a working fluid; and a battery cell disposed at least partially within the coldwell such that the bottom of the battery cell contacts the wicking material. The interface between the battery cell and the housing is sealed to retain the working fluid within the housing. The working fluid changes phase within the coldwell in order to carry heat away from the battery cell.

In another exemplary embodiment, a thermal management system for a battery pack comprises a vapor chamber comprising a housing, a wicking material, and a working fluid; a cold plate coupling the vapor chamber to a heat pump; the battery pack comprising a plurality of battery cells, each of the plurality of battery cells disposed at least partially within the vapor chamber; a condensation chamber coupled to the cold plate; and a capillary tube linking the vapor chamber and the condensation chamber. Each battery cell contacts a portion of the wicking material, and the working fluid changes phase within the vapor chamber in order to carry heat away from the battery cells.

The contents of this summary section are to be understood as a simplified introduction to the disclosure, and are not intended to be used to limit the scope of any claim.

BRIEF DESCRIPTION OF THE DRAWINGS

With reference to the following description, appended claims, and accompanying drawings:

Figure 2A:
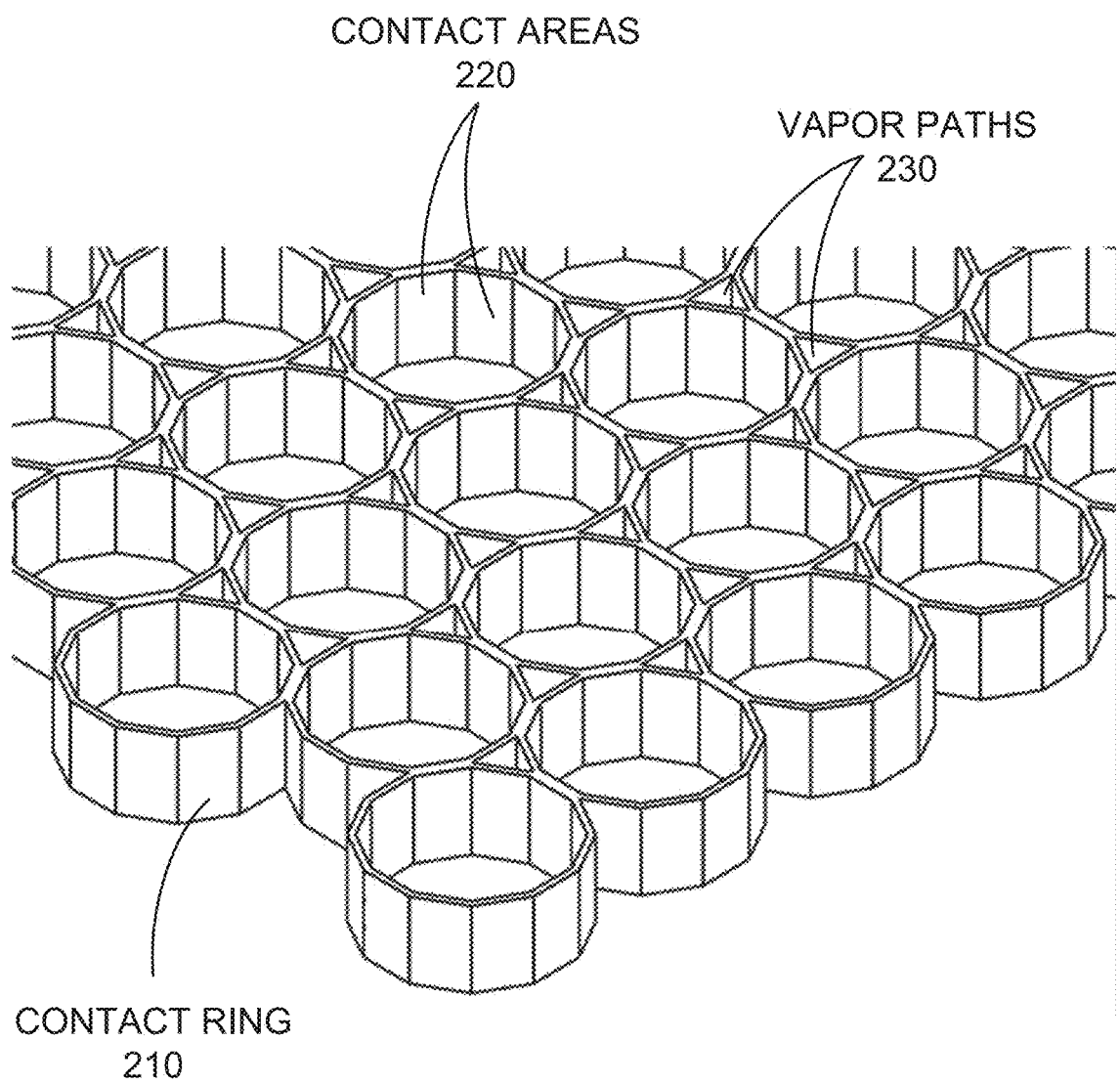
Figure 2B:
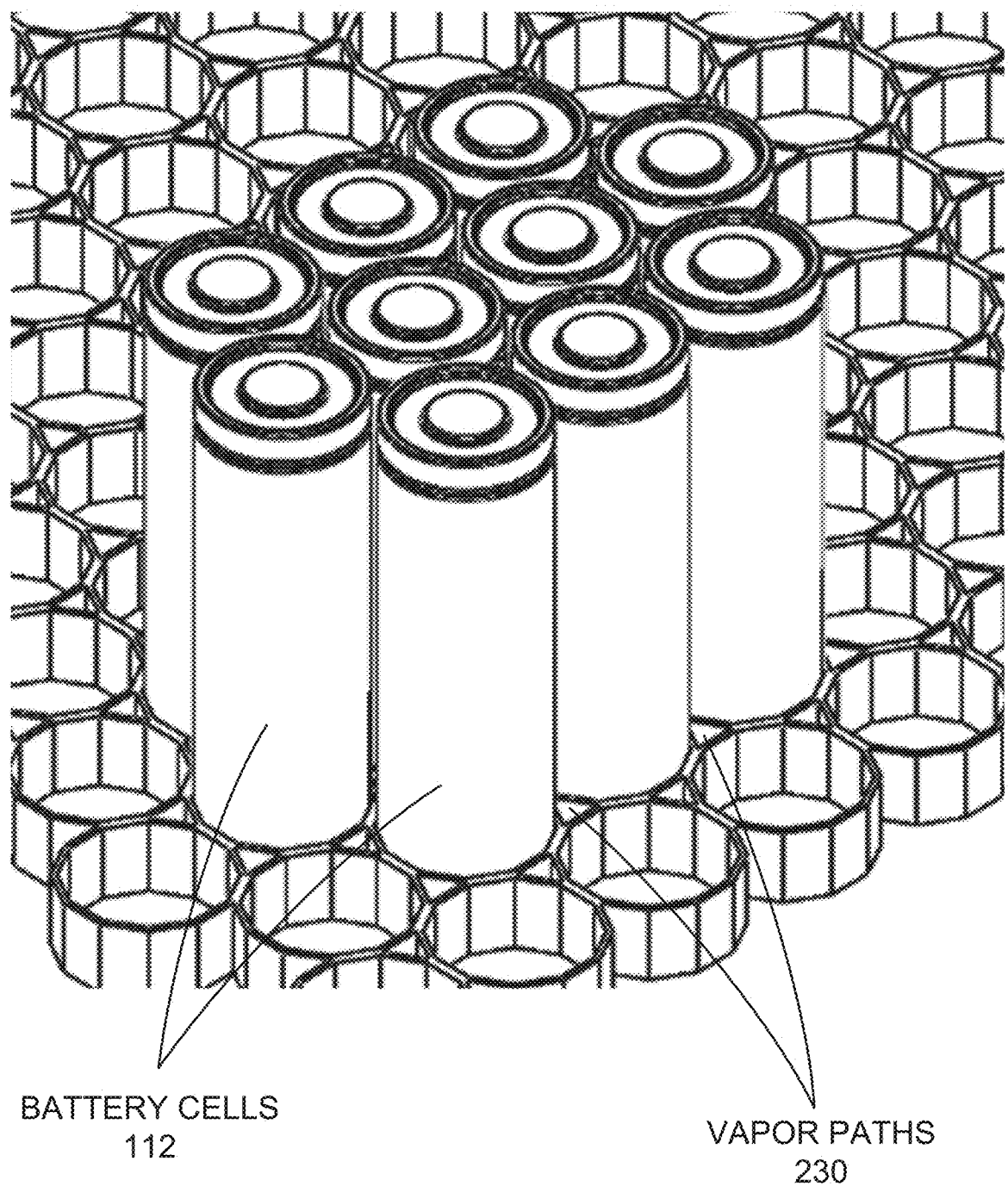
Figure 2C:
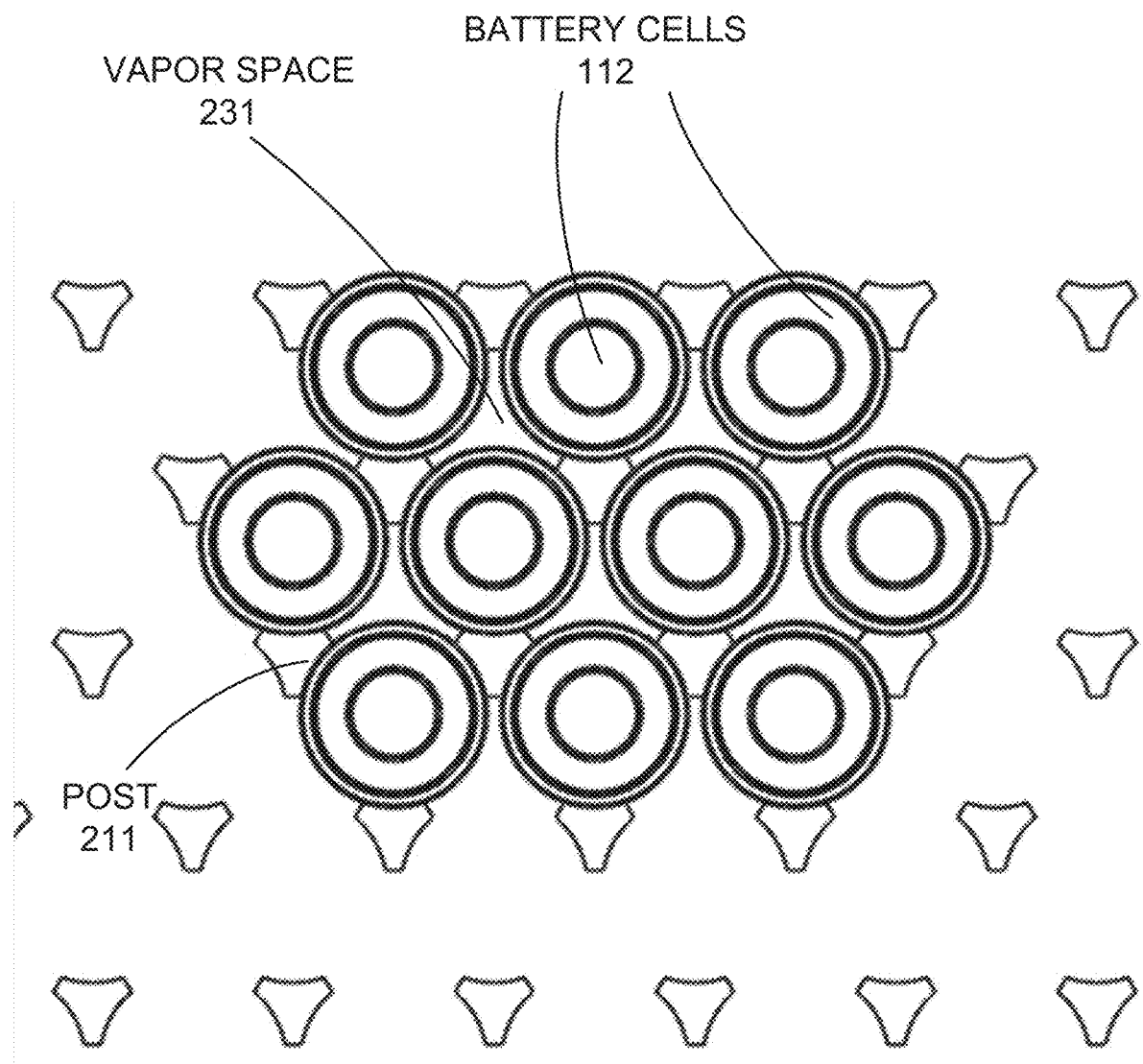
Figure 2D:
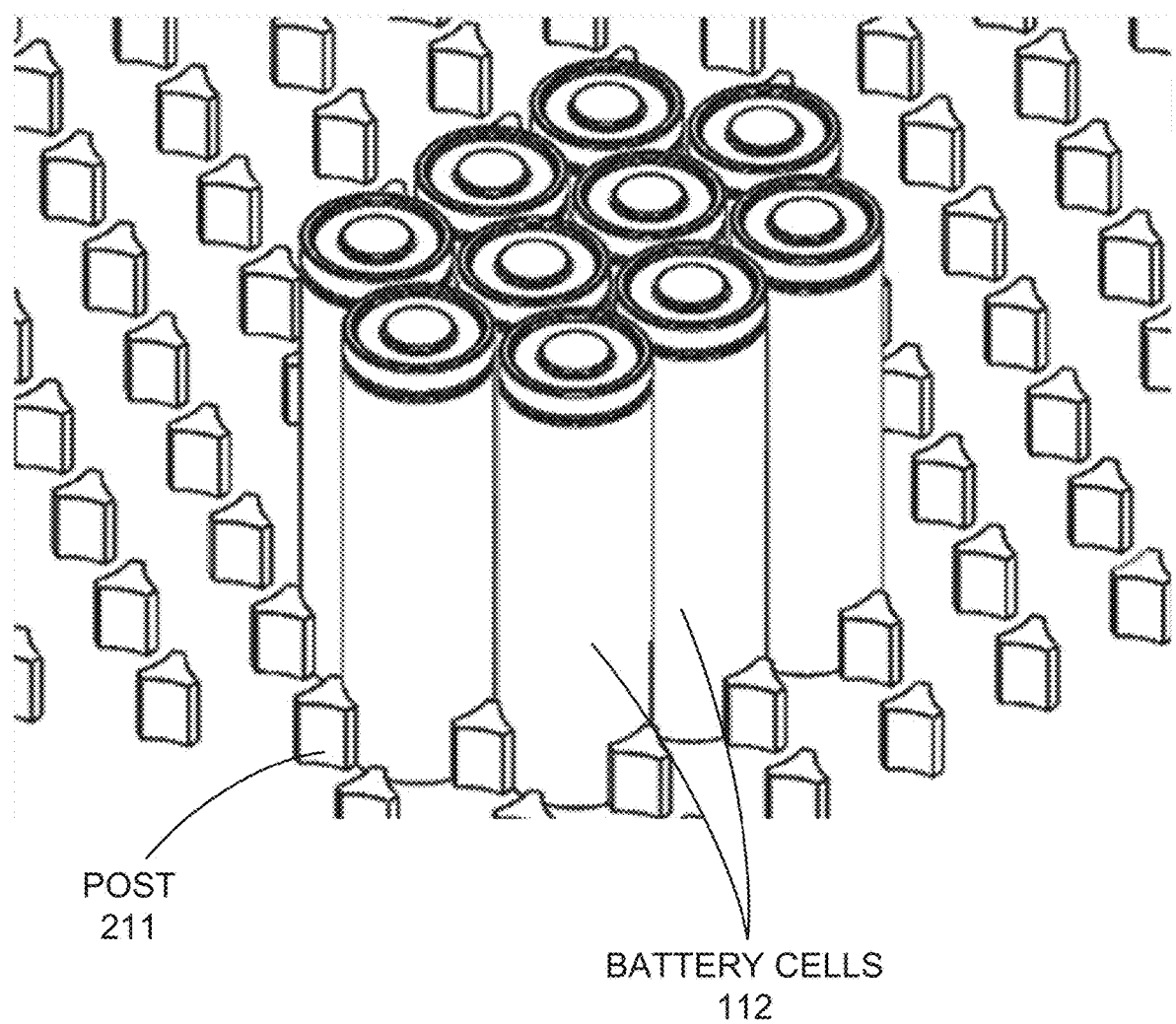
Figure 2E:
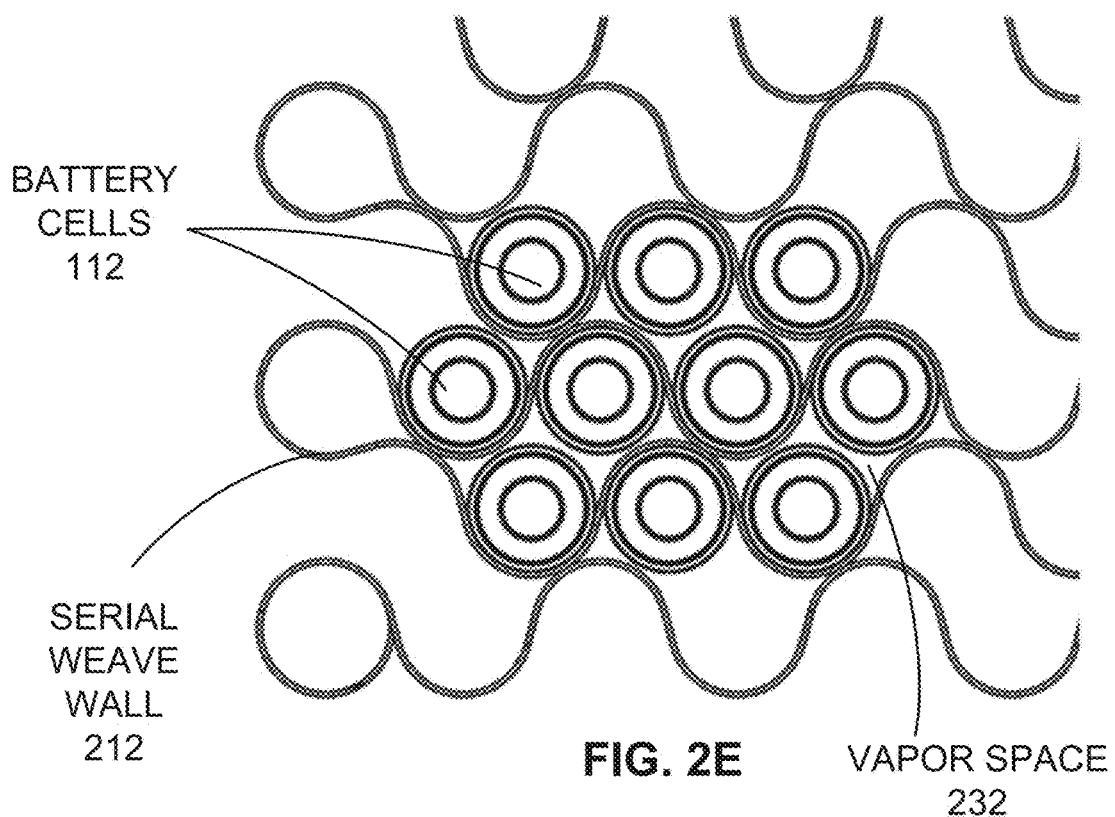
Figure 2F:
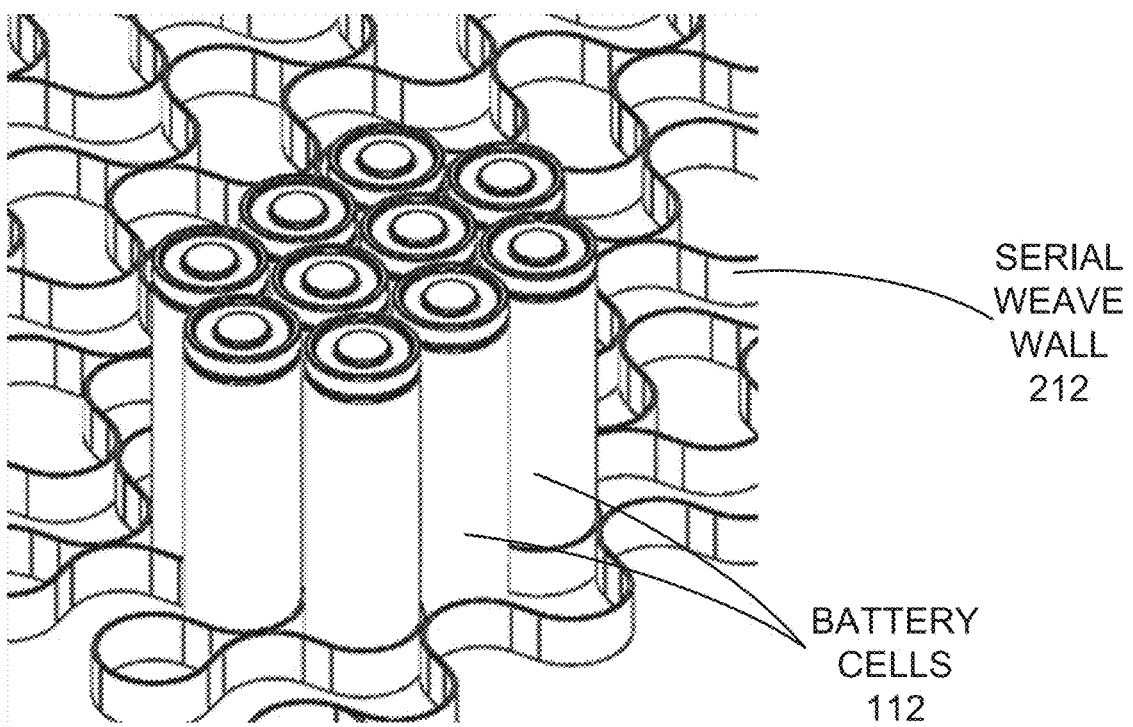
Figure 2J:
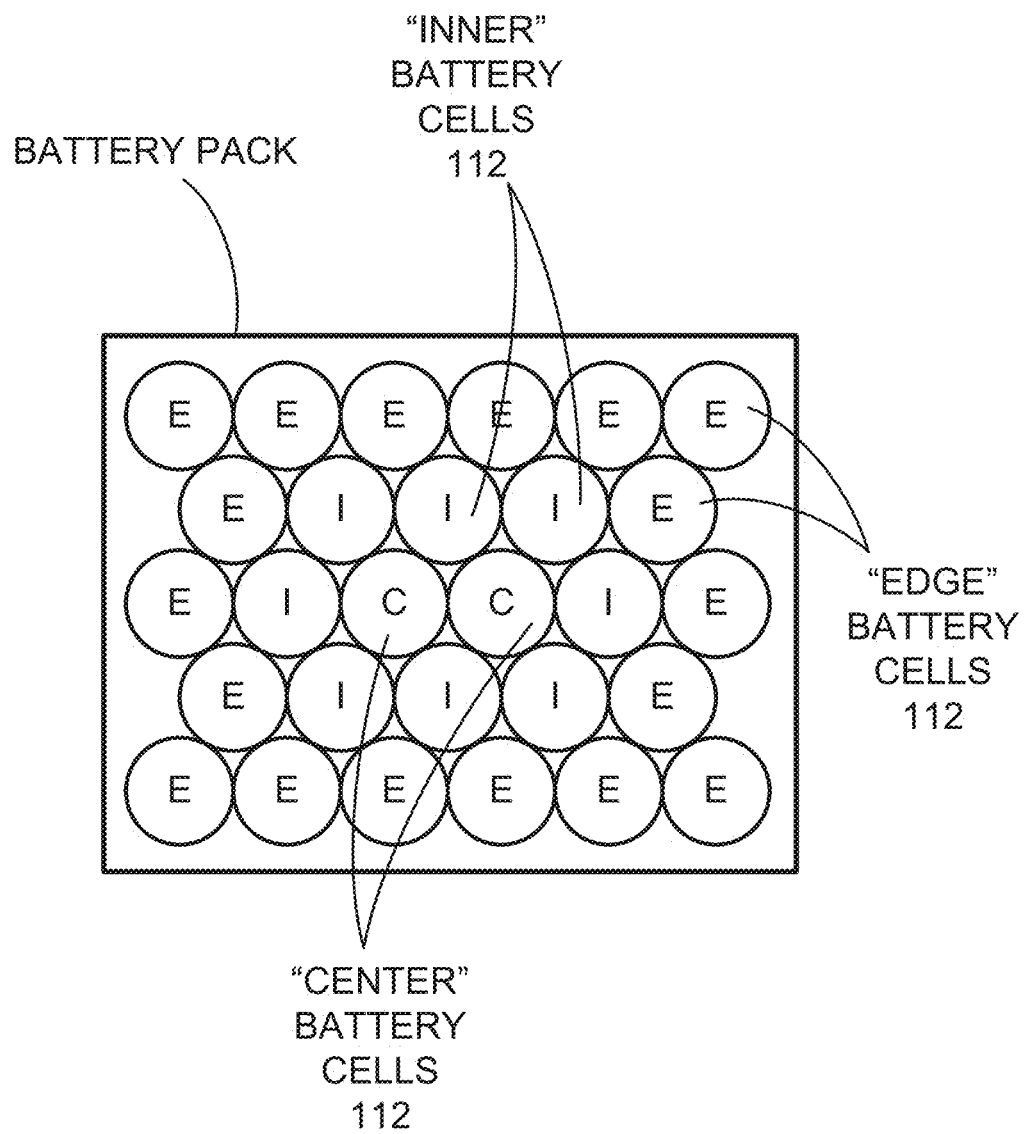
Figure 3A:
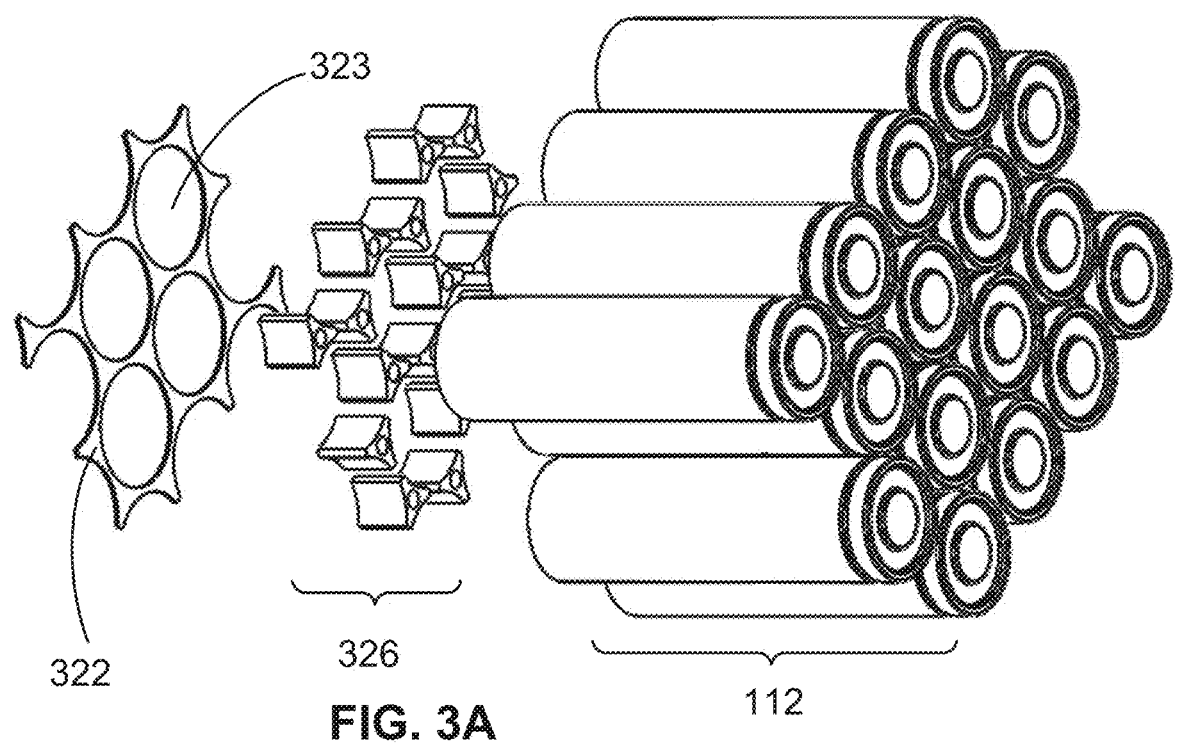
Figure 3B:
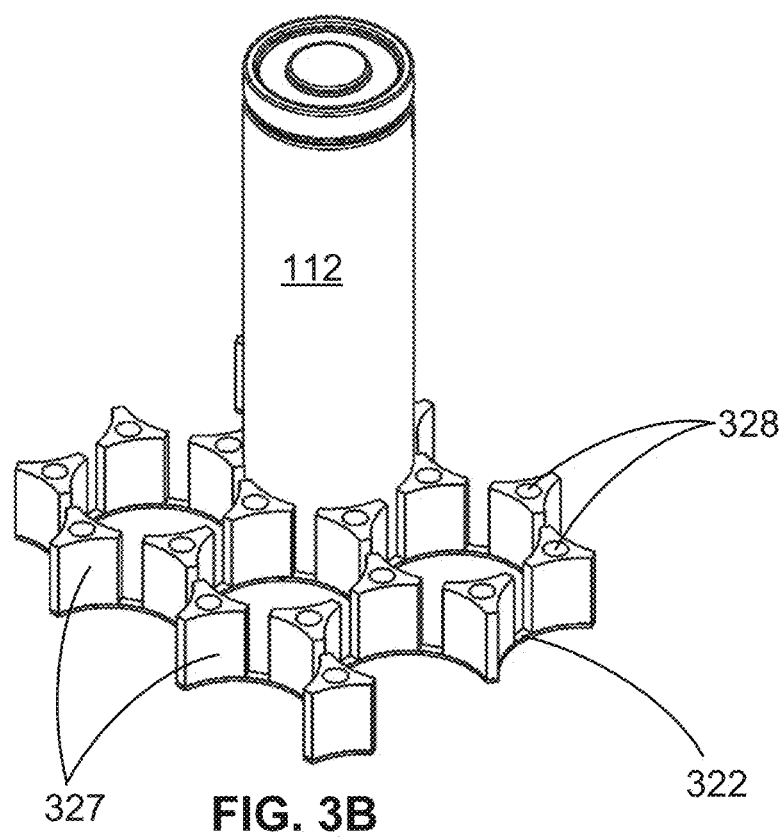
Figure 3C:
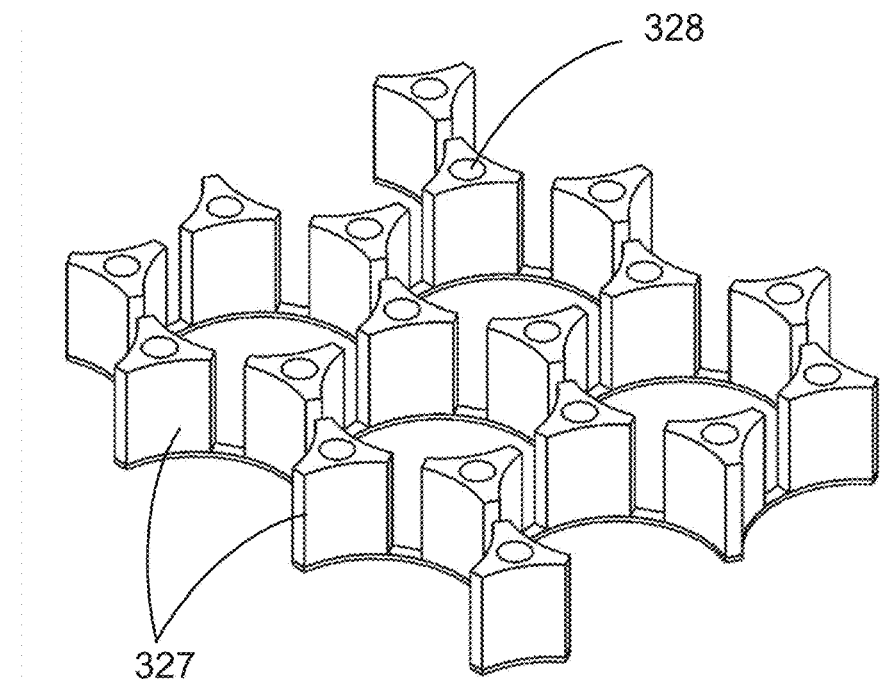
Figure 3D:
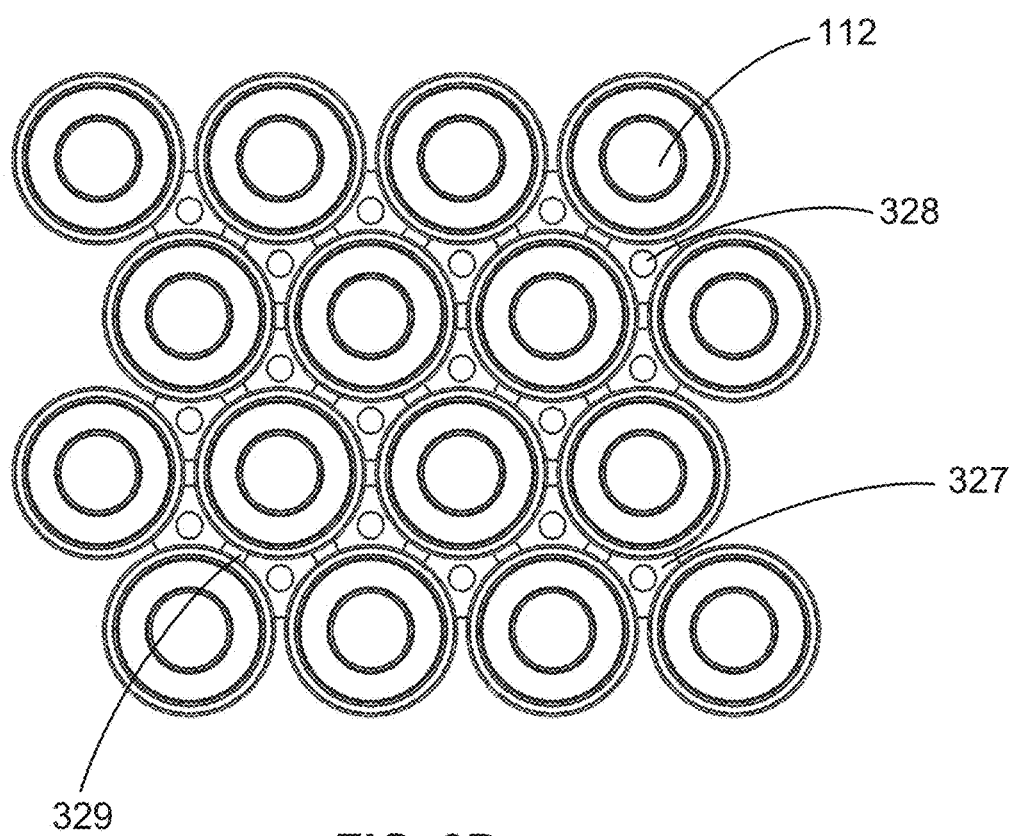
Figure 4A:
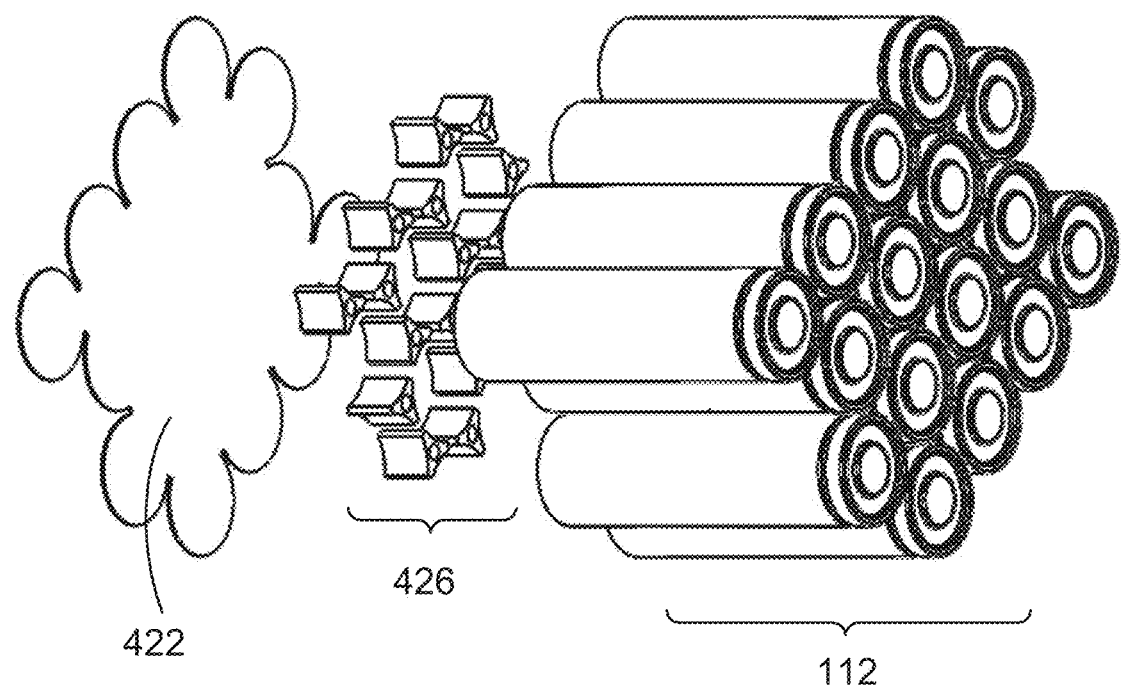
Figure 4B:
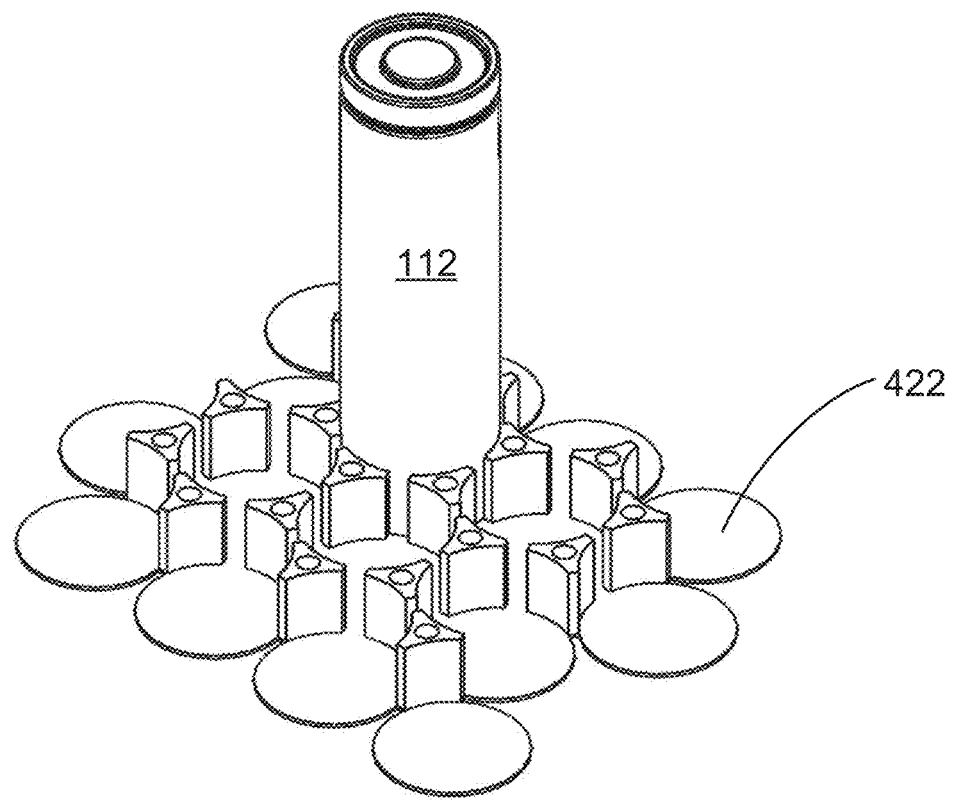
Figure 4C:
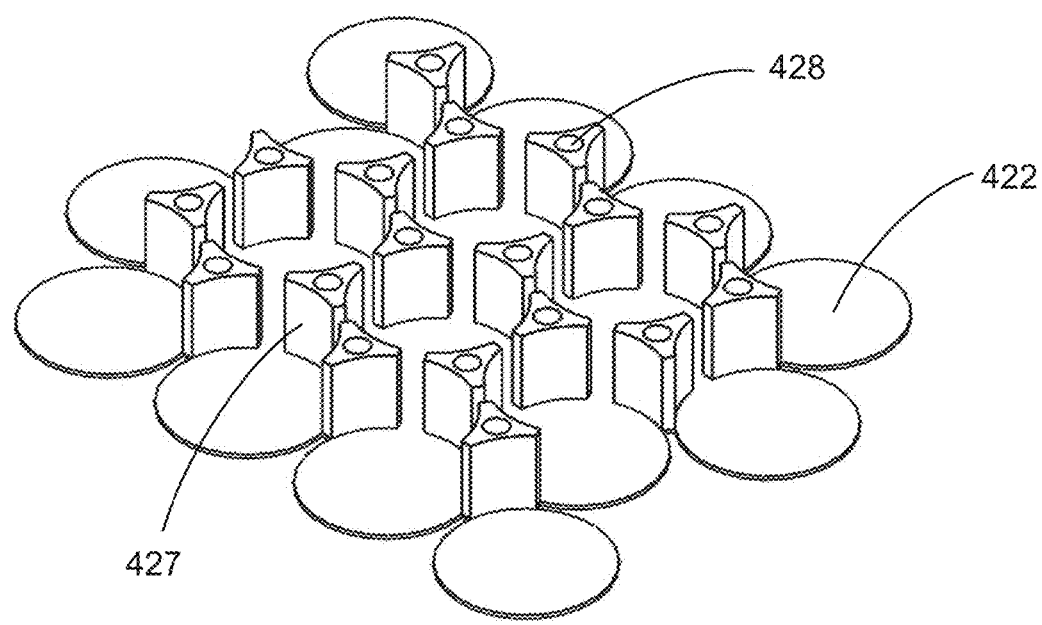
Figure 4D:
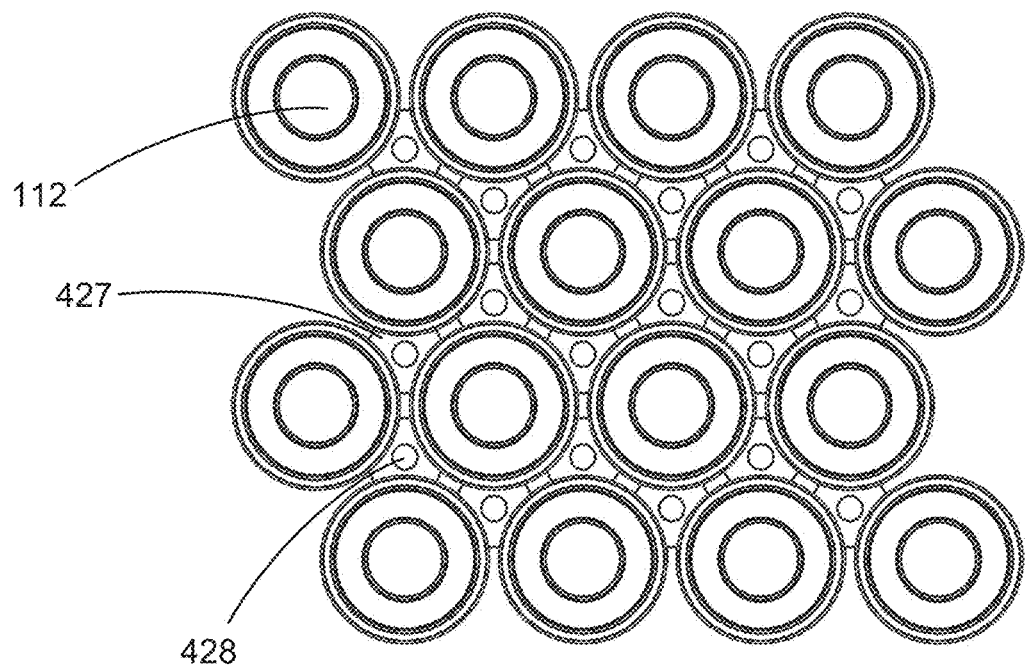
Figure 5A:
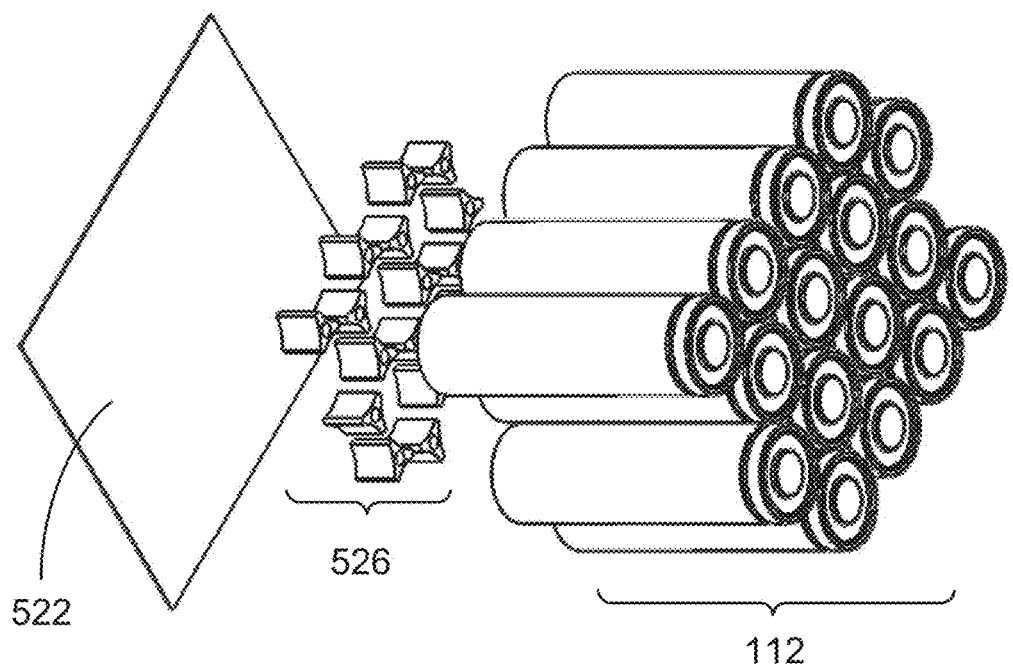
Figure 5B:
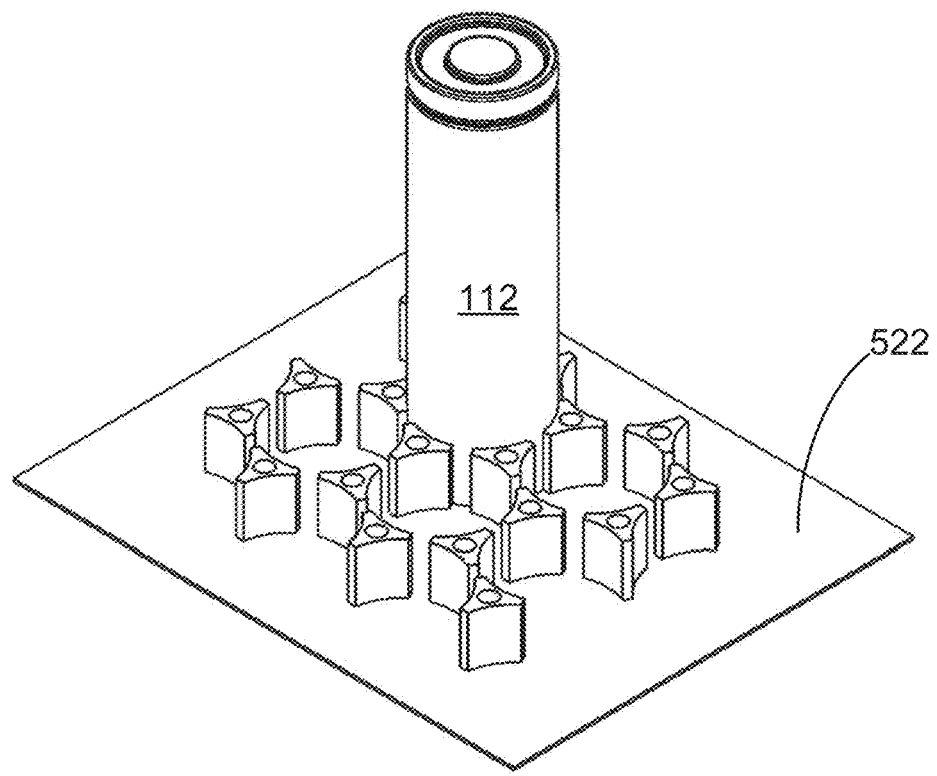
Figure 5C:
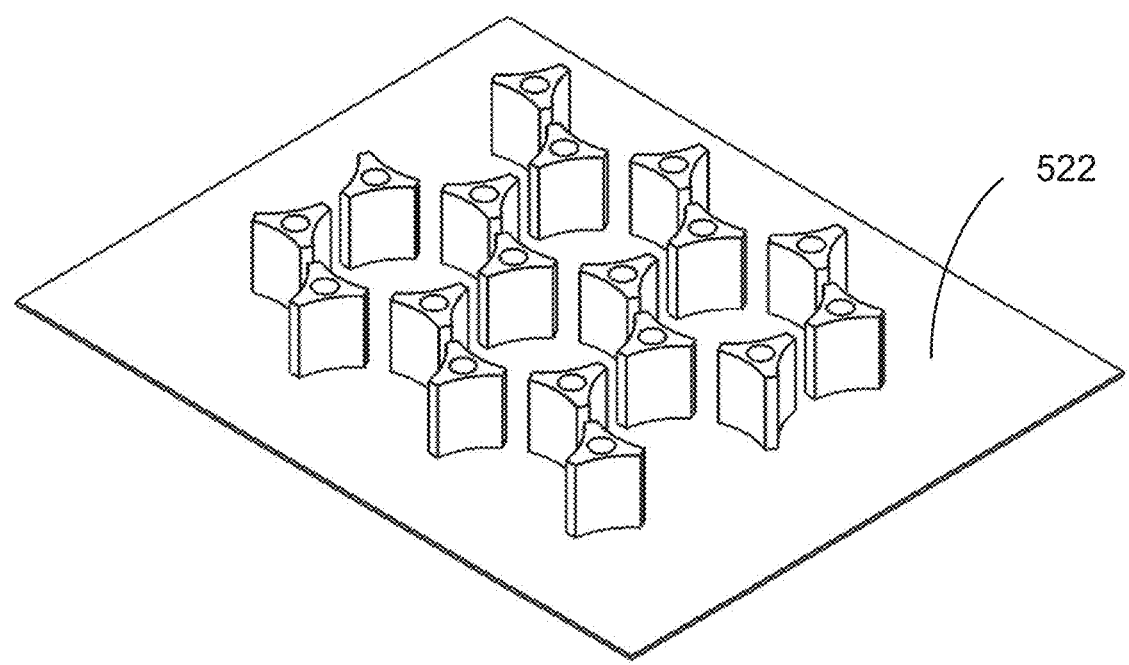
Figure 5D:
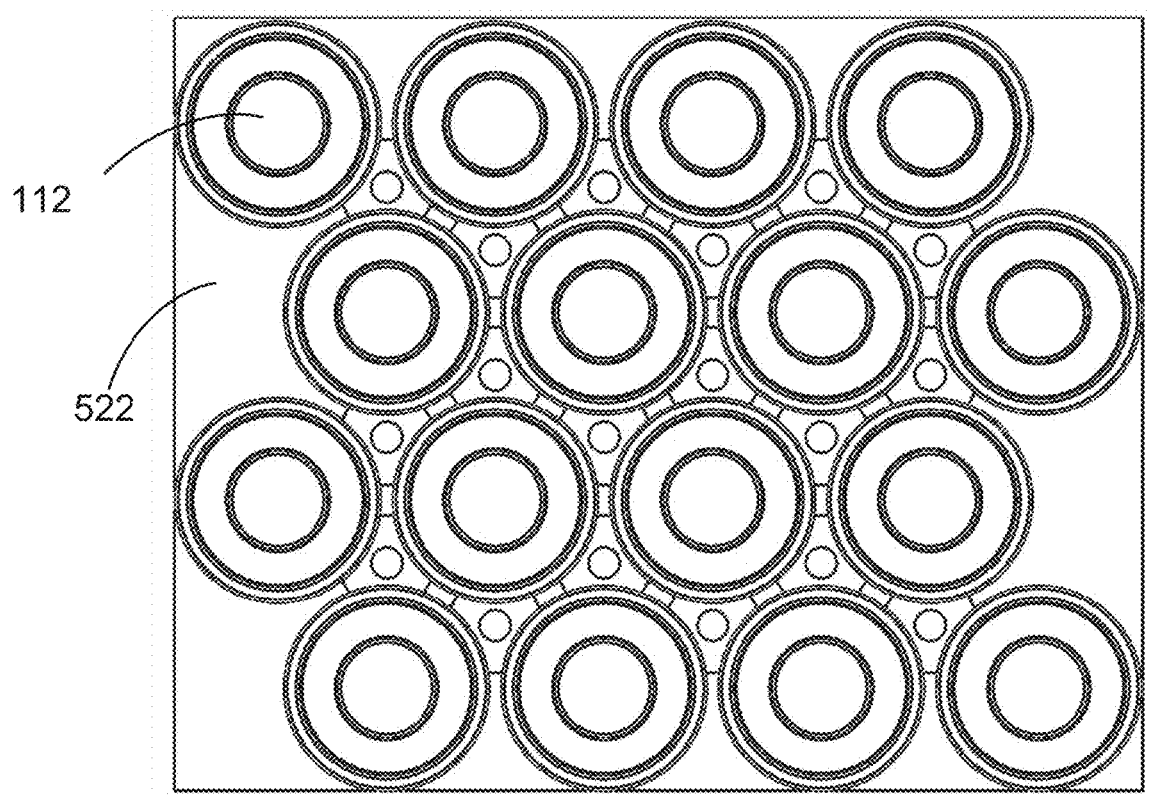
Figure 6:
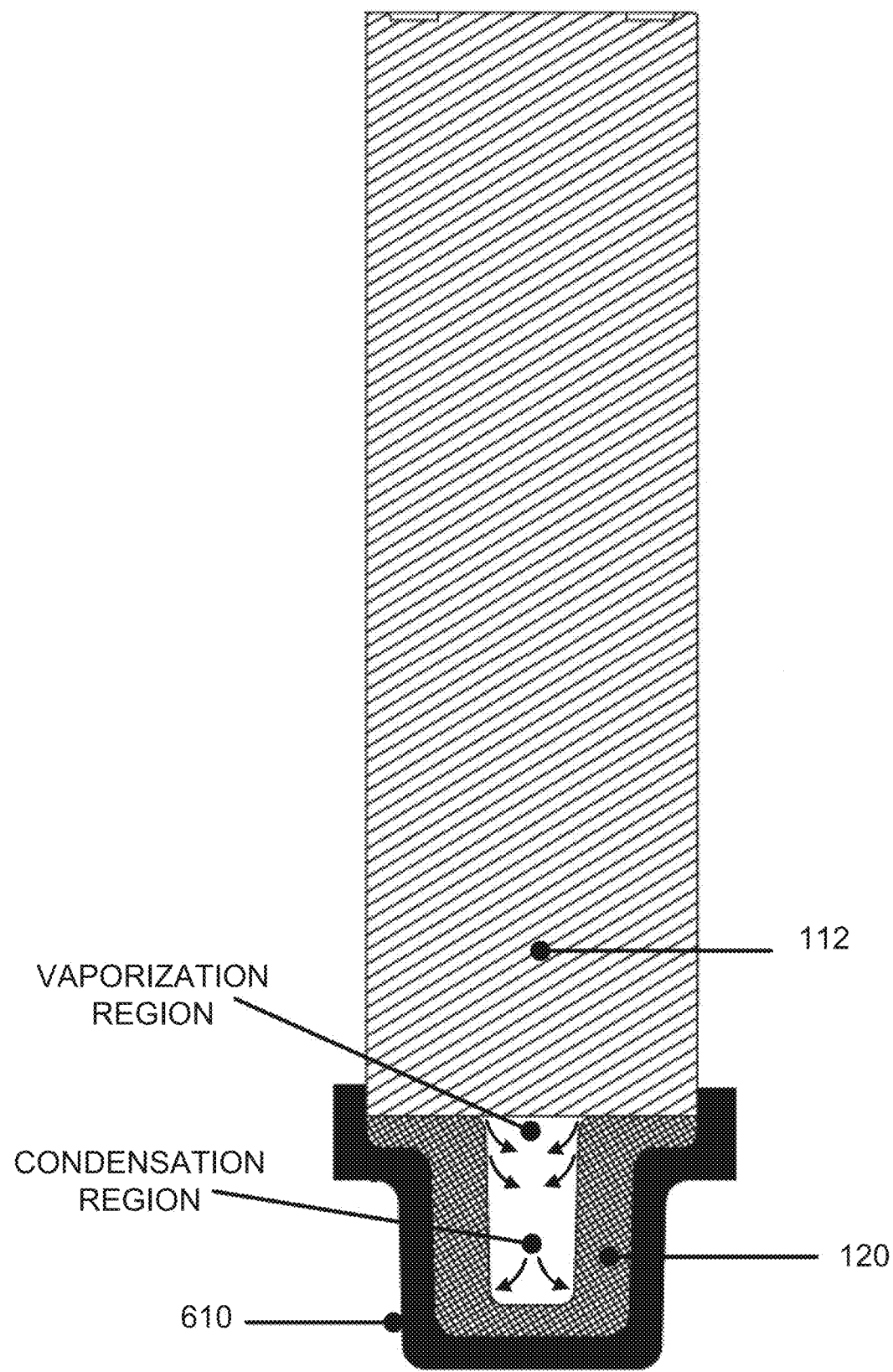
Figure 7A:
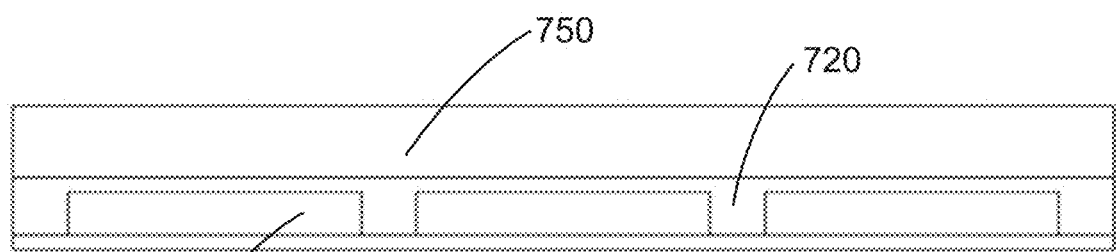
Figure 7B:
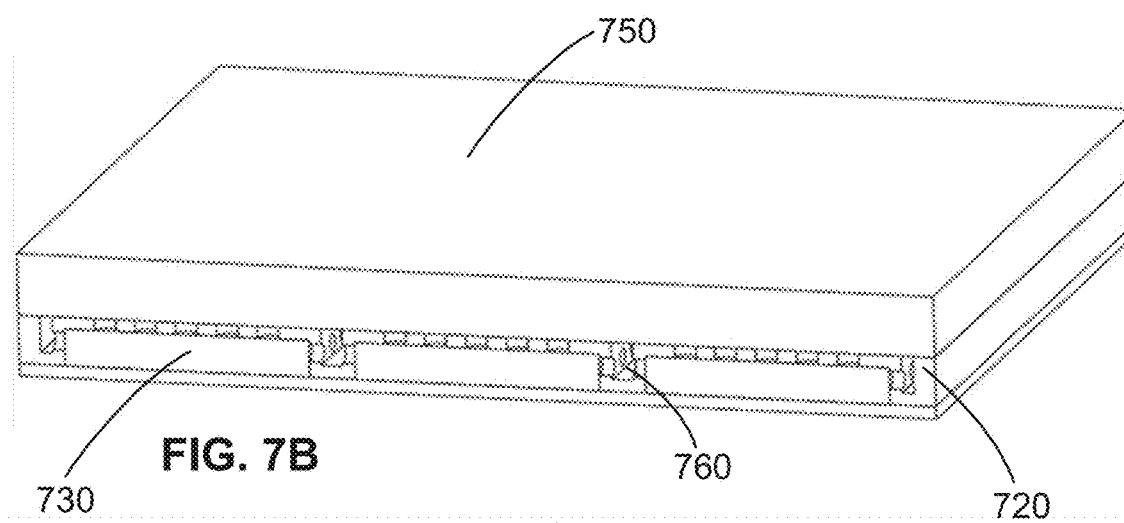
Figure 7C:
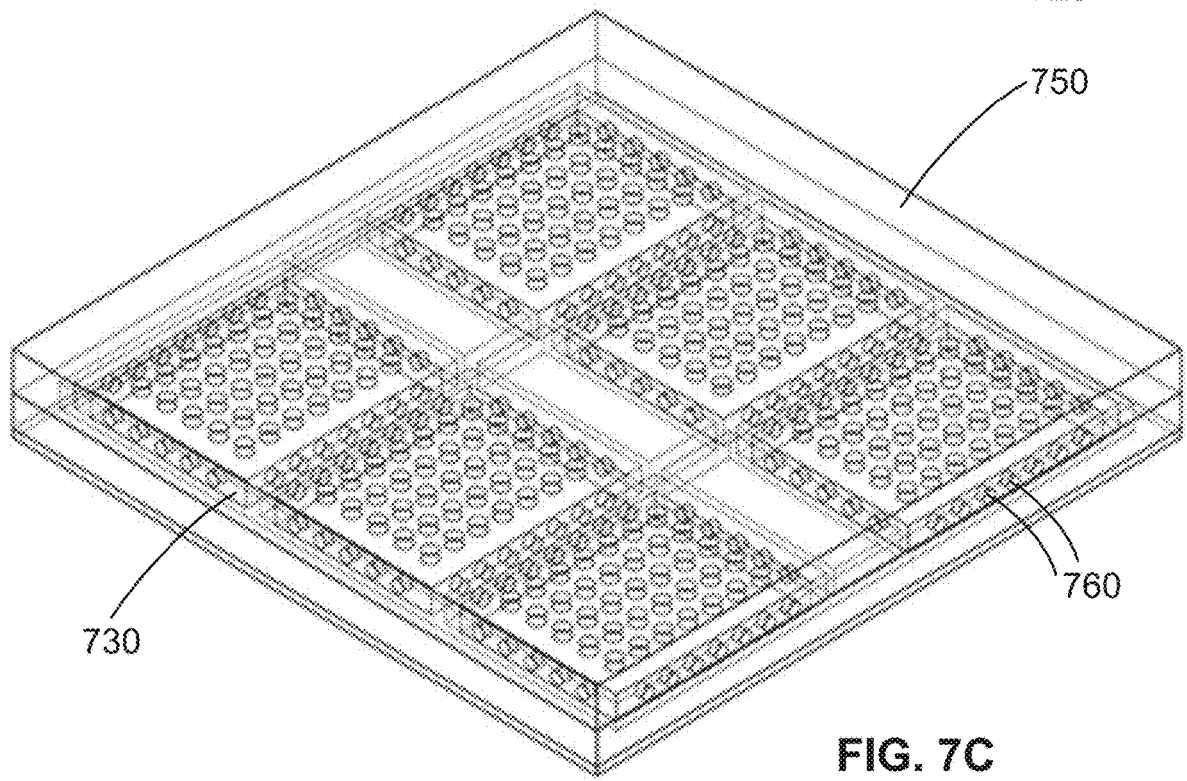
Figure 8A:
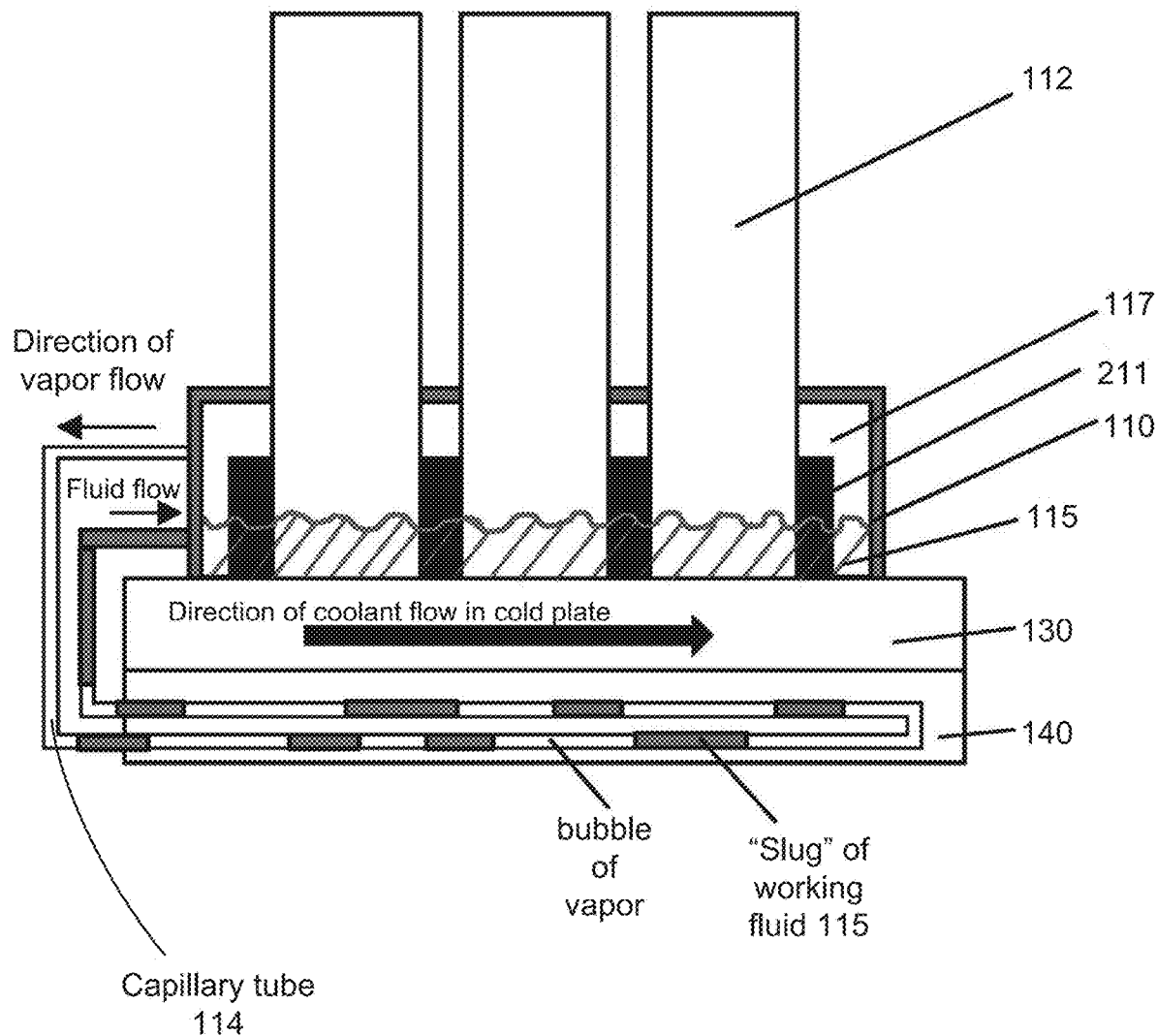
Figure 8B:
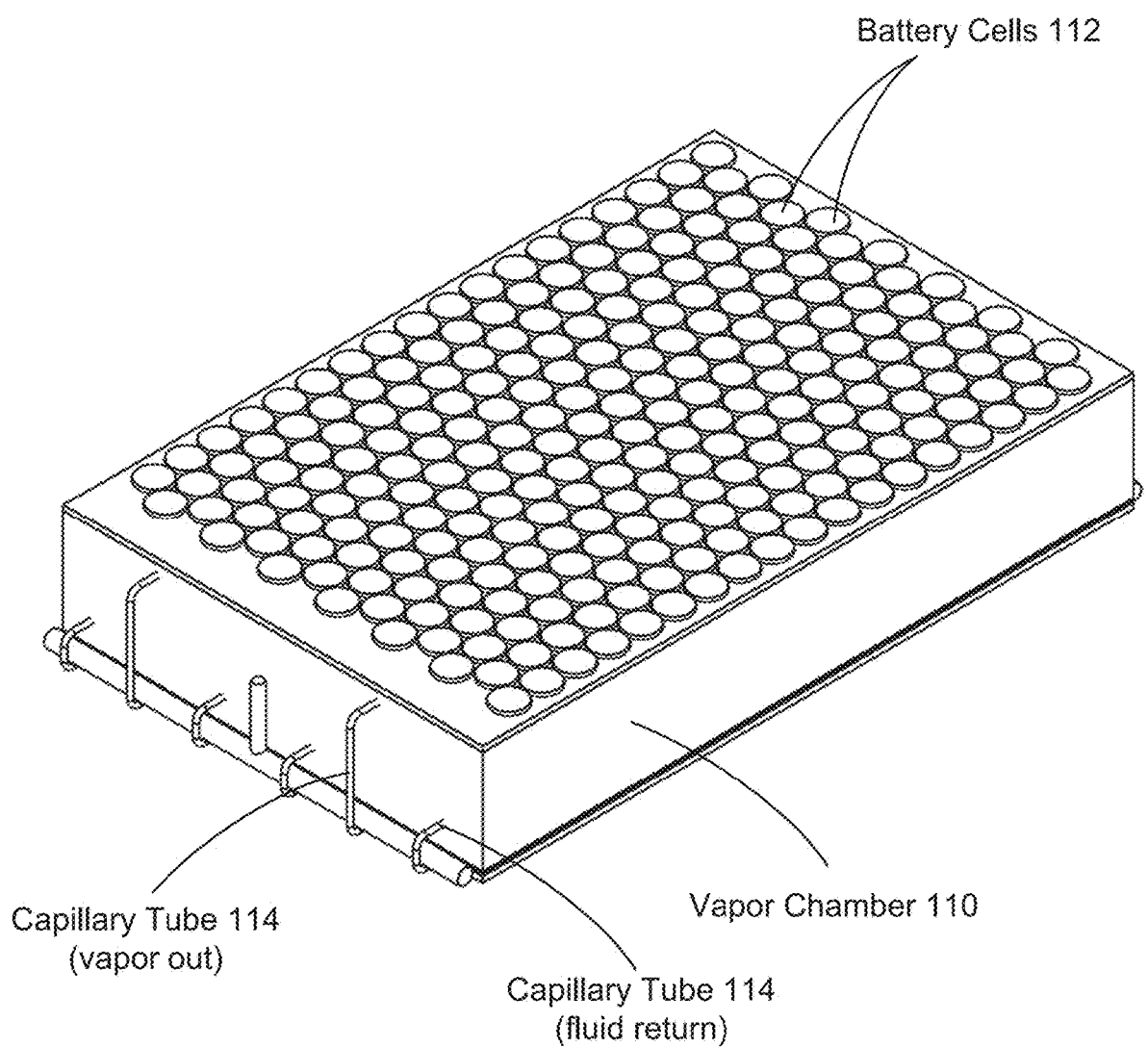
Figure 8C:
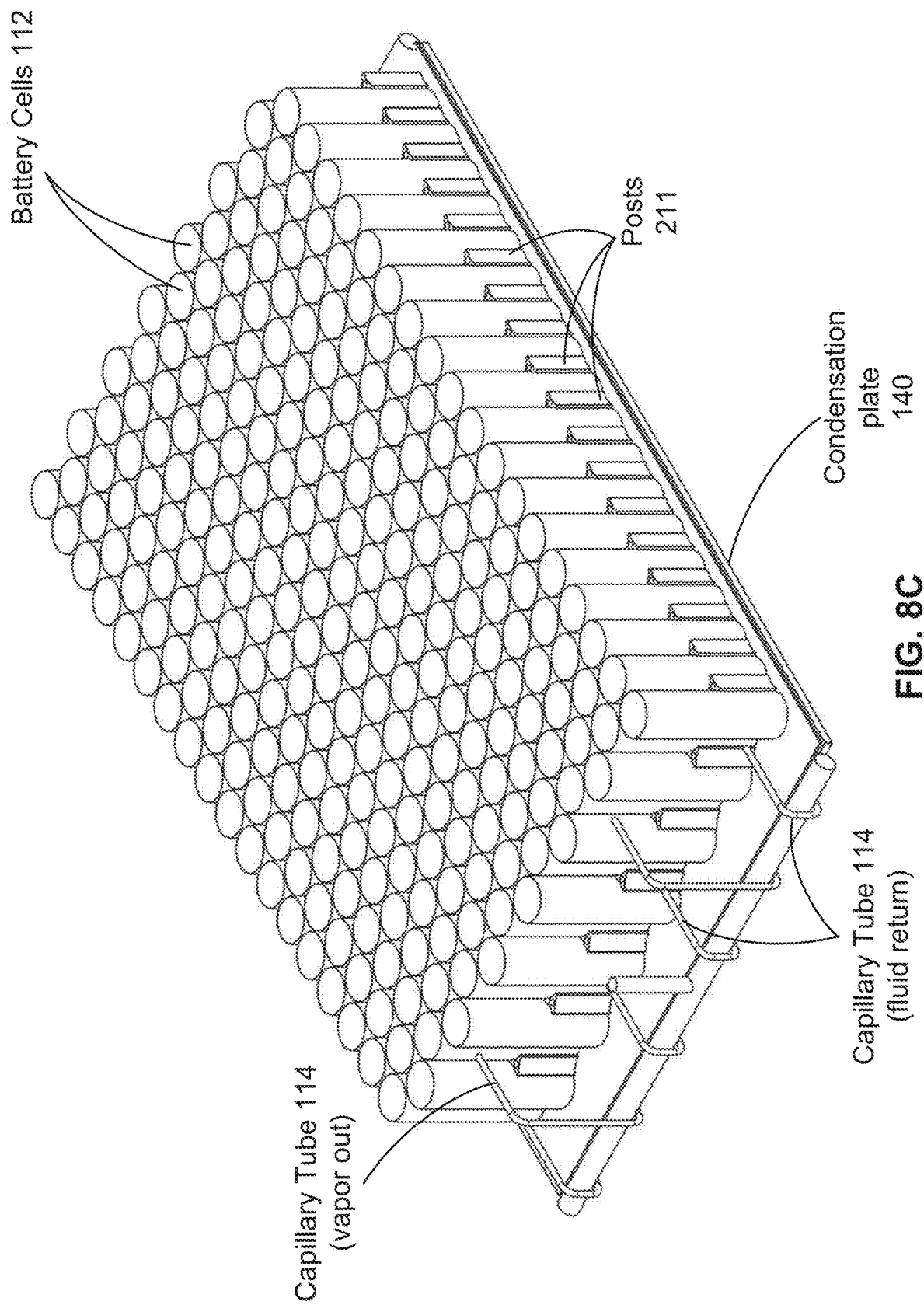
Figure 9A:
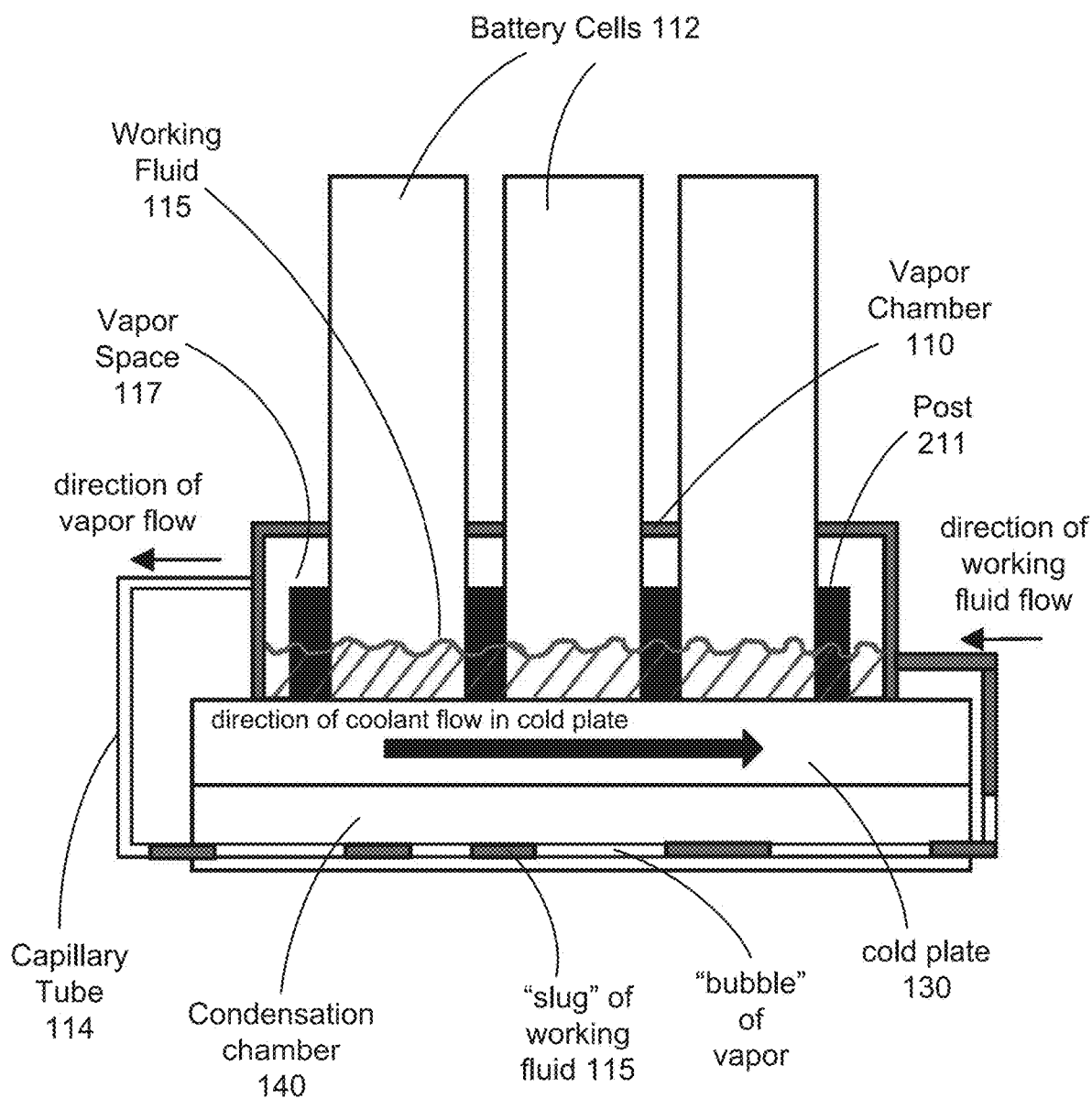
Figure 9B:
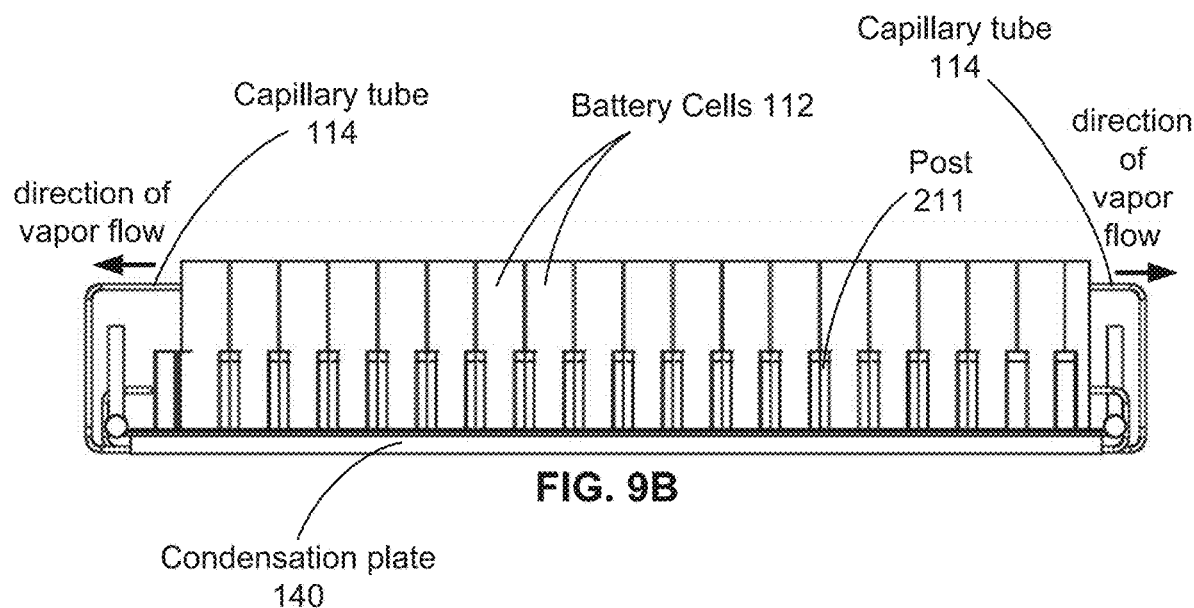
Figure 9C:
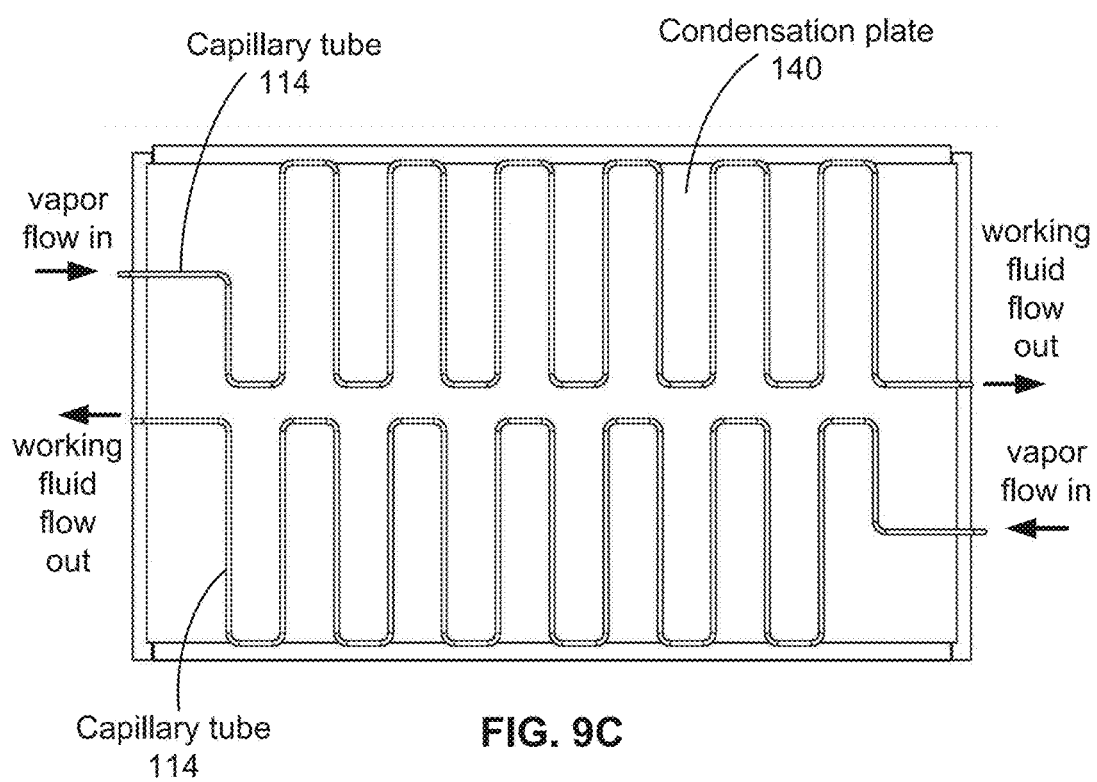
Figure 9D:
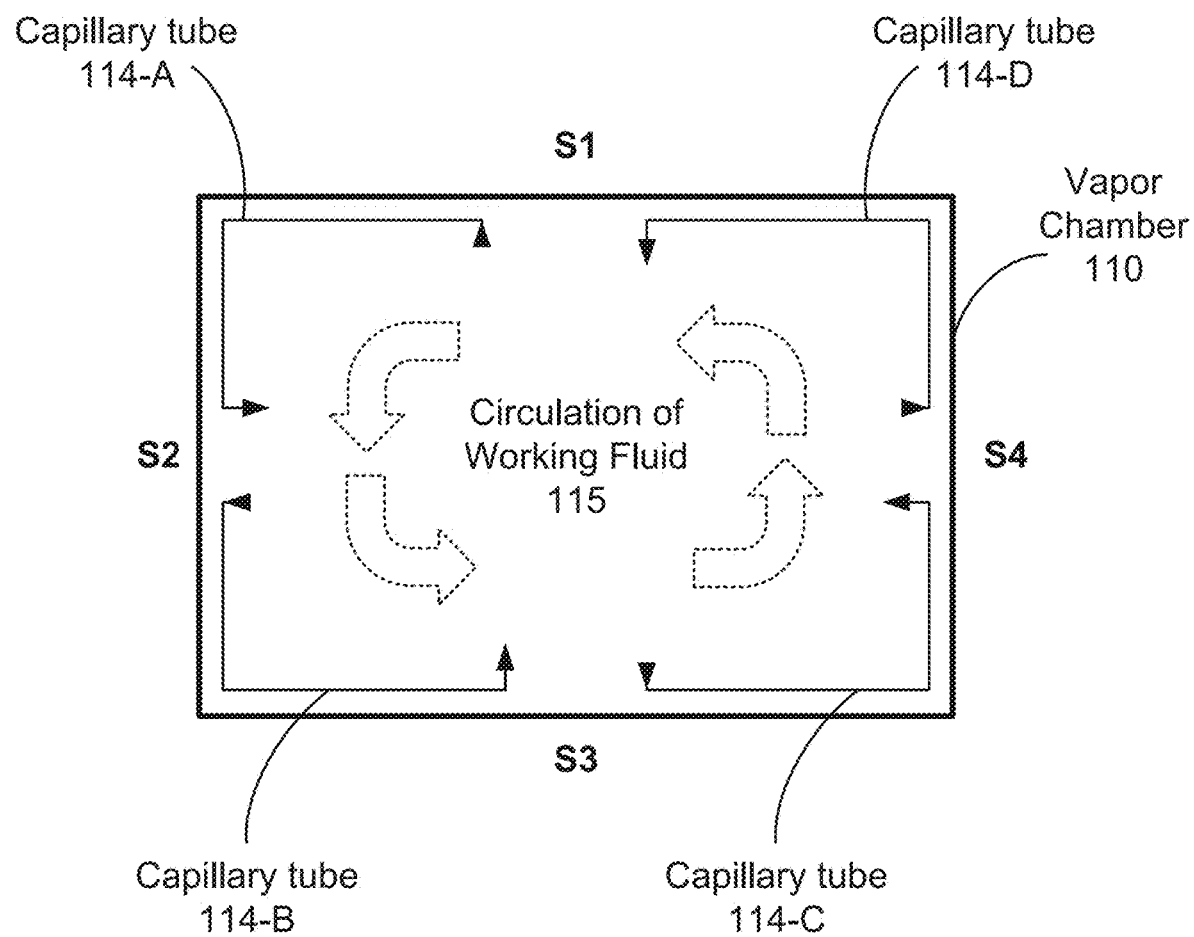
Figure 10A:
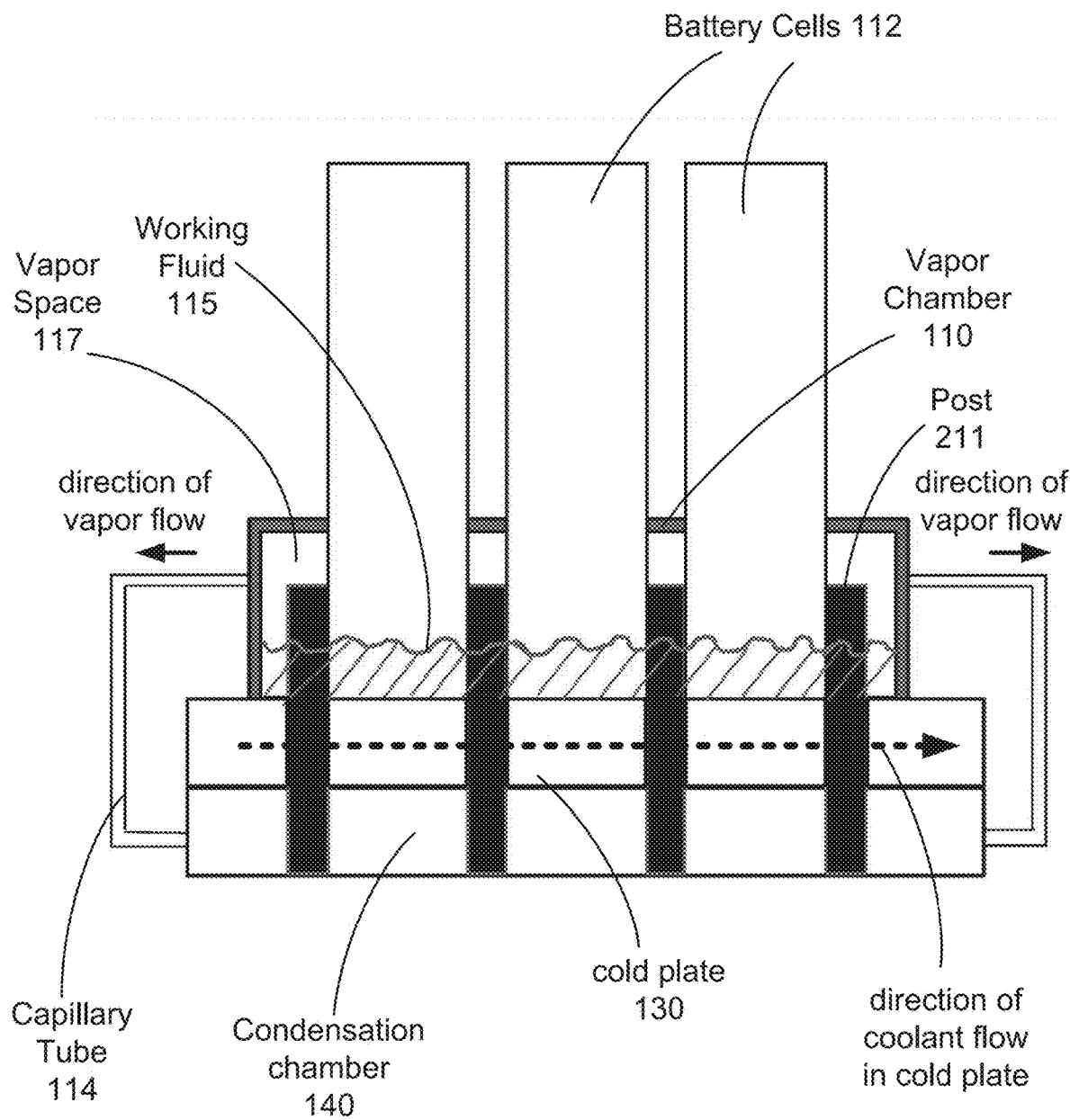
Figure 10B:
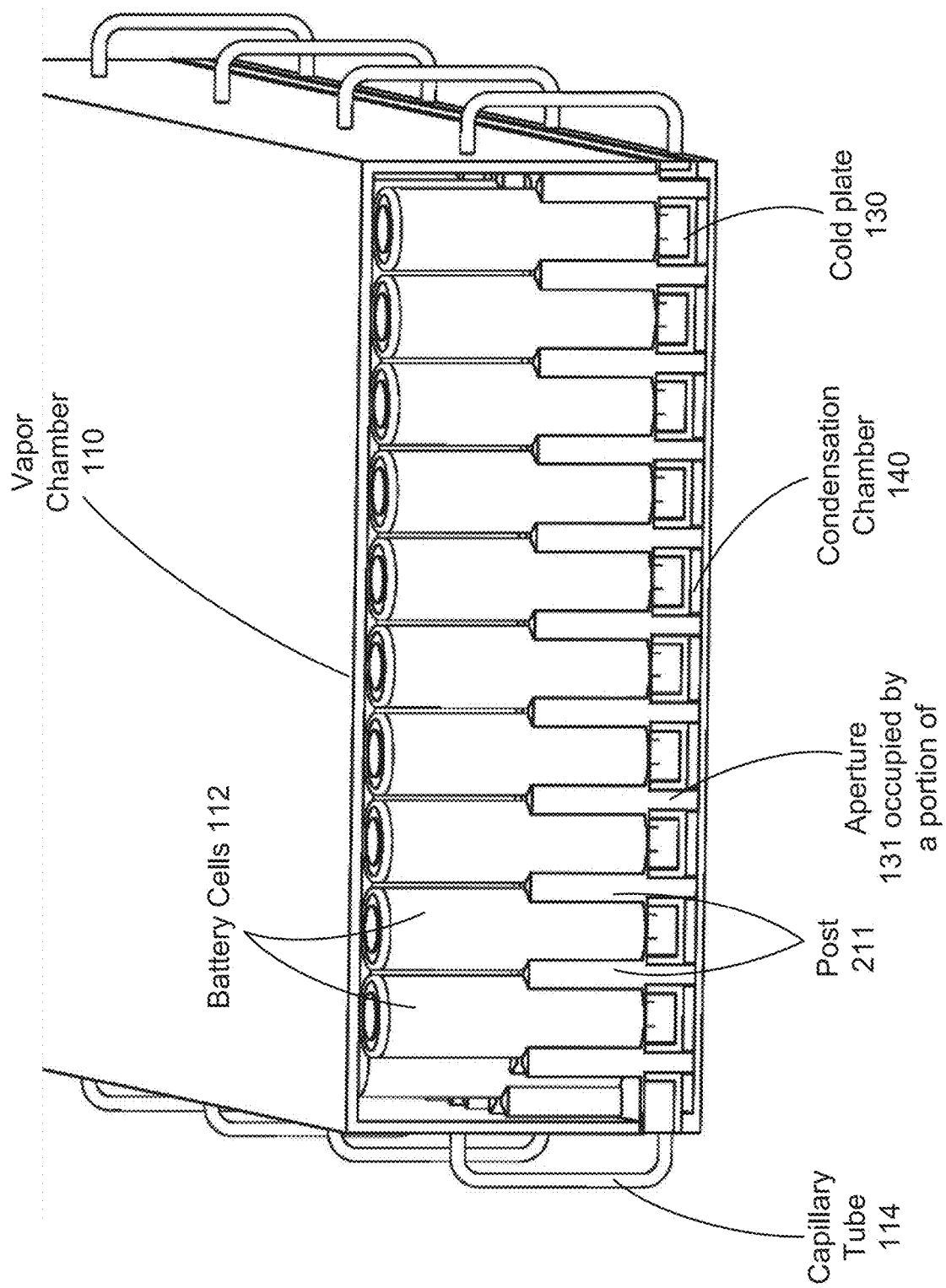
Figure 11A:
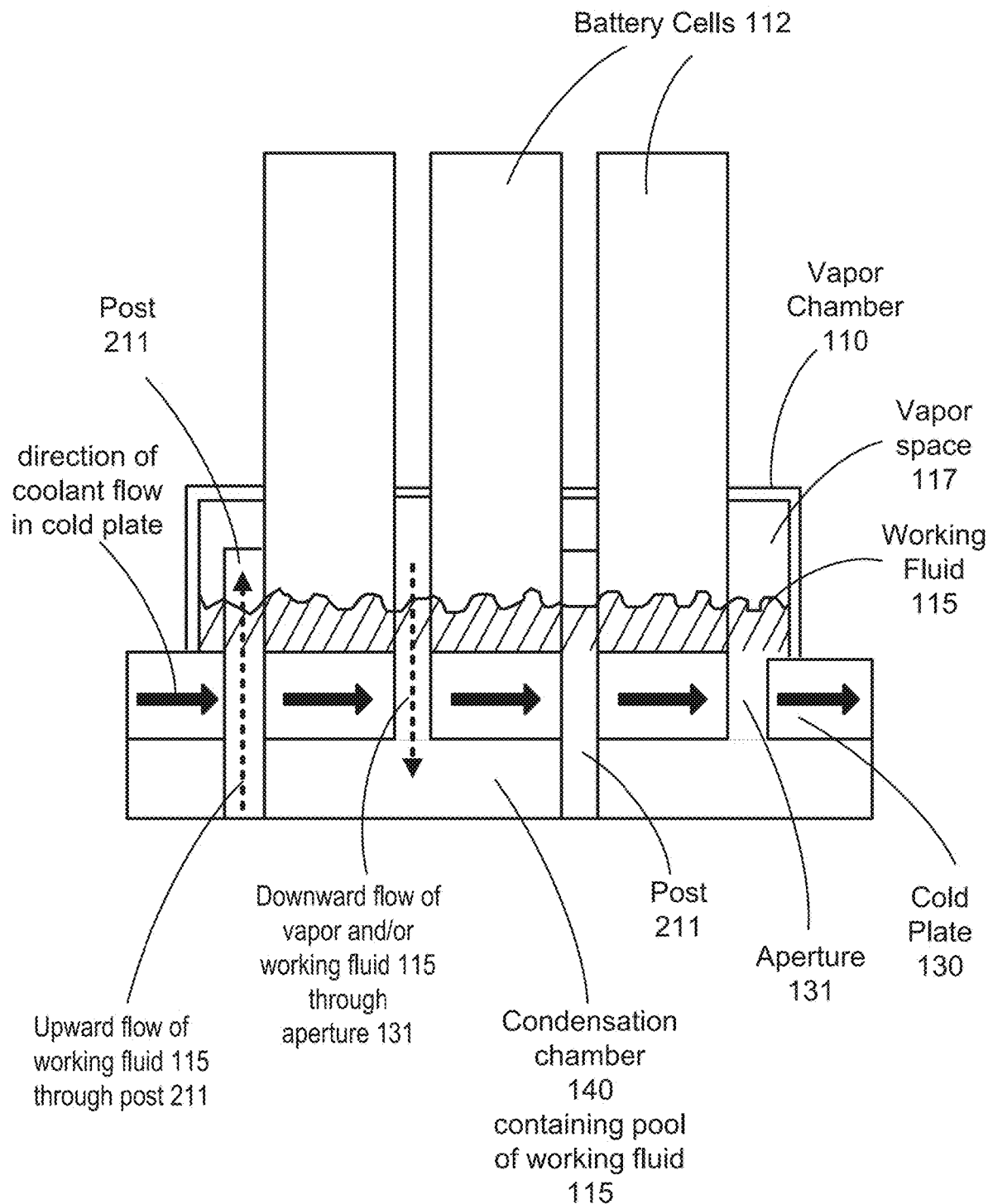
Figure 11B:
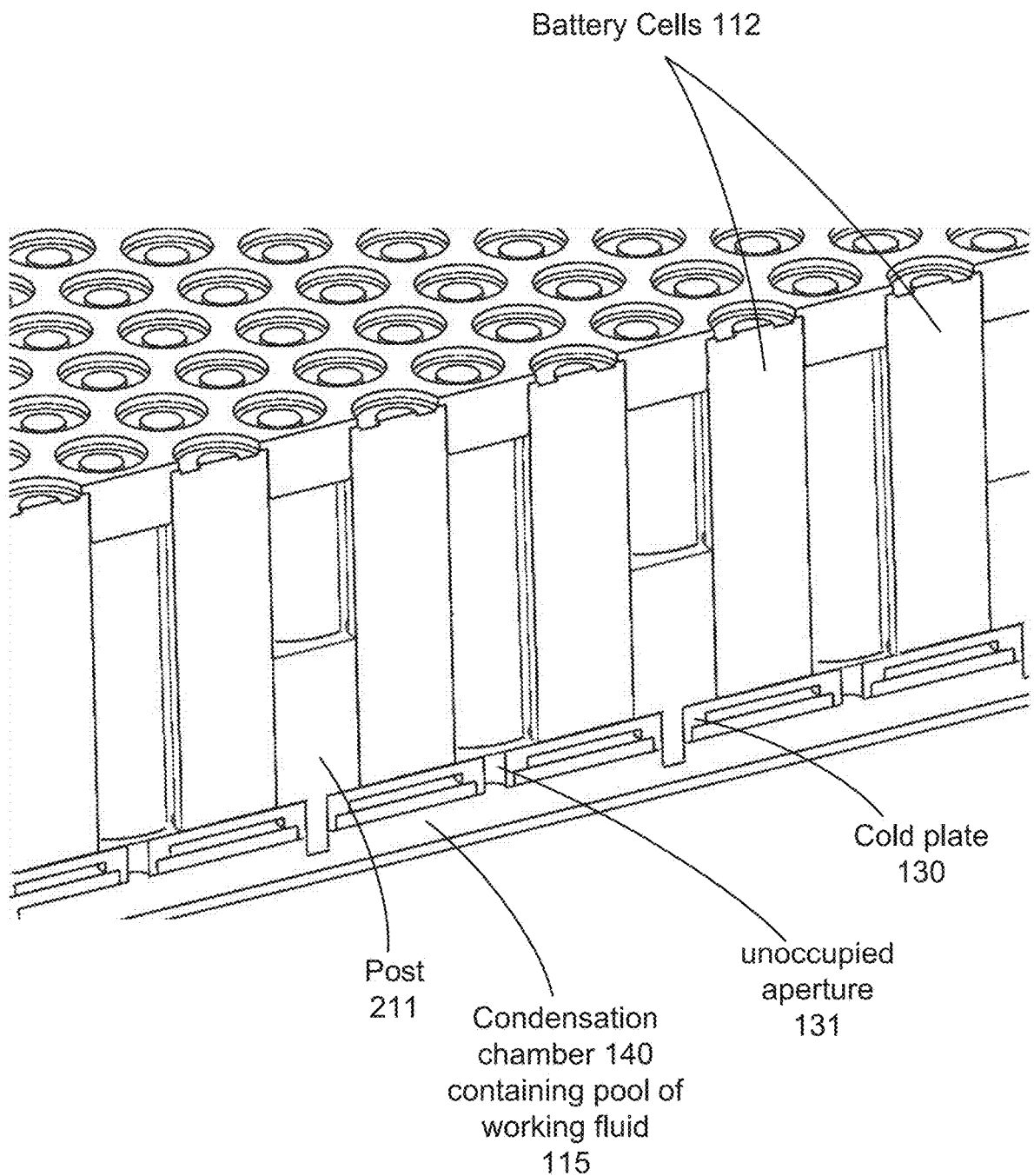
Figure 12A:
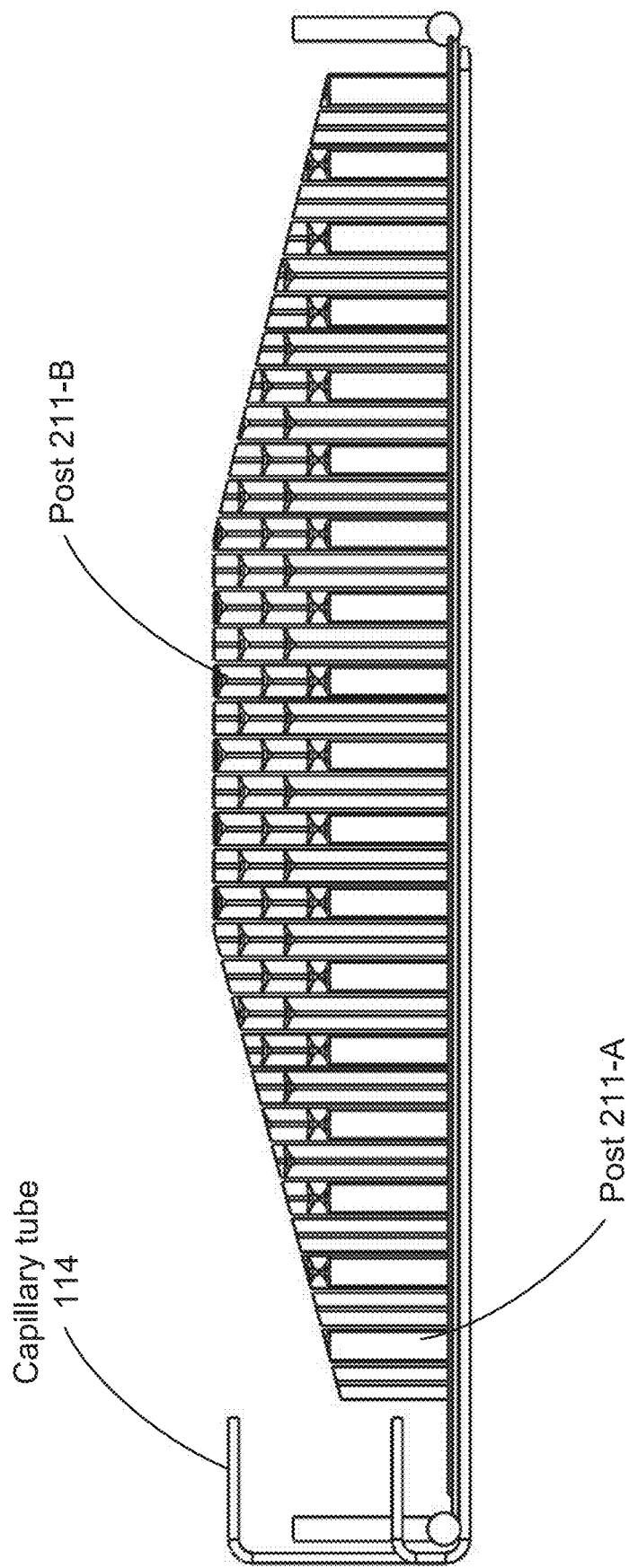
Figure 12B:
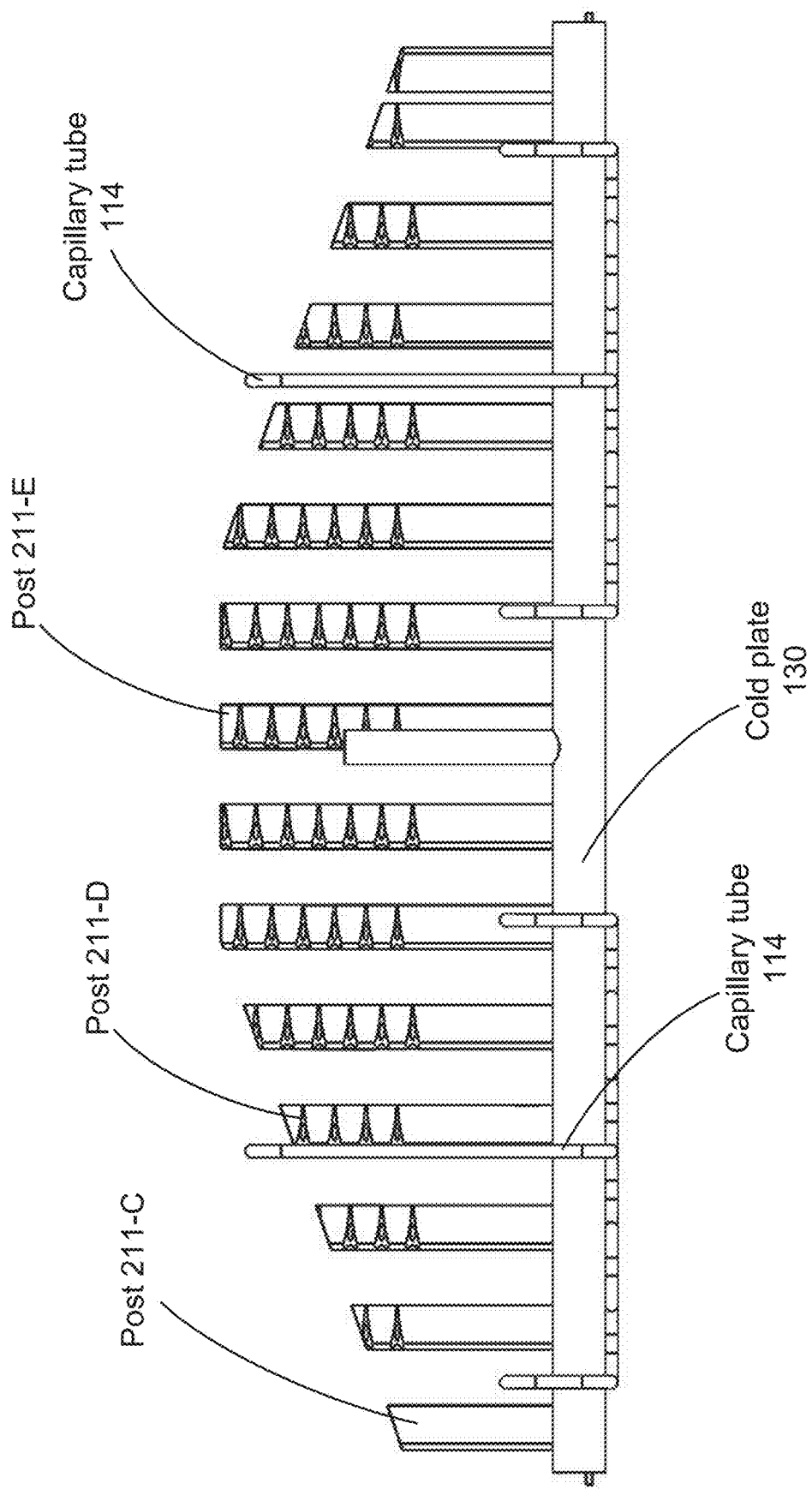
Figure 12C:
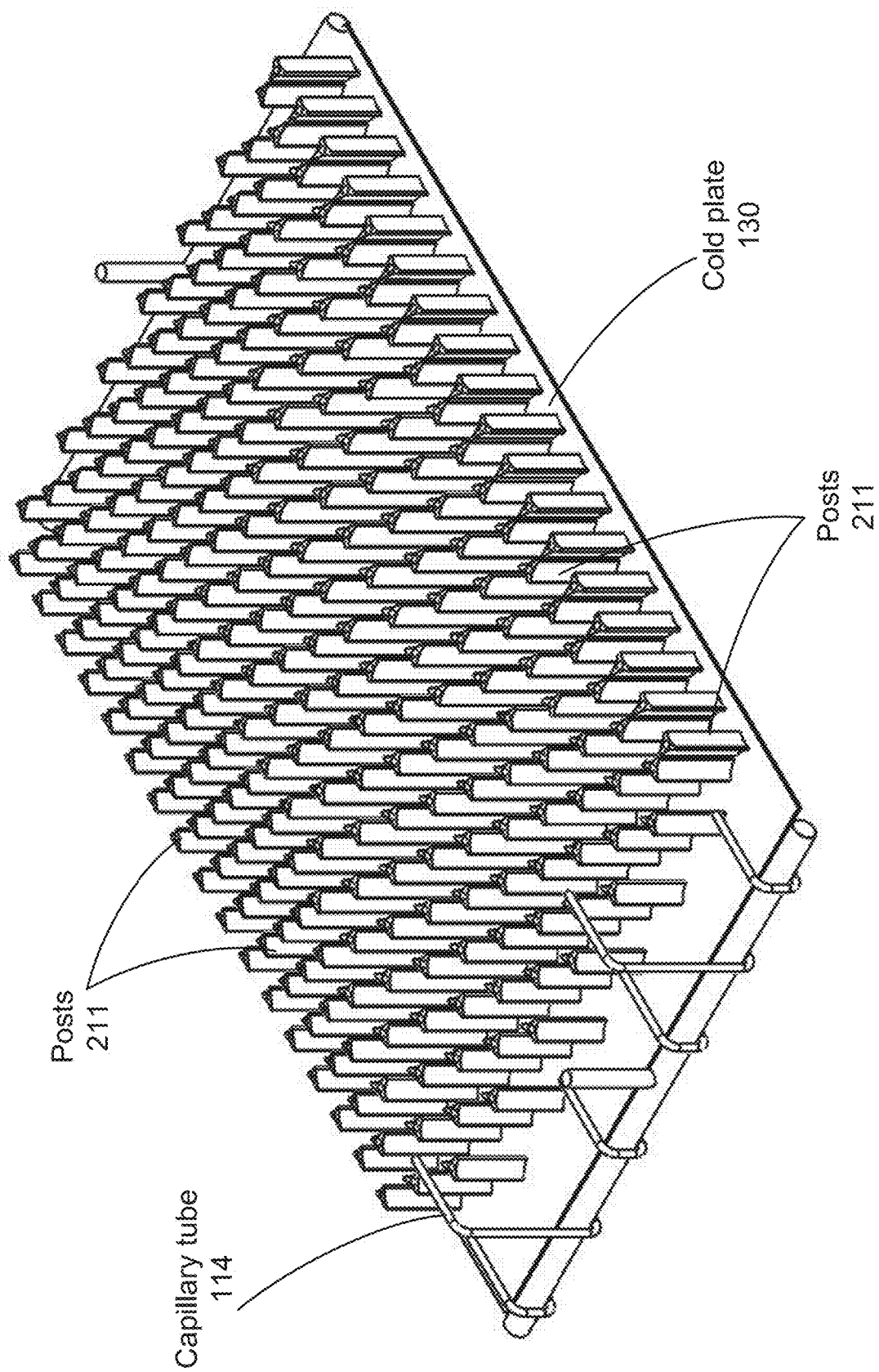

FIG. IF illustrates an exemplary thermal management system utilizing a common coolant path for a battery pack, power electronics, and an electric motor in accordance with an exemplary embodiment;

FIG. 2A illustrates a honeycomb-like configuration for a wick structure in accordance with an exemplary embodiment;

FIG. 2B illustrates battery cells positioned partially within the wick structure of FIG. 2A in accordance with an exemplary embodiment;

FIG. 2C illustrates a post-like configuration for a wick structure in accordance with an exemplary embodiment;

FIG. 2D illustrates battery cells interspersed between the wick structure of FIG. 2C in accordance with an exemplary embodiment;

FIG. 2E illustrates a serial weave configuration for a wick structure in accordance with an exemplary embodiment;

FIG. 2F illustrates battery cells positioned partially within the wick structure of FIG. 2E in accordance with an exemplary embodiment;

FIG. 2G illustrates battery cells positioned partially within a wick structure having a parallel weave configuration in accordance with an exemplary embodiment;

FIG. 2H illustrates a tapering wick structure in accordance with an exemplary embodiment;

FIG. 2I illustrates a wick structure having a configuration depending on battery cell location in a battery pack in accordance with an exemplary embodiment;

FIG. 2J illustrates targeted thermal management of battery cells depending on battery cell location in a battery pack in accordance with an exemplary embodiment;

FIGS. 3A through 3D illustrate a dual-layer configuration for a wick structure and integration of battery cells therewith in accordance with various exemplary embodiments;

FIGS. 4A through 4D illustrate a dual-layer configuration for a wick structure and integration of battery cells therewith in accordance with various exemplary embodiments;

FIGS. 5A through 5D illustrate a dual-layer configuration for a wick structure and integration of battery cells therewith in accordance with various exemplary embodiments;

FIG. 6 illustrates a single battery cell and associated coldwell in accordance with an exemplary embodiment;

FIGS. 7A through 7C illustrate use of a vapor chamber and wicking components for cooling of electronic devices in accordance with various exemplary embodiments;

FIGS. 8A through 8C illustrate an exemplary thermal management system utilizing capillary tubes in connection with a vapor chamber, the capillary tubes having intake and return ends on a common side of the vapor chamber, in accordance with various exemplary embodiments;

FIGS. 9A through 9C illustrate an exemplary thermal management system utilizing capillary tubes in connection with a vapor chamber, the capillary tubes having intake and return ends on opposing sides of the vapor chamber, in accordance with various exemplary embodiments;

FIG. 9D illustrates use of capillary tubes to achieve a desired circulation of working fluid in a vapor chamber in accordance with various exemplary embodiments;

FIGS. 10A and 10B illustrate an exemplary thermal management system utilizing capillary tubes in connection with a vapor chamber, the capillary tubes leading to a condensation chamber, and the condensation chamber coupled to the vapor chamber via wicking posts, in accordance with various exemplary embodiments;

FIGS. 11A and 11B illustrate an exemplary thermal management system utilizing capillary tubes in connection with a vapor chamber, the capillary tubes leading to a condensation chamber, and the condensation chamber linked to the vapor chamber via wicking posts and working fluid tubes, in accordance with various exemplary embodiments; and FIGS. 12A through 12C illustrate use of wicking posts of varied heights in a thermal management system, in accordance with various exemplary embodiments.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for battery pack construction, configuration, and use, as well as conventional techniques for thermal management, operation, measurement, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or related methods of use, for example a battery pack for an electric vehicle.

Various shortcomings of prior batteries, thermal management systems, and/or the like can be addressed by utilizing battery packs and related components configured in accordance with principles of the present disclosure. For example, prior two-phase cooling approaches typically utilized an integrated heat pipe and/or fully immersed battery cells in a fluid, thus adding significant weight and reducing energy density. Other prior approaches using wicking fully encase each battery cell in wicking material, limiting vapor movement, restricting capillary force to overcome gravity when cooling is provided below the battery pack, increasing cell spacing, and reducing volumetric and gravimetric energy density significantly.

In contrast, exemplary systems and methods disclosed herein enable improved energy densities at the battery pack level by eliminating restrictions on spaces and battery cell shapes, and by utilizing lightweight materials. Additionally, exemplary systems utilize a liquid-vapor phase change mechanism to ensure quick thermal response and maximized heat transfer. Significantly, exemplary systems provide effective thermal management in all orientations, including gravity-favored, inclined, horizontal, and antigravity conditions. Moreover, a wide range of electrically insulating but thermally conductive materials may be utilized for wicking materials and working fluids. In addition, exemplary system enhance and/or target heat transfer at portions of (or specific locations in) a battery pack. Yet further, via use of a shared working fluid environment within a vapor chamber, thermal runaway of a particular battery cell in a battery pack can be addressed, minimized, and/or prevented.

A thermal management system in accordance with principles of the present disclosure may be configured with any suitable components, structures, and/or elements in order to provide desired dimensional, mechanical, electrical, chemical, and/or thermal properties.

A "battery pack" as used herein describes a set of any number of battery cells, interconnected in series or parallel or a combination of series and parallel, to provide energy storage and/or electric power to a system as a single integrated unit. An example of a battery pack would be an electric vehicle lithium-ion battery pack, which can consist of thousands of cylindrical lithium ion battery cells.

A "battery cell" as used herein describes an electrochemical cell that is capable of generating electrical energy from a chemical reaction. Some battery cells can be rechargeable by introducing a current through the cell. Battery cells come in different types, such as lead-acid, nickel cadmium, nickel hydrogen, nickel metal hydride, lithium ion, sodium nickel chloride (a.k.a. "zebra"), based on the chemical reaction used to generate the electric current. Because battery cells produce electricity based on a chemical reaction, the temperature of the cell can influence the efficiency at which the electricity is produced. Battery cells can also be fuel cells, such as hydrogen-oxide proton exchange membrane cells, phosphoric acid cells, or solid acid cells. Principles of the present disclosure may desirably be applied to a wide variety of battery cell types, and are not limited to a particular battery cell chemistry, size, or configuration.

A "heat pump" as used herein describes a system that moves thermal energy from one part of a system, known as a "heat source", to another part of the system, known as the "heat sink", by the application of an external power source. Typically, the heat is transferred by the movement of a fluid cycling between the heat source and the heat sink. Examples include reversible two-phase refrigerant systems and single-phase ethylene-glycol systems.

A "vapor chamber" (or "heat pipe") as used herein describes a heat-transfer device that combines the principles of both thermal conductivity and phase transition to efficiently manage the transfer of heat between two interfaces.

With reference now to FIGS. 1A through 1D, in various exemplary embodiments a thermal management system 100 comprises a vapor chamber 110, a cold plate 130, and a heat pump 150. Cold plate 130 is disposed between, and thermally coupled to, vapor chamber 110 and heat pump 150. In some embodiments, cold plate 130 and heat pump 150 are separate components. In other exemplary embodiments, a surface forming part of heat pump 150 may be considered to function as cold plate 130. In yet other exemplary embodiments, a surface forming part of vapor chamber 110 may be considered to function as cold plate 130. Moreover, thermal management system 100 may comprise any other suitable components configured to support, guide, modify, and/or otherwise manage and/or control operation of thermal management system 100 and/or components thereof, for example sensors, ports, seals, electrical controls, and/or the like. Thermal management system 100 may be utilized to provide isothermal and/or near-isothermal conditions, for example for battery cells 112 disposed within (or partially within) vapor chamber 110.

Figure 1A:
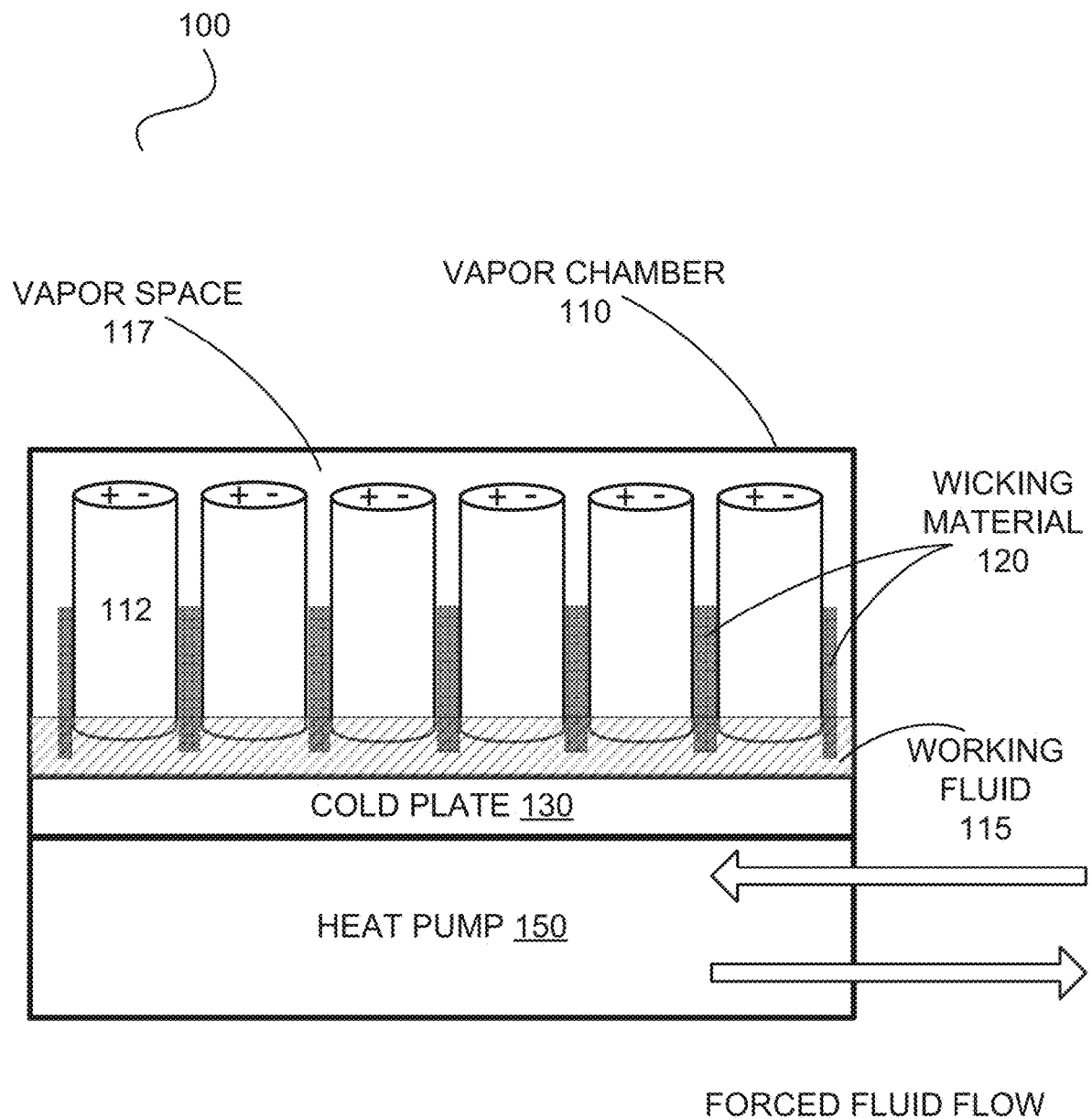
FIG. 1A illustrates an exemplary thermal management system having a cold plate disposed below a vapor chamber, the vapor chamber fully enclosing the battery cells, in accordance with an exemplary embodiment.
Figure 1B:
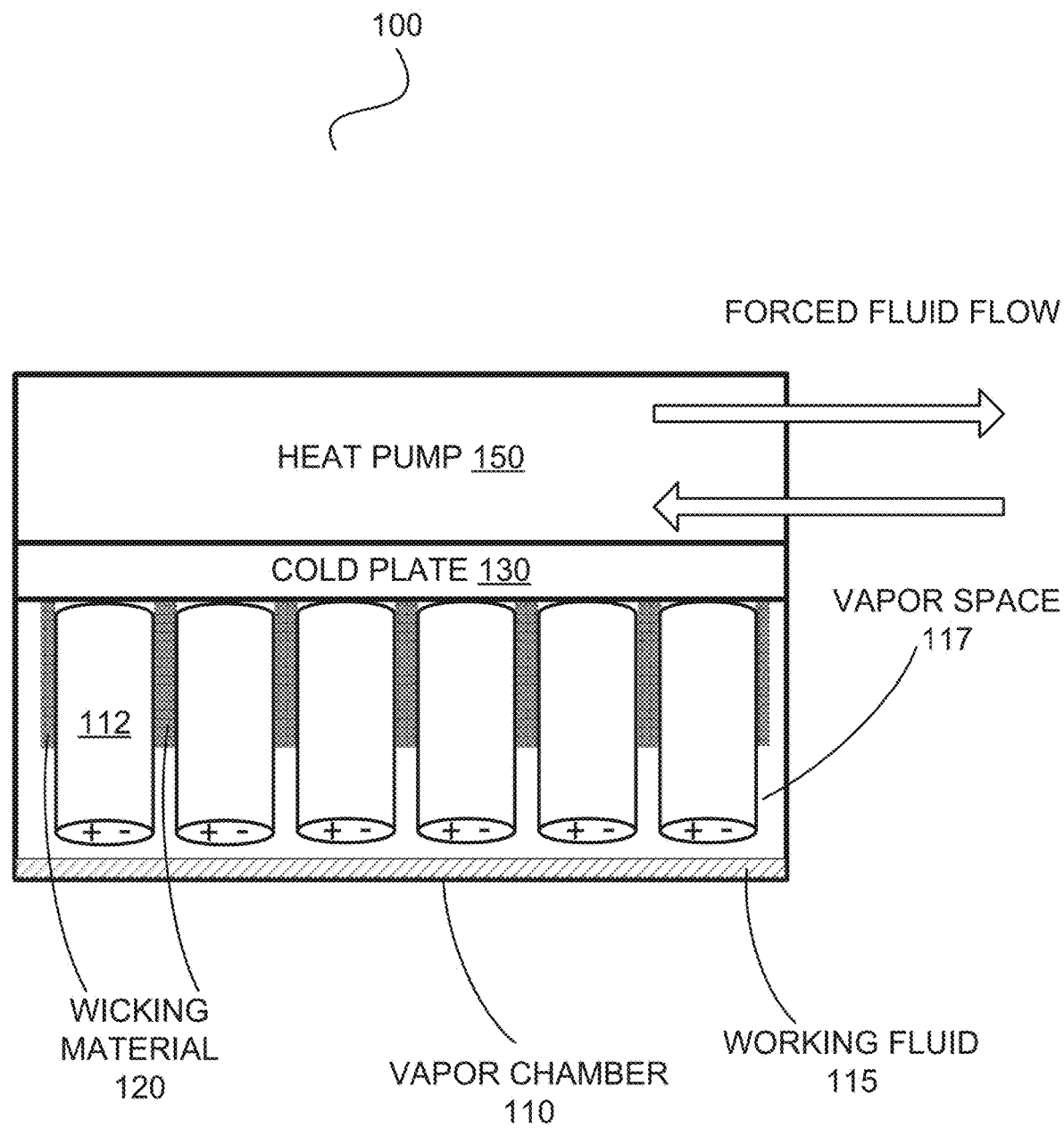
FIG. 1B illustrates an exemplary thermal management system having a cold plate disposed above a vapor chamber, the vapor chamber fully enclosing the battery cells, in accordance with an exemplary embodiment.

In some exemplary embodiments, vapor chamber 110 is configured to fully contain one or more battery cells 112, for example as illustrated in FIGS. 1A and 1B.

Figure 1C:
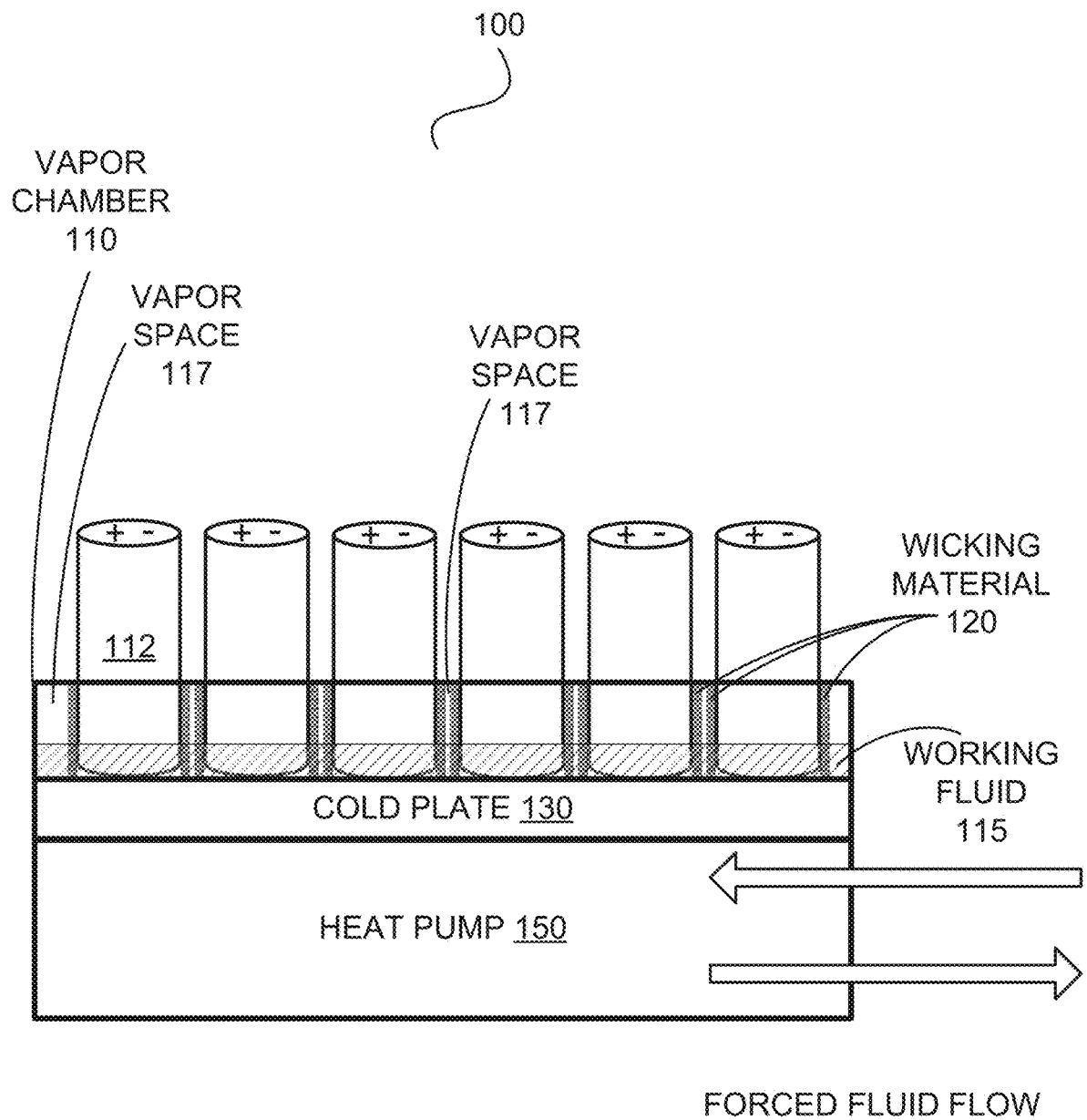
FIG. 1C illustrates an exemplary thermal management system having a cold plate disposed below a vapor chamber, the vapor chamber partially enclosing the battery cells; in accordance with an exemplary embodiment.
Figure 1D:
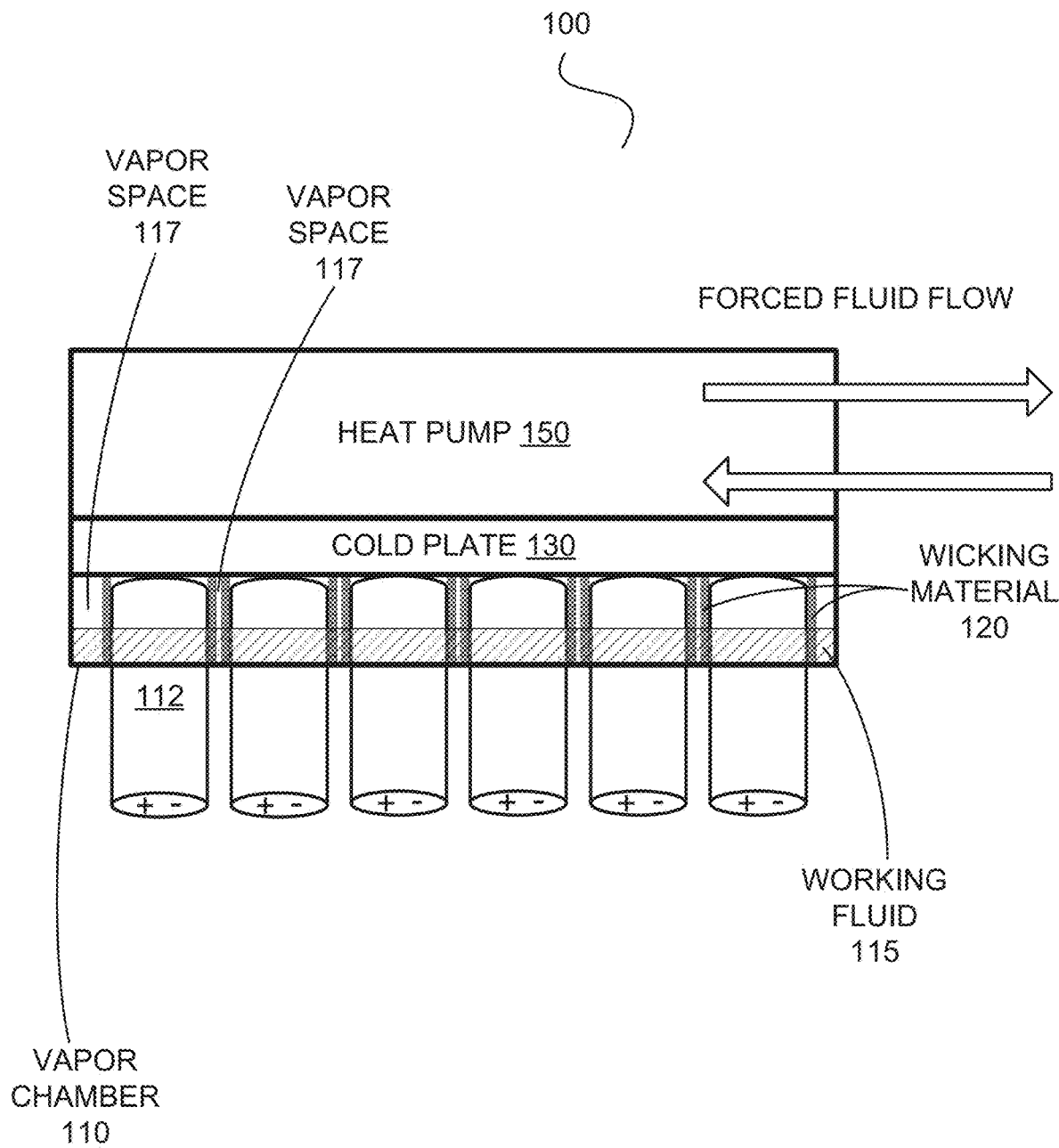
FIG. 1D illustrates an exemplary thermal management system having a cold plate disposed above a vapor chamber, the vapor chamber partially enclosing the battery cells, in accordance with an exemplary embodiment.

In other exemplary embodiments, vapor chamber 110 is configured to partially contain one or more battery cells 112, for example as illustrated in FIGS. 1C and 1D. In these exemplary embodiments, vapor chamber 110 is configured with various orifices, seals, and/or the like in order to at least partially receive one or more battery cells 112 while effectively retaining a working fluid 115 within vapor chamber 110. Moreover, in these exemplary embodiments; access to one end of each battery cell 112 (for example, for electrical wiring) is made easier as compared to approaches where each battery cell 112 is fully contained within vapor chamber 110, while still providing adequate thermal regulation of each battery cell 112. Additionally, in these exemplary embodiments, vapor chamber 110 may function to at least partially retain, secure, and/or align battery cells 112 with respect to one another, reducing and/or eliminating the need for other battery cell 112 retention and/or alignment components.

With continued reference to FIGS. 1C and 1D, in certain exemplary embodiments vapor chamber 110 is configured with various seals, retaining mechanisms, sealants, and/or the like, so that vapor chamber 110 may receive a portion of multiple battery cells 112 while preventing leakage and/or evaporation of working fluid 115 from within vapor chamber 110. For example, in one exemplary embodiment vapor chamber 110 comprises a rigid primary material overmolded with an elastomer, in order to provide a compressible seal at the interface where each battery cell 112 is inserted into vapor chamber 110. In other exemplary embodiments, o-rings or other mechanical sealing approaches may be utilized. Moreover, a suitable potting material may be utilized in order to seal the joints between battery cells 112 and vapor chamber 110. For example, in various exemplary embodiments the joints between battery cells 112 and vapor chamber 110 may be sealed via a flexible or semi-flexible potting material, adhesive, sealant, epoxy, or hot melt; the sealing material may be silicone, urethane, polyurethane, polyester, or polyamide based and/or may comprise any other suitable sealing and/or adhesive materials or compounds.

Vapor chamber 110 may be configured to receive any suitable portion of the length (and/or surface area, volume, or the like) of battery cells 112. In various exemplary embodiments, for each battery cell 112, vapor chamber 110 may be configured to receive between about 10% of the length of battery cell 112 and about 90% of the length of battery cell 112. In other exemplary embodiments, for each battery cell 112, vapor chamber 110 may be configured to receive between about 20% of the length of battery cell 112 and about 50% of the length of battery cell 112. Moreover, vapor chamber 110 may be configured to receive a different percentage of a battery cell 112, for example depending on the location of a battery cell 112 in a battery pack. In an exemplary embodiment, vapor chamber 110 may receive about 25% of the length of a battery cell 112 disposed on the edge of a battery pack, and about 50% of the length of a battery cell 112 disposed generally in the middle of a battery pack. Moreover, vapor chamber 110 may be configured to receive any suitable percentage of a battery cell. 112 based at least in part on the amount of thermal regulation desired for that particular battery cell 112. In this manner, battery cells 112 needing a higher degree of cooling than other battery cells 112 may be adequately cooled.

In various exemplary embodiments, vapor chamber 110 comprises a sealed or resealable container formed of a durable material, for example plastic, metal, and/or the like. In some embodiments, vapor chamber 110 comprises one or more of aluminum, steel, or the like. Vapor chamber 110 may be formed via any suitable process or combination of processes, for example overmolding, laser welding, and/or the like.

Vapor chamber 110 may be configured with one or more vents, access ports, and/or the like, for example in order to relieve pressure therefrom, allow adjustment of the level of working fluid 115 therein, and/or the like. In some exemplary embodiments, vapor chamber 110 is configured with internal temperature and/or pressure sensors in order to allow for adjustment of the amount of working fluid 115 within vapor chamber 110 (for example, at intervals, at a particular temperature and/or pressure threshold, in real time, etc.)

Vapor chamber 110 is configured to contain (or partially contain) one or more items to be thermally managed, for example a plurality of battery cells 112. In various exemplary embodiments, within vapor chamber 110, battery cells 112 (or portions thereof) may be configured in any suitable orientation, number, alignment, size, and/or shape, although battery cells 112 are commonly configured with a generally cylindrical shape. In some exemplary embodiments, battery cells 112 are packed in offset horizontal and/or vertical rows in order to obtain a high density of battery cells 112 within vapor chamber 110. In most exemplary embodiments, battery cells 112 are configured with a positive terminal and a negative terminal on a common end of a cylindrical battery structure (for example, as illustrated in FIGS. 1A through 1D). In this manner, in thermal management system 100 wiring of battery cells 112 is facilitated, while still enabling effective thermal management of battery cells 112.

Vapor chamber 110 contains a selected amount of working fluid 115. Working fluid 115 may comprise any suitable material or combination of materials, for example water, methanol, ethanol (ethyl alcohol), acetone, pentane, perfluoromethylcyclohexane, heptane, and/or the like. Working fluid 115 is desirably electrically insulating and/or non-reactive with components utilized in battery cells 112. Working fluid 115 is selected to enable efficient operation of vapor chamber 110. In various exemplary embodiments, characteristics of working fluid 115 which may be selected, adjusted, and/or optimized include: density, viscosity, surface tension, boiling point, latent heat of vaporization, reactivity to other components of thermal management system 100, and/or the like.

In thermal management system 100, vapor chamber 110 may be filled with a desired amount of working fluid 115, for example an amount sufficient to saturate all wicking material 120 contained within vapor chamber 110. Moreover, vapor chamber 110 may be filled with an amount of working fluid 115 exceeding the amount needed to saturate wicking material 120. Moreover, the amount of working fluid 115 disposed within vapor chamber 110 may be selected based on a desired level of thermal regulation for battery cells 112, an anticipated rate of loss or leakage of working fluid 115 from vapor chamber 110, and/or the like.

Vapor chamber 110 also contains a selected amount of wicking material 120 configured to interact with the plurality of battery cells 112 and the working fluid 115.

Wicking material 120 can be soaked in working fluid 115 and can be in a meshed, porous, or tree-like structure, or a combination of those, to provide capillary action and maximized wettability for evaporation and condensation.

In various exemplary embodiments, wicking material 120 comprises an electrically insulating but thermally conductive material that is compatible with working fluid 115. For example, wicking material 120 may comprise various fabrics in a microporous structure, such as amorphous silica fibers, glass fiber, nylon, polytetrafluoroethylene, polypropylene, polyethylene (of various densities and/or branching configurations), and/or the like. Moreover, wicking material 120 may comprise and/or be structured as powders, filaments, fibers, fabrics, meshes, mats, membranes, and/or the like.

In some embodiments, wicking material 120 has a contact angle between the intersection of the liquid-solid interface and the liquid-vapor interface of less than 90 degrees (i.e., wicking material 120 is hydrophilic). The contact angle is determined by a combination of factors, including surface tension and gravity. Wicking material 120 also benefits from having a high capillary effect. A small change in material structure/roughness/texture can lead to significant changes in capillary force. In various exemplary embodiments, characteristics of wicking material 120 which may be selected, adjusted, and/or optimized include: the effective radius of the wick material, permeability of the wick material (as a result of both particle size and porosity), cross-sectional area of the wick material, effective length of a heat transfer pathway, and/or the like.

Wicking material 120 may be configured to transport working fluid 115 at least partially along, towards, and/or between battery cells 112 in vapor chamber 110. For example, with reference to FIG. 1A, in embodiments where cold plate 130 is disposed below vapor chamber 110, wicking material 120 is operative to draw working fluid 115 at least partially upwards along the side of the battery cells 112, facilitating transfer of thermal energy from battery cells 112 into working fluid 115. Additionally, as working fluid 115 returns to a liquid phase via condensation (for example, along the top and/or sides of vapor chamber 110, wicking material 120 is operative to draw working fluid 115 which has run down the sides of vapor chamber 110 back toward the center of vapor chamber 110.

In various exemplary embodiments, wicking material 120 is configured to achieve a desired capillary velocity when utilized in connection with working fluid 115. In some embodiments, wicking material 120 achieves a capillary velocity of up to about 7 mm/s. In other exemplary embodiments, wicking material 120 achieves a capillary velocity of between about 4 mm/s and about 7 mm/s. Moreover, in thermal management system 100, wicking material 120 (together with working fluid 115) may be configured to provide a capillary velocity sufficient to allow effective thermal regulation of battery cells 112 by transporting a sufficient ongoing flow of working fluid 115 into contact with battery cells 112.

In some exemplary embodiments, wicking material 120 extends less than about 10% of the distance along each battery cell 112. In other exemplary embodiments, wicking material 120 extends less than about 25% of the distance along each battery cell 112. In still other exemplary embodiments, wicking material 120 extends less than about 50% of the distance along each battery cell 112. It will be appreciated that, because thermal management system 100 does not require wicking material 120 to extend fully along each battery cell 112, significant weight and cost savings may be realized. However, in thermal management system 100, wicking material 120 may extend any suitable selected distance along each battery cell 112.

In various exemplary embodiments, wicking material 120 may be constructed via any suitable process, for example solvent casting, sheet-form molding and transverse stretching, injection molding, and/or the like. Moreover, characteristics of wicking material 120 may be varied when manufactured and/or as utilized within vapor chamber 110. For example, in various exemplary embodiments wherein wicking material 120 is injection molded, characteristics of wicking material 120 may be varied from injection site to injection site, allowing for customized and/or targeted thermal performance of the resulting wick structure. For example, wicking material 120 having a first material (or mix of materials), density, porosity, level of capillary action, and/or the like may be injected at a first injection site, and wicking material 120 having a second material (or mix of materials), density, porosity, level of capillary action, and/or the like may be injected at a second injection site. Moreover, when manufactured via injection molding, wicking material 120 may be configured with a thickness of down to about 0.75 mm, allowing wicking material 120 to be disposed between battery cells 112 in vapor chamber 110 while still permitting battery cells 112 to be located very close together.

Cold plate 130 is configured to transfer thermal energy between vapor chamber 110 and heat pump 150. For example, when thermal management system 100 is utilized to cool battery cells 112 in vapor chamber 110, cold plate 130 receives thermal energy from vapor chamber 110 and passes the thermal energy to heat pump 150. Conversely, when thermal management system 100 is utilized to warm battery cells 112 in vapor chamber 110 (for example, when thermal management system 100 forms part of a vehicle placed in a cold ambient environment), cold plate 130 receives thermal energy from heat pump 150 and passes the thermal energy to vapor chamber 110. Cold plate 130 may comprise any suitable durable and thermally conductive material, for example anodized aluminum.

In an exemplary embodiment, cold plate 130 is configured with minichannel and/or microchannel cooling. Channels formed within and/or on cold plate 130 may be of any suitable size and/or geometry, for example circular, rectangular, circular with "teeth" or other protrusions, trapezoidal, and/or the like. Cold plate 130 may be configured with channels for fluid flow only on the side of cold plate 130 interfacing with heat pump 150, only on the side of cold plate 130 interfacing with vapor chamber 110, or on both sides of cold plate 130. The channels on cold plate 130 are configured to cause and/or maintain turbulent fluid flow therethrough in order to maximize associated heat transfer.

In various exemplary embodiments, heat pump 150 is operative to remove heat from (or, in a heating mode, provide heat to) cold plate 130, for example via pumped circulation of a coolant such as water, water-glycol mixtures, hydro-flourocarbon refrigerant liquids, and/or the like. Heat pump 150 may comprise any suitable pumps, impellers, valves, hoses, tubes, radiators, and/or the like, as is known in the art, in order to transfer heat to and/or from cold plate 130.

Figure 1E:
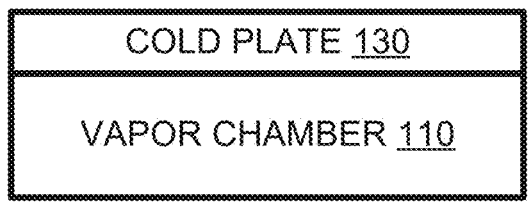
FIG. 1E illustrates orientation independence for operation of an exemplary thermal management system in accordance with an exemplary embodiment.
Figure 1E:
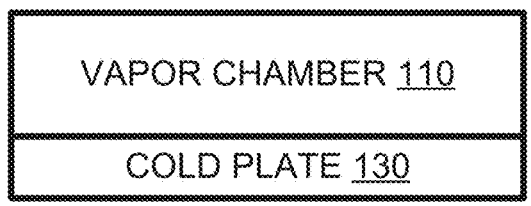
Figure 1E:
Figure 1E:
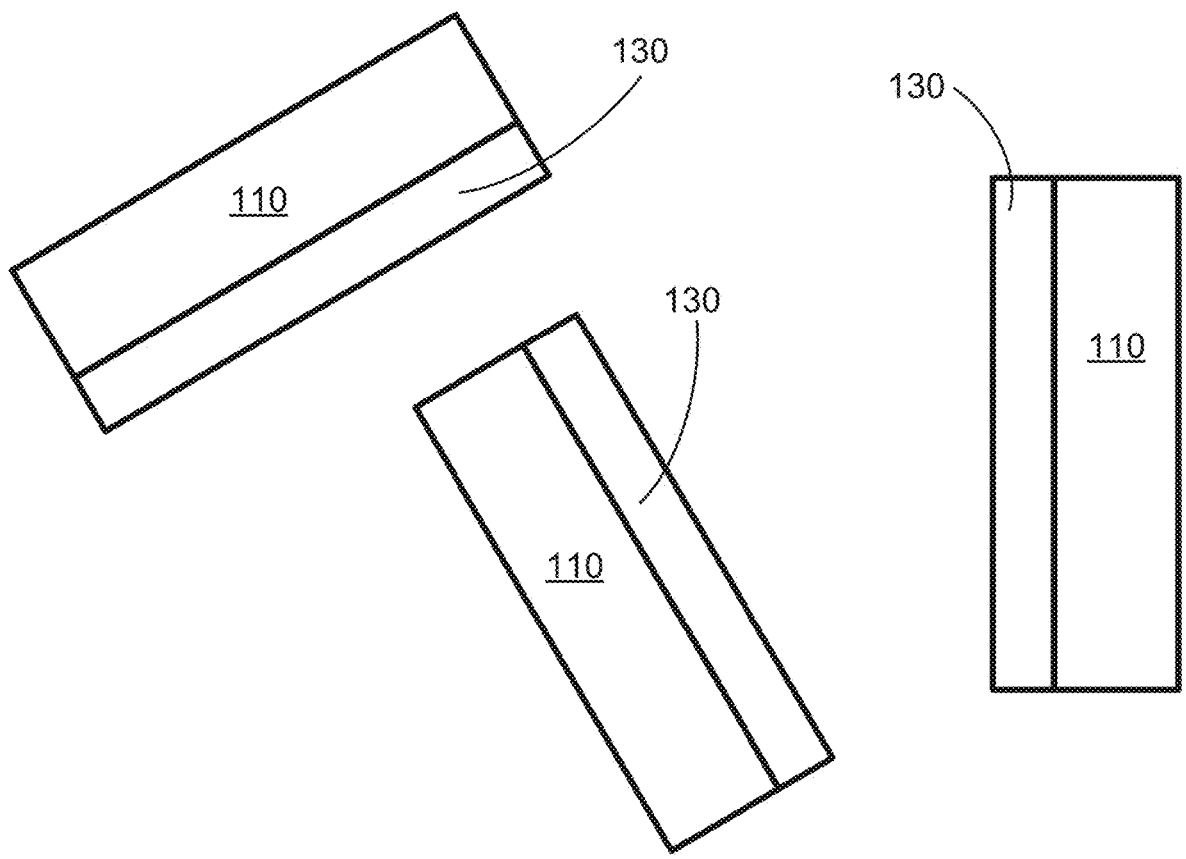

With reference again to FIGS. 1A and 1C, in various exemplary embodiments, thermal management system 100 may be configured and/or oriented such that cold plate 130 is disposed below vapor chamber 110. With reference to FIGS. 1B and 1D, in various exemplary embodiments, thermal management system 100 may be configured and/or oriented such that cold plate 130 is disposed above vapor chamber 110. Moreover, it will be appreciated that in many exemplary embodiments, the relationship between cold plate 130 and vapor chamber 110 may be changed, for example via turning thermal management system 100 upside down, placing thermal management system 100 on its side or on a slope relative to horizontal, and/or the like. Accordingly, with reference to FIG. 1E, thermal management system 100 is configured to provide appropriate cooling and/or heating capabilities to items contained within vapor chamber 100, regardless of the orientation of thermal management system 100. Stated another way, thermal management system 100 does not rely on any particular orientation with respect to gravity in order to function effectively. In contrast, prior approaches to vapor-based cooling typically relied heavily on gravity for condensation and fluid return, and would fail to operate properly in the absence of gravitational assistance. It will be appreciated that the orientation-independence features of exemplary systems as disclosed herein are highly desirable in non-stationary energy storage systems such as electric vehicles, as such systems are often operated in a tilted orientation. For example, thermal management system 100 is configured to function effectively when utilized in an electric automobile, even when the automobile is traveling or parked uphill or downhill. Moreover, thermal management system 100 is configured to function effectively when utilized in an electric airplane, drone, or the like, even when the orientation of thermal management system 100 is changing due to climbing, descending, banking during a turn, or the like.

During operation of thermal management system 100, at least two heat transfer pathways are operable in order to accomplish optimal performance. Primary heat transfer is achieved by an external heat pump 150, transporting heat away from/to battery cells 112 via a fluid (for example, a water-glycol fluid or the like). Within vapor chamber 110, heat transfer is facilitated by liquid-vapor phase change inside voids and/or cavities contained in and/or formed by wicking material 120. During a cooling mode of thermal management system 100, a quick thermal response is established via latent heat of vaporization and working fluid 115 inside wicking material 120 vaporizes into vapor space 117 (as used herein, "vapor space" may refer to the space within vapor chamber 110 that is not occupied by a solid or a liquid). Heat pump 150 carrying away the heat causes the vapor to condense, and wicking material 120 exerts capillary forces to pull back the condensate to the evaporation sites, thus repeating the above cycle. During a battery preheating mode of thermal management system 100, heat pump 150 serves as a heat source supplying heat to vapor chamber 110. The vapor space within vapor chamber 110 operates as a thermosiphon or thermosiphons transferring heat to the walls of the battery cells 112. Large latent heat of vaporization accelerates the preheating process, which is beneficial in cold climates.

Figure 1F:
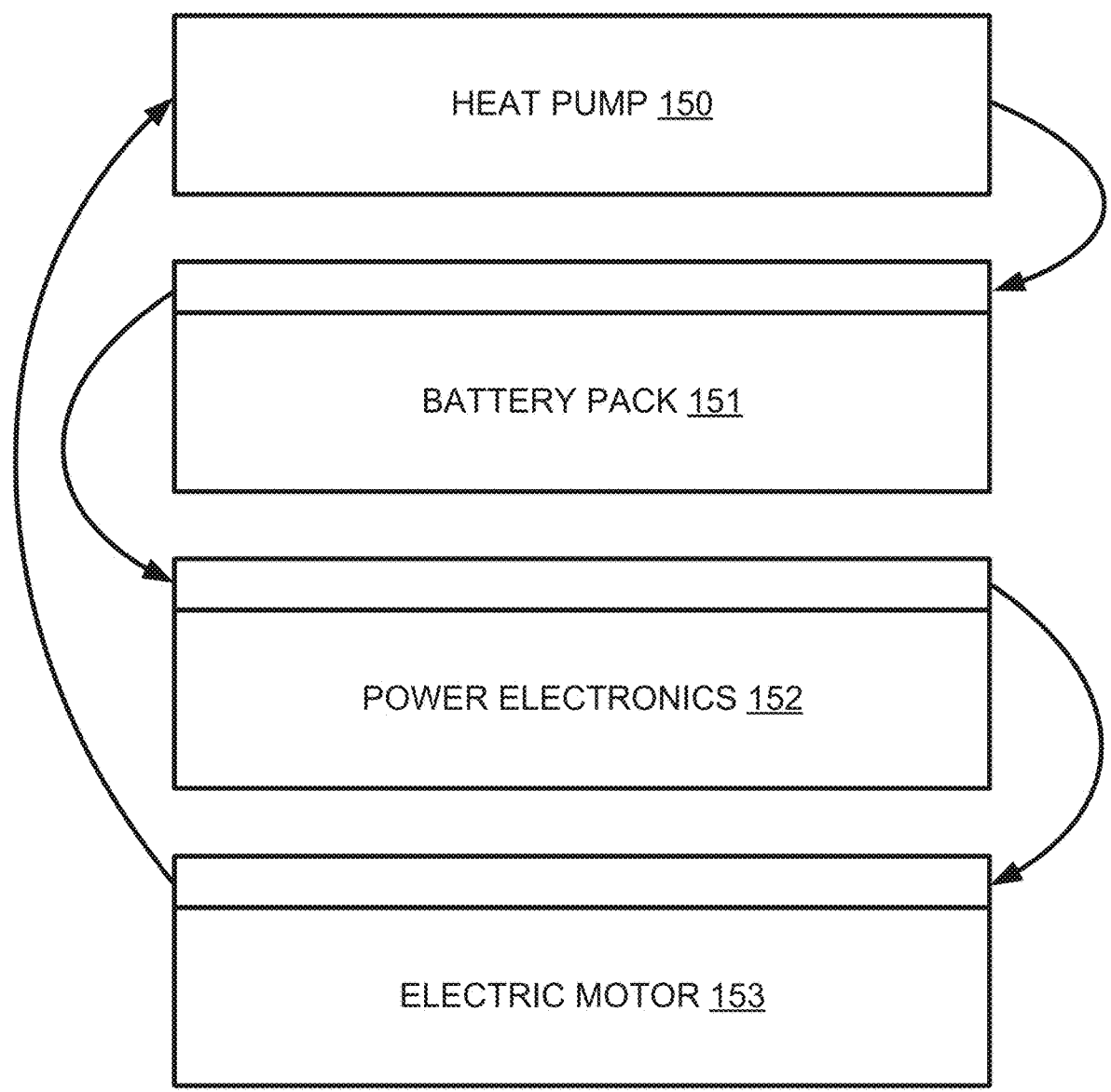

With momentary reference to FIG. 1F, principles of the present disclosure also contemplate an integrated thermal management system for an electric vehicle whereby a battery pack, power electronics, and a motor or generator may be cooled or heated via a unified system employing two-phase cooling for the battery pack, power electronics, and motor or generator. In some exemplary embodiments, a heat pump 150 circulates a fluid (such as propylene glycol or the like) to interface in order with battery pack 151, power electronics 152, and electric motor 153 (moreover, battery pack 151, power electronics 152, and electric motor 153 may be positioned in any order with respect to one another regarding fluid circulated by heat pump 150). In still other exemplary embodiments, battery pack 151, power electronics 152, and electric motor 153 are coupled to heat pump 150 each via a dedicated fluid line, but share a common fluid reservoir. In various exemplary embodiments, each of battery pack 151, power electronics 152, and electric motor 153 are at least partially cooled via two-phase cooling utilizing a working fluid and/or wicking materials as disclosed herein.

In thermal management system 100, wicking material 120 may be configured as desired, for example in order to achieve a particular level of thermal performance, volumetric energy density, mechanical retention and/or immobilization of battery cells 112, and/or the like. For example, wicking material 120 may be configured to at least partially retain battery cells 112 at particular locations within vapor chamber 110 and/or with respect to one another.

With additional reference now to FIGS. 2A and 2B, in some exemplary embodiments, wicking material 120 is configured with a honeycomb-like structure. In these exemplary embodiments, wicking material 120 is configured as contact rings 210 that have heat flux contact areas 220 that conduct heat from battery cells 112 (battery cells 112 being individually placed in each contact ring 210) to vapor paths 230 between contact rings 210. In FIG. 2A, contact areas 220 are shown as segments of contact rings 210, but a contiguous surface within a contact ring 210 could also be utilized. Contact ring 210 shapes other than circular could be used, especially if battery cells 212 are not cylindrical (for example, rectangular cells). The area of contact between contact areas 220 and battery cells 112 can be adjusted by changing the geometry of the contact rings 210 for optimized heat transfer. FIG. 2B illustrates wicking material 120 with cylindrical battery cells 112 positioned in some of the contact rings 210. In most cases of actual use, all contact rings 210 would have corresponding battery cells 112 inserted. Contact rings 210 can be formed from straight wall segments, as shown, or be smoothly circular with no corners. Vapor paths 230 can be triangular for efficient stacking arrangement of contact rings 210, or any other suitable shape. Moreover, the thickness of wicking material 120 in contact rings 210 may vary within contact rings 210 and/or from ring to ring. For example, the portions of contact rings 210 that fall directly between adjacent battery cells 112 may be thinner, while the portions of contact rings 210 that form the edges of vapor paths 230 may be thicker. In this manner, battery cells 112 may be placed close to one another while a sufficient amount of wicking material 120 remains in contact (or close proximity) with each battery cell 112 in order to provide a desired level of thermal performance.

With reference now to FIGS. 2C and 2D, in various exemplary embodiments, wicking material 120 is configured as a plurality of post-like structures. In some embodiments, posts 211 are formed from wicking material 120 in a three-sided post shape, patterned so that there are vapor spaces 231 between posts 211 and between battery cells 112. Posts 211 can include indents or other shapes to fit securely to the shape of battery cells 112. The three-sided shape of posts 211 allows for an efficient stacking arrangement of battery cells 112. However, any suitable shape for posts 211 may be utilized; moreover, a post 211 may differ in size, shape, materials, or other characteristics from another post 211 in order to provide a selected level of thermal performance at a particular location within vapor chamber 110.

Moreover, any suitable number of posts 211 may be utilized in vapor chamber 110. For example, in vapor chamber 110, each battery cell 112 may be in contact with at least one post 211, or at least two posts 211, or at least three posts 211, or at least four posts 211. Additionally, in vapor chamber 110, certain posts 211 (and/or all posts 211) may extend from an inner surface of vapor chamber 110 all the way to a corresponding inner surface on the opposite side of vapor chamber 110 in order to facilitate effective movement of working fluid 115, regardless of orientation of vapor chamber 110.

In some exemplary embodiments (for example, where battery cells 112 are generally circular) posts 211 may be sized and/or configured to fit entirely into spaces that exist between battery cells 112 when battery cells 112 are packed as close as geometrically possible. In this manner, thermal management system 100 is configured to achieve improved thermal control of battery cells 112 without adding any volume to the spacing between battery cells 112.

With reference now to FIGS. 2E and 2F, in various exemplary embodiments, wicking material 120 is configured with a serial weave pattern. The serial weave walls 212 of wicking material 120 are patterned such that each battery cell 112 is partially contacted while leaving vapor spaces 232 for vapor return. The serial weave pattern can be from a single contiguous strip of wicking material 120, or from separate strips. Moreover, the thickness or other characteristics of the serial weave walls 212 may vary, for example depending on the location of a battery cell 112 within vapor chamber 110.

Turning now to FIG. 2G, in various exemplary embodiments, wicking material 120 is configured with a parallel weave pattern. The parallel weave walls 213 of wicking material 120 are patterned such that each battery cell 112 is are partially contacted while leaving vapor spaces 232 for vapor return. The parallel weave pattern can be from a single contiguous strip of wicking material 120, or from separate strips. Moreover, the thickness or other characteristics of the parallel weave walls 213 may vary, for example depending on the location of a battery cell 112 within vapor chamber 110.

With reference now to FIG. 2H, in various exemplary embodiments wicking material 120 may be configured with a tapered and/or variable thickness. For example, wicking material 120 may vary in thickness as it extends along a battery cell 112. In some exemplary embodiments, wicking material 120 may decrease in thickness as it extends from the base of a battery cell 112 toward the distal end of that battery cell 112. In this manner, the amount of wicking material 120 to be used within vapor chamber 110 may be reduced, offering weight and cost savings. Wicking material 120 may taper evenly; alternatively, wicking material 120 may taper in a step-wise or uneven manner, as desired. Moreover, wicking material 120 may be tapered in order to provide a desired balance between providing a particular amount of capillary action near battery cells 112 while providing a desired amount of available vapor space.

In addition to variable thickness, wicking material 120 may vary in other characteristics as it extends along a battery cell 112. For example, portions of wicking material 120 disposed near the base of a battery cell 112 may be configured to efficiently transfer working fluid 115 along battery cell 112 via capillary action, while portions of wicking material 120 disposed further along battery cell 112 may be configured to facilitate efficient vaporization of working fluid 115.

In thermal management system 100, wicking material 120 may be configured to at least partially account for and/or manage the different thermal conditions experienced by various battery cells 112 depending on their location within vapor chamber 110. Turning now to FIG. 2I, in some exemplary embodiments wicking material 120 is disposed in a non-uniform manner within vapor chamber 110 and/or with respect to a particular battery cell 112. For example, wicking material 120-A may extend a first distance along a side of battery cell 112 that is adjacent to a side wall of vapor chamber 110. Wicking material 120-B may extend a second, longer distance along a side of battery cell 112 that is adjacent to another battery cell 112 in vapor chamber 110 (and/or disposed further from an edge of vapor chamber 110). Stated another way, vapor chamber 110 may be configured to provide additional wicking material 120 for battery cells 112 (and/or sides of battery cells 112) that are at least partially surrounded by other battery cells 112 within vapor chamber 110.

Additionally, in various exemplary embodiments, characteristics other than shape and size may be varied for wicking material 120 in connection with a particular battery cell 112. For example, porosity of wicking material 120 in contact with a first battery cell 112 may vary from the porosity of wicking material 120 in contact with a second battery cell 112. In this manner, battery cells 112 may be provided with different cooling and/or heating rates that are better aligned to the particular locations within vapor chamber 110, ensuring more uniform thermal conditions across battery cells 112. Stated another way, thermal management system 100 may be configured with targeted zone cooling and/or heating capabilities. The amount, shape, and properties of wicking material 120 may vary with the heat profile of a particular battery pack, vary the available rate of removal of heat in a particular portion of a battery pack, and/or the like.

With reference now to FIG. 2J, in various exemplary embodiments, thermal management system 100 is configured to provide differing rates of thermal transfer to battery cells 112, depending at least in part on the location of a particular battery cell 112 in a battery pack. For example, as illustrated in FIG. 2J, in an exemplary battery pack certain battery cells 112 may be considered "edge" cells, for example battery cells 112 disposed at least partially adjacent to a side of the battery pack (and/or having a path to the side of the battery pack which is not interrupted by another battery cell 112). Moreover, in an exemplary battery pack certain battery cells 112 may be considered "inner" cells, for example battery cells 112 disposed adjacent to at least one edge cell but not adjacent to a side of the battery pack. Yet further, in an exemplary battery pack certain battery cells 112 may be considered "center" cells, for example battery cells 112 disposed adjacent only to inner cells and/or other center cells. In various exemplary embodiments, thermal management system 100 may be configured to provide a higher rate of thermal transfer to center battery cells 112 as compared to inner battery cells 112 and/or edge battery cells 112 (for example, via use of additional wicking material 120, use of wicking material 120 facilitating more efficient vaporization of working fluid 115, deeper insertion of battery cell 112 into vapor chamber 110, and/or the like). Moreover, thermal management system 100 may be configured to provide a higher rate of thermal transfer to inner battery cells 112 as compared to edge battery cells 112. Additionally, system 110 may be configured to provide differing rates of thermal transfer as between two specific center battery cells 112, or as between two specific inner battery cells 112, and/or as between two specific edge battery cells 112. It will be appreciated that the foregoing examples of targeted thermal management of battery cells 112 are merely illustrative; stated generally, in thermal management system 100 battery cells 112 needing additional heating and/or cooling may be provided with such additional thermal transfer in order to provide conditions more closely approximating isothermal conditions within vapor chamber 110.

Additionally, thermal management system 100 may be configured to provide differing rates of thermal transfer to battery cells 112 based at least in part on a direction and/or path of thermal fluid flow associated with cold plate 130. For example, during operation of heat pump 150, thermal fluid is pumped across cold plate 130, for example in a serpentine-like path. When thermal management system 100 is operative in a cooling mode, the thermal fluid gains heat as it traverses cold plate 130. Accordingly, the thermal fluid is at a higher temperature when it exits contact with cold plate 130 as compared to when it begins contact with cold plate 130. Accordingly, battery cells 112 disposed, with respect to cold plate 130, at or near the area where the thermal fluid begins contact with cold plate 130 ("entry" cells), may be provided with a different configuration of associated wicking material 120 as opposed to battery cells 112 disposed at or near the area where the thermal fluid exits contact with cold plate 130 ("exit" cells). This is because entry cells may obtain a higher degree of direct conductive cooling from cold plate 130 than exit cells. In this manner, via operation of thermal management system 100, battery cells 112 in a battery pack may experience conditions closer to true isothermic conditions.

In thermal management system 100, in some exemplary embodiments wicking material 120 comprises a single type, layer, and/or configuration of material. In other exemplary embodiments, wicking material 120 may be configured as multiple layers and/or segments or portions. Wicking material 120 in a first portion may comprise a different material and/or characteristic from wicking material 120 in a second portion. For example, a wicking material 120 characteristic such as a pore size, material density, fiber thickness, and/or the like may differ from portion to portion. In various exemplary embodiments, pore sizes in wicking material 120 may range from about 1 micrometer (μm) to about 100 μm. In this manner, within vapor chamber 110, wicking action may be increased in certain portions, while phase-change action may be facilitated in certain other portions. In this manner, distribution of working fluid 115 within vapor chamber 110 may be optimized in order to more effectively cool battery cells 112.

With reference now to FIGS. 3A through 3D, in some exemplary embodiments wicking material 120 is configured with a first layer and a second layer (more generally, a first wicking portion 322 and a second wicking portion 326). First wicking portion 322 may be configured to rapidly and/or effectively transport working fluid 115 to second portion 326 (for example, a sideways direction with respect to a series of battery cells 112; i.e., for generally cylindrical battery cells 112, a direction generally perpendicular to the cylindrical axis). First wicking portion 322 may be configured with holes or apertures 323 therethrough in order to fit between and/or among battery cells 112. In these exemplary embodiments, the ends of battery cells 112 may be in direct contact with cold plate 130, with no wicking, material 120 disposed therebetween. In this manner, conductive thermal transfer from the end of battery cells 112 to cold plate 130 may be facilitated, while still allowing for efficient distribution of working fluid 115 within vapor chamber 110 via operation of wicking material 120.

Second wicking portion 326 may be configured to primarily facilitate distribution of working fluid 115 in a second direction (for example, along the length of a particular battery cell 112) and/or to more effectively facilitate vaporization of working fluid 115. In some exemplary embodiments, second wicking portion 326 may be configured as a series of generally triangular posts 327, each having an opening 328 therethrough to function as a vapor path. Posts 327 may also have spaces 329 between individual posts 327 in order to provide additional vapor paths. By utilizing wicking material 120 configured with multiple portions, improved distribution of working fluid 115 may be realized, resulting in better thermal distribution within vapor chamber 110.

Turning now to FIGS. 4A through 4D, in some exemplary embodiments, a first wicking portion 422 of wicking material 120 is configured to pass underneath and/or be disposed between battery cells 112 and a side, top, or bottom of vapor chamber 110. In these approaches, first wicking portion 422 may be configured absent any holes or apertures for battery cells 112 to pass through, and second wicking portion 426 may be configured in a suitable manner, for example similar to second wicking portion 326 (i.e., with posts 427 and openings 428). Moreover, first wicking portion 422 may be configured to roughly approximate the outline of a group of battery cells 112, as shown.

In yet other exemplary embodiments, a first wicking portion 522 of wicking material 120 may be configured as a sheet or plane of uninterrupted material, as illustrated in FIGS. 5A through 5D. Second wicking portion 526 may be configured similarly to second wicking portion 326 and/or 426. Moreover, first wicking portion 322/422/522 and corresponding second wicking portion 326/426/526 may be manufactured separately from one another. Alternatively, first wicking portion 322/422/522 and corresponding second wicking portion 326/426/526 may be manufactured together, for example by injection molding.

It will be appreciated that the multiple-portion approaches disclosed in FIGS. 3A through 5D are compatible with, and may be used together with, the various configurations and geometries for wicking material 120 disclosed in connection with the discussion of FIGS. 2A through 2J. Moreover, it will be appreciated that, during operation of thermal management system 100, first wicking portion 322/422/522 functions to provide more uniform distribution of working fluid 115 within vapor chamber 110, particularly when vapor chamber 110 is disposed at a slanted and/or sideways orientation with respect to gravity.

As compared to prior thermal management approaches, principles of the present disclosure allow various advantages, for example improved cooling performance, weight savings, and/or the like. For example, for the embodiment illustrated in FIGS. 3A through 3D, the density of a single post 327 is less than one quarter the density of aluminum, while still achieving at least 3 times the thermal performance. Additionally, the unique placement of posts 327 allows battery cell 112 spacing to be governed by manufacturability of cell retainers rather than posts 327. Moreover, posts 327 can even accommodate the minimized spacing achieved when adjacent battery cells 112 touch one another. Stated another way, in thermal management system 100, battery cells 112 may be positioned to achieve the maximum possible volumetric efficiency of 90.69% (for cylindrical cells), while still allowing for effective thermal management of battery cells 112 via operation of vapor chamber 110, wicking material 120, and so forth. Moreover, in thermal management system 100, battery cells 112 may be positioned to achieve a volumetric efficiency of between 80% and 90.69%, or more preferably between 85% and 90.69%, and still more preferably between 88% and 90.69%.

In various exemplary embodiments, the mass of posts 327 associated with a particular battery cell 112 in vapor chamber 110 is less than 0.5% of battery cell 112, permitting extremely high energy densities. In some exemplary embodiments, the mass of all wicking material 120 within vapor chamber 110 is less than 0.5% of the mass of all battery cells 112 that are thermally managed via operation of vapor chamber 110. Moreover, in various exemplary embodiments, the mass of all wicking material 120 within vapor chamber 110 is between about 0.1% and about 1% of the mass of all battery cells 112 that are thermally managed via operation of vapor chamber 110.

With reference now to FIG. 6, in various exemplary embodiments, principles of the present disclosure may be applied at the level of an individual battery cell 112, rather than at the level of a pack of battery cells 112. For example, in order to provide thermal management of a battery cell 112, in some exemplary embodiments a two-phase thermal management system is coupled to an end of a single battery cell 112. In an exemplary embodiment, a "coldwell" 610 is coupled to an end of battery cell 112, forming a fully enclosed space between the outer wall of coldwell 610 and the end of battery cell 112. Coldwell 610 contains wicking material 120 disposed at least partially along the bottom and edges thereof; within coldwell 610, wicking material 120 is also in contact with the end of battery cell 112. Coldwell 610 contains a selected amount of working fluid 115. During operation, working fluid 115 vaporizes at or near the interface between battery cell 112 and wicking material 120, and condenses generally in the "condensation region" illustrated in FIG. 6. Depending on the orientation of battery cell 112 and coldwell 610, capillary action (and/or gravity) draws condensed working fluid 115 through wicking material 120 back towards the surface of battery cell 112, and the cycle repeats. Coldwell 610 may be coupled to any suitable additional components (for example, a heat pump, fan, or the like) in order to remove heat therefrom or provide heating thereto. It will be appreciated that a coldwell 610 may be coupled to each battery cell 112 in a battery pack (or only a portion of battery cells 112 in a battery pack) in order to provide thermal regulation; moreover, characteristics of an associated coldwell 610 may vary among battery cells 112 in a battery pack.

With reference now to FIGS. 7A through 7C, in various exemplary embodiments, two-stage cooling principles of the present disclosure may be utilized to provide thermal management to power stage components, such as battery pack controller circuitry, motor or generator electronic control systems, and/or the like. FIGS. 7A through 7C show an example of a two-stage cooling system utilized for cooling power stage components 730, such as battery pack controller circuitry or motor/generator electronic control systems. External heat pump 750 provides cooling to the entire power stage system. The power stage components 730 are at least partially encompassed by a wicking material 720 that wicks a working fluid to the power stage components 730 to provide cooling. Channels 760 can be incorporated in wicking material 720 to act as vapor chambers connecting the power stage components 730 to the external heat pump 750, allowing the vapor to be cooled and condensed by external heat pump 750 for liquid phase return to power stage components 730 by capillary action through wicking material 720.

When in operation, vapor chamber 110 has upper limits to its heat transport capability governed by one or more factors. In some exemplary embodiments, operation of vapor chamber 110 may be affected by the following factors: a capillary limit, entrainment limit, boiling limit, sonic limit, and/or viscous limit. Capillary limit indicates the driving pressure for liquid circulation, i.e., the ability of wicking material 120 to transfer working fluid 115 via capillary action. Entrainment limit: in operation, the vapor velocity increases with temperature and may be sufficiently high to produce shear force effects on the return flow of liquid working fluid 115 from a condensation region to a vaporization region, which causes entrainment of the liquid by the vapor, leading to fluid flow shortages and eventually to dry out of portions of wicking material 120. Boiling limit: a point reached when temperature difference exceeds the degree of superheat sustainable in relation to nucleate boiling conditions; the onset of boiling within wicking material 120 interferes with liquid circulation of working fluid 115 and can lead to dry out of portions of wicking material 120. Sonic limit: at a temperature above the vapor pressure limit, the vapor velocity can be comparable with sonic velocity (i.e., Ma close to, equal to, and/or exceeding 1) and the vapor flow becomes "choked", preventing further increases in heat transfer capacity. A viscous limit typically occurs at low temperature, and represents a measure of cold start capability of vapor chamber 110. In various exemplary embodiments, operation of thermal management system 100 is governed by an associated capillary limit; stated another way, thermal management system 100 is configured to reach a capillary limit prior to reaching any other limit.

Table 1 below presents exemplary operational values for an exemplary thermal management system 100 wherein cold plate 130 is disposed below vapor chamber 110 (i.e., an "antigravity" orientation, for example as illustrated in FIGS. 1A and 1C). At lower operating temperatures, the viscous limit is dominant and thus restricts the vapor flow. The saturated temperature of vapor chamber 110 is optimally designed, and thus in operation the capillary limit becomes the limiting factor. In thermal management system 100, components are configured to overcome not only gravity but also impart a sufficient force to pull working fluid 115 back to a desired height along battery cells 112. As shown in Table 1, in this exemplary embodiment, maximum performance of vapor chamber 110 ranges from about 9.26 W to about 28.03 W of heat loss at battery cell 112 level, depending on different configurations and operating conditions. Accordingly, in various exemplary embodiments, thermal management system 100 may achieve between about 0.018 K/W to about 0.054 K/W thermal resistance (or about 617.33 watts per meter-kelvin (W/mK) to about 5,606 W/mK effective thermal conductivity) with near isothermal conditions within vapor chamber 110.

TABLE 1

Vapor Chamber 110 Operating Limits - Exemplary Configuration

| Vapor Chamber Operating Limits | Operating Temperature (C.) | | |
|---|---|---|---|
| (W) | Lower Limit ° C. | Optimal ° C. | Upper Limit ° C. |
| Capillary Limit | 9.3 | 28.03 | 49.16 |
| Entrainment Limit | 184.27 | 826.79 | 1596.86 |
| Boiling Limit | 7897.12 | 373.59 | 76.01 |
| Sonic Limit | 15.81 | 340.27 | 1905.87 |
| Viscous Limit | 0.04 | 31.41 | 481.79 |

As compared to prior battery thermal management systems, thermal management system 100 achieves an extremely high level of cooling at the battery cell 112 level. In some exemplary embodiments, thermal management system 100 provides about 1500 W/mK of thermal transfer at the battery cell 112 level (i.e., a thermal transfer rate comparable to direct contact with diamond). In other exemplary embodiments, thermal management system 100 provides thermal transfer at the battery cell 112 level of between about 500 W/mK (i.e., a level of thermal transfer slightly above that of direct contact with copper) to about 2000 W/mK (i.e., a level of thermal transfer about 500% that of direct contact with copper). Moreover, it will be appreciated that in various exemplary embodiments, thermal management system 100 provides a level of thermal transfer at the battery cell 112 level that is equivalent to between about 3 times greater and about 5 times greater than direct contact with various solid materials commonly utilized for conductive heat transfer, such as aluminum, copper, or the like.

Moreover, as compared to prior approaches, principles of the present disclosure enable a high energy density at the battery pack level. For example, vapor chamber 110 may be configured to be lightweight. This contributes to much higher energy density at the battery pack level. For instance, the mass of vapor chamber 110 at battery pack level in various exemplary embodiments ranges from about 1.45 kg to about 2.9 kg (for a 98 kWh battery pack) depending on the configuration of wicking material 120 in vapor chamber 110. It will be appreciated that total volumetric energy density can be maximized with high energy density cylindrical cells, as the posts of wicking material 120 do not occupy any additional space. Consequently, there are no losses in volumetric energy density. Compared to various existing approaches, when utilizing identical battery cells of identical capacity, an exemplary embodiment of thermal management system 100 achieves at least an additional 56 Wh/L of volumetric energy density (an increase of >12%), and advantages of principles of the present disclosure only increase for packs of higher capacity.

For example, in a volume of approximately 105 L, an exemplary battery pack can achieve >55 kWh of storage, whereas prior approaches utilizing the same battery chemistry and battery cell dimensions could only achieve about 46 kWh. In various exemplary embodiments, in thermal management system 100 battery cells 112 may be disposed with a cell spacing of between about 0 mm (i.e., adjacent battery cells 112 touch one another) to about 2 mm. In contrast, prior cooling approaches often require battery cells to be spaced at least 2 mm apart.

Moreover, as compared to prior two-phase cooling approaches, gravimetric energy density in exemplary embodiments of thermal management system 100 is better. In some exemplary embodiments, improvements in gravimetric energy density may range from about 0.5% to about 15%; in other exemplary embodiments, improvements in gravimetric energy density may range from about 5% to about 15%; and in yet other exemplary embodiments, improvements in gravimetric energy density may range from about 8% to about 12%. Moreover, as compared to prior conductively coupled and single phase cooling solutions, exemplary systems disclosed herein offer significantly higher gravimetric and volumetric energy densities.

In accordance with principles of the present disclosure, an exemplary battery thermal management system may desirably be utilized in connection with an electric vehicle or item of mobile industrial equipment, for example an automobile, tractor, truck, trolley, train, van, quad, golf cart, scooter, boat, airplane, drone, forklift, telehandler, backhoe, and/or the like.

In various exemplary embodiments, thermal management system 100 may utilize additional structures and/or components to facilitate movement and/or distribution of vapor and working fluid 115. With reference now to FIGS. 8A through 8C, in various exemplary embodiments a thermal management system 100 may be configured to use one or more capillary tubes 114. Capillary tubes 114 facilitate condensation of working fluid 115 from vapor to liquid state. Additionally, capillary tubes 114 facilitate more even distribution of working fluid 115 in thermal management system 100. Capillary tubes 114 also provide improved heat transfer from (and/or to) battery cells 112 due to oscillation resulting in movement of working fluid 115 through capillary tubes 114; stated another way, capillary tubes 114 facilitate forced convection in addition to phase change heat transfer. Moreover, capillary tubes 114 convert a portion of thermal energy arising from battery cells 112 into kinetic energy of working fluid 115 slugs and vapor bubbles. Yet further, capillary tubes 114 facilitate a stable and/or generally uniform vapor pressure in thermal management system 100 during operation thereof; stated another way, in thermal management system 100 capillary tubes facilitate a reduced pressure drop from evaporator to condenser.

In various exemplary embodiments, a capillary tube 114 comprises a thermally conductive material, such as aluminum, copper, and/or the like. Capillary tube 114 may be electrically insulated and/or isolated, for example via a dielectric coating such as aluminum oxide. In some exemplary embodiments, capillary tube 114 may comprise a durable material such as plastic. In general, a capillary tube 114 may be formed from a material that is compatible with and/or non-reactive with working fluid 115. Capillary tube 114 may comprise a circular tube; alternatively, capillary tube 114 may have an oval cross-section, a rectangular cross-section, or other suitable shape. A capillary tube 114 may have multiple intake portions leading to a common main portion (i.e., in an arrangement similar to tributaries joining a river). Moreover, a capillary tube 114 may have a common main portion leading to multiple return portions (i.e., in an arrangement similar to a river fanning out into multiple paths at a delta). Stated another way, a capillary tube 114 may have a single intake end and/or return end; alternatively, a capillary tube 114 may have multiple intake ends and/or return ends. Moreover, capillary tube 114 may vary in diameter, wall thickness, or other characteristics along its path, as desired.

A diameter for a particular capillary tube 114, a wall thickness for a particular capillary tube 114, and/or the number of capillary tubes 114 utilized in a particular thermal management system 100, may be selected based on one or more of: a specified heat load in thermal management system 100, length of capillary tube 114, surface tension of working fluid 115, inclination angle of capillary tube 114, vapor pressure in vapor chamber 110, number of turns in capillary tube 114, a desired horizontal and/or vertical flow rate through capillary tube 114, number of battery cells 112 contained at least partially within vapor chamber 110, and/or the like. Moreover, a capillary tube 114 may be configured with internal and/or external components, for example a textured inner and/or outer surface, in order to facilitate condensation of vapor within capillary tube 114 and/or transport of working fluid 115 through capillary tube 114.

In an exemplary embodiment, capillary tube 114 comprises copper tubing having an inner diameter of 3 mm. In another exemplary embodiment, capillary tube 114 comprises copper tubing having an inner diameter of 5 mm. In various exemplary embodiments, capillary tube 114 comprises a metal tubing having an inner diameter not exceeding 12 mm. In yet another exemplary embodiment wherein working fluid 115 comprises ethanol and the interior of vapor chamber 110 is subject to 0.18 bar of vapor pressure (resulting in a boiling point of ethanol of about 40 degrees Celsius), capillary tube 114 is configured with an inner diameter of 3.6 mm.

During operation of thermal management system 100, condensation within capillary tubes 114 results in formation of "slugs" of working fluid 115 separated by bubbles of vapor/air. Bubble and slug formation in capillary tubes 114 leads to perturbations in the operation of fluid flow therethrough. Accordingly, in a thermal management system 100 configured with capillary tubes 114, the configuration of capillary tubes 114 may be adjusted to obtain a desired "filling ratio", i.e., a ratio of amount of working fluid 115 to vapor/air in capillary tubes 114. A higher ratio of bubbles to slugs (i.e., a lower overall amount of working fluid 115 in capillary tube 114) is typically achieved via a smaller diameter for capillary tube 114 and results in lower mass flow of working fluid 115 for sensible heat transfer. A higher ratio of slugs to bubbles (i.e., a higher overall amount of working fluid 115 in capillary tube 114) is typically achieved via a larger diameter for capillary tube 114 and results in lower oscillations while reducing pumping action and heat transfer. Accordingly, capillary tube 114 may be sized to obtain a desired trade-off for optimizing operation of thermal management system 100, for example a desired balance between pumping action and mass flow.

Capillary tubes 114 may be disposed within thermal management system 100 in various ways. In an exemplary embodiment, thermal management system 100 utilizes one or more capillary tubes 114 having an intake end and a return end disposed on a common side of vapor chamber 110. A capillary tube 114 passes into, passes through, and/or is thermally coupled to a condensation chamber 140. When thermal management system 100 is operative, vapor in capillary tube 114 condenses into the liquid form of working fluid 115, leading to alternating bubbles of vapor/air and slugs of working fluid 115 in capillary tube 114. Vapor pressure generated in vapor chamber 110 forces the slugs through the capillary tube 114, resulting in outflow of working fluid 115 from the return end of capillary tube 114 and thus depositing condensed working fluid 115 at the base of posts 211.

Turning now to FIGS. 9A through 9C, in some exemplary embodiments thermal management system 100 utilizes one or more capillary tubes 114 having an intake end or ends on a first side of vapor chamber 110, and a return end or ends on an opposing side (or orthogonal side, or, in general, any different side) of vapor chamber 110. For example, with reference to FIG. 9C, a thermal management system 100 having a generally rectangular vapor chamber 110 may be configured with two capillary tubes 114. The intake end of the first capillary tube 114 and the return end of the second capillary tube 114 may be positioned generally on one side of rectangular vapor chamber 110. On the opposite side of the rectangle are disposed the return end of the first capillary tube 114 and the intake end of the second capillary tube 114. In this manner, a supply of freshly condensed working fluid 115 is introduced to two opposing sides of vapor chamber 110.

It will be appreciated that, in various exemplary embodiments, multiple capillary tubes 114 may be utilized to direct flow of working fluid 115 in thermal management system 100; such arrangements may be symmetrical, asymmetrical, looped, or otherwise arranged as desired to distribute working fluid 115 within thermal management system 100. For example, with momentary reference to FIG. 9D, in one exemplary embodiment thermal management system 100 may be configured with a 4-sided vapor chamber 110 and may utilize 4 capillary tubes 114. A first capillary tube 114-A has an intake end on side S1 of vapor chamber 110, and a return end on adjacent side S2. A second capillary tube 114-B has an intake end on side S2 and a return end on adjacent side S3, a third capillary tube 114-C has an intake end on side S3, and a return end on adjacent side S4, and finally, fourth capillary tube 114-D has an intake end on side S4, and a return end on adjacent side S1. During operation of thermal management system 100, working fluid 115 is circulated in a round-robin manner through the four capillary tubes 114, leading to a more even distribution of working fluid 115 in thermal management system 100 and thus affording more balanced thermal management of battery cells 112 utilized therein.

With reference now to FIGS. 10A and 10B, in some exemplary embodiments thermal management system 100 is configured with capillary tubes 114, as well as with vapor/fluid passageways or paths between vapor chamber 110 and a condensation chamber 140. In these configurations, vapor is collected via capillary tubes 114 and introduced into a common pool of working fluid 115 within condensation chamber 140. In condensation chamber 140, working fluid 115 is distributed and pooled across condensation chamber 140 via operation of gravity and via surface tension of working fluid 115 (i.e., similar to how a fluid distributes across the bottom of a container as the container is filled); additionally, working fluid 115 may be distributed within condensation chamber 140 responsive to acceleration, or responsive to inclination of condensation chamber 140 away from horizontal. Posts 211 extend into the pool of working fluid 115 contained in condensation chamber 140 and extract working fluid 115 via capillary action, raising working fluid 115 into vapor chamber 110. Thereafter, working fluid 115 evaporates to cool battery cells 112 as discussed in various embodiments hereinabove.

It will be appreciated that in these exemplary embodiments, cold plate 130 is configured with a plurality of apertures 131 to allow posts 211 to pass through cold plate 130 and access working fluid 115 in condensation chamber 140. Stated another way, in these exemplary embodiments cold plate 130 is configured as a perforated barrier disposed between vapor chamber 110 and condensation chamber 140. However, it will be appreciated that cold plate 130 still remains sealed around the apertures 131, such that coolant may pass through cold plate 130 without leaking into vapor chamber 110 and/or intermingling with working fluid 115.

In various exemplary embodiments, apertures 131 are sized to correspond to spaces between battery cells 112 in vapor chamber 110. Stated another way, apertures 131 may be sized in a manner that does not require expanded spacing between battery cells 112, thus allowing an exemplary battery pack to maintain a desired energy density.

In various exemplary embodiments, apertures 131 are configured as generally circular holes when viewed perpendicular to the plane of cold plate 130. In other exemplary embodiments, apertures 131 are configured to have the shape of one or more of a triangle, Reuleaux triangle, pseudotriangle, square, rectangle, oval, and/or combinations of the same. In various exemplary embodiments, apertures 131 are configured with a diameter (and/or longest dimension) not exceeding 6 mm. In one exemplary embodiment, apertures 131 comprises circular holes having a diameter of 4 mm.

It will be appreciated that, in thermal management system 100, apertures 131 may be configured with different shapes and/or sizes from one another. For example, in thermal management system 100, a first aperture 131 having a post 211 disposed therein may be configured as a circular hole having a diameter of 4 mm. A second aperture 131 that does not have a post 211 disposed therein may be configured as a circular hole having a diameter of 2 mm. In another example, a first aperture 131 having a post 211 disposed therein may be configured as a roughly pseudotrianglular hole having a distance between vertices of about 5 mm, in this example, a second aperture 131 that does not have a post 211 disposed therein may be configured as a circular hole having a diameter of 3 mm. Moreover, in thermal management system 100, any suitable combinations of aperture 131 sizes and shapes may be utilized, for example in a checkerboard, striped, staggered, or other suitable pattern, in order to provide for circulation of working fluid 115 and vapor within thermal management system 100.

In various exemplary embodiments, posts 211 are configured to be generally flush with the edges of corresponding apertures 131. Stated another way, a post 211 may fully fill or occupy the corresponding aperture 131 through which it is disposed. In some exemplary embodiments, a post 211 may only partially fill or occupy an aperture 131. For example, a post 211 may be configured as a hollow cylinder and thus occupy all edges of a corresponding circular aperture 131, while leaving a smaller cylindrical area of aperture 131 unoccupied. Moreover, a post 211 may be configured as a cylinder having a notch out of the side thereof, such that post 211 occupies most of a circular aperture 131 while leaving a small void along one edge portion of that aperture 131. In this manner, flow of vapor and/or working fluid 115 in either direction through aperture 131 is facilitated, for example in order to facilitate a more constant vapor pressure (and thus, a more constant saturation temperature point) in all relevant locations in thermal management system 100.

In some exemplary embodiments, a post 211 is configured to be generally flush with both the edges of a corresponding aperture 131 and the edges of one or more associated battery cells 112. For example, a post 211 may have a generally cylindrical form factor for a first portion of post 211 (i.e., a portion intended for insertion into an aperture 131), and, for a second portion of post 211, a form factor of a pseudotriangle having truncated ends (i.e., a form factor intended to fit in the space between closely packed cylindrical battery cells 112, for example as depicted in FIG. 2C). In these embodiments, the length of the first portion of post 211 may govern the distance to which post 211 is insertable through corresponding aperture 131.

In various exemplary embodiments, posts 211 may extend through apertures 131 such that the bottom of posts 211 contact the far side of condensation chamber 140 (i.e., a portion of each post 211 traverses from one side of condensation chamber 140 all the way to the opposing side). In this manner, posts 211 may absorb working fluid 115 pooled at any depth in condensation chamber 140. In other exemplary embodiments, posts 211 may extend through apertures 131 such that the bottom of posts 211 reach only partway into condensation chamber 140, instead of fully traversing condensation chamber 140. In these configurations, when condensation chamber 140 is disposed horizontally, a minimum pool depth of working fluid 115 will be present in condensation chamber 140 before the pool of working fluid 115 contacts the bottom of posts 211. This configuration facilitates an even distribution of working fluid 115 in condensation chamber 140, as working fluid 115 is permitted to flow laterally in all directions. In contrast, in some embodiments where posts 211 extend all the way to the opposing wall of condensation chamber 140, posts 211 may absorb and transport working fluid 115 vertically at a quicker rate than working fluid 115 can flow laterally within condensation chamber 140, thus leading to "dry" or "drier" posts 211 (i.e., posts 211 having reduced access to working fluid 115; typically, such posts may arise within the central area of an array of posts 211 in thermal management system 100).

Moreover, in some exemplary embodiments, a combination may be utilized wherein some posts 211 extend only partially into condensation chamber 140, and other posts 211 fully traverse condensation chamber 140. For example, alternating posts 211 may be interleaved, such as in a checkerboard pattern. In another example, every third post 211 in a line of posts 211 may fully traverse condensation chamber 140. In yet another example, every third post 211 in a line of posts 211 may extend only partway into condensation chamber 140. In yet other examples, posts 211 fully traversing condensation chamber 140 and posts 211 extending only partway into condensation chamber 140 may be arranged in stripes, spirals, concentric geometric shapes, and/or the like. In these combined approaches, unimpeded lateral flow of working fluid 115 within condensation chamber 140 is provided, while still ensuring a sufficient rate of transport of working fluid 115 upwards into vapor chamber 110. Moreover, in thermal management system 100, any suitable arrangement of posts 211 fully traversing condensation chamber 140 and posts 211 extending only partway into condensation chamber 140 may be utilized.

With reference now to FIGS. 11A and 11B, in sonic exemplary embodiments, in thermal management system 100, certain apertures 131 are not partially or fully filled with a post 211, but are instead left as unobstructed passageways or paths linking vapor chamber 110 and condensation chamber 140. In one example, alternating apertures 131 may be left empty, for example in a checkerboard pattern. In another example, every third aperture 131 in a line of apertures 131 may be left empty. In yet another example, cold plate 130 may be configured with an array of apertures 131 such that empty apertures 131 and apertures 131 filled with posts 211 form concentric rings or outlines generally centered in the middle of cold plate 130. In still another example, empty apertures 131 may be arranged in alternating rows or stripes with apertures 131 filled with posts 211. Moreover, the selection of apertures 131 to be left empty, and the selection of apertures 131 to be occupied by posts 211, may be any suitable pattern, for example in order to achieve a desired circulation of vapor and working fluid 115 within thermal management system 100.

It will be appreciated that, in various exemplary embodiments, thermal management system 100 may utilize both unobstructed (and/or partially obstructed) apertures 131 and capillary tubes 114. In some exemplary embodiments, thermal management system 100 may utilize only unobstructed (and/or partially obstructed) apertures 131, and may be configured absent any capillary tubes 114. In yet other exemplary embodiments, thermal management system 100 may utilize capillary tubes 114, and may be configured absent any unobstructed (and/or partially obstructed) apertures 131.

In various exemplary embodiments, in thermal management system 100, capillary tubes 114 may be positioned, shaped, and/or otherwise configured based at least in part on a direction and/or path of coolant (more generally, thermal fluid) flow in an associated cold plate 130. For example, during operation of heat pump 150, thermal fluid is pumped across cold plate 130, for example in a serpentine-like path. When thermal management system 100 is operative in a cooling mode, the thermal fluid gains heat as it traverses cold plate 130. Accordingly, the thermal fluid is at a higher temperature when it exits contact with cold plate 130 as compared to when it begins contact with cold plate 130. Thus, in some exemplary embodiments, thermal management system 100 is configured with one or more capillary tubes 114 having return ends disposed generally on a common side of vapor chamber 110 as the portion of cold plate 130 where thermal fluid exits cold plate 130 (i.e., when thermal management system 100 is operative in a cooling mode, the portion that is the "hottest" portion of cold plate 130). In this manner, an increased supply of working fluid 115 may be supplied to an area in vapor chamber 110 where direct cooling of battery cells 112 by cold plate 130 is at a minimum, thus affording increased cooling to battery cells 112 in that area via phase change of working fluid 115. Additionally, in some exemplary embodiments, the dimensions, lengths, paths, number of intake ends, number of return ends, and/or other characteristics of capillary tubes 114 in thermal management system 100 may be selected based on characteristics of thermal fluid flow in cold plate 130. For example, a particular capillary tube 114 may traverse and/or travel along a portion of cold plate 130 in a direction generally parallel to thermal fluid flow in cold plate 130. Another particular capillary tube 114 may traverse and/or travel along a portion of cold plate 130 in a direction generally counter or opposite to the direction of thermal fluid flow in cold plate 130. Stated generally, in thermal management system 100, capillary tubes 114 may be utilized to more closely approximate isothermal conditions within vapor chamber 110 and/or provide approximately equal cooling capacity for each battery cell 112 in thermal management system 100 (for example, cooling capacity for battery cells 112 varying by no more than 10% from highest to lowest capacity).

Turning now to FIGS. 12A through 12C, in various exemplary embodiments, thermal management system 100 may utilize an array of posts 211 where the length, thickness, material, or other characteristics of a particular post 211 varies depending at least in part on the position of that particular post 211 in the array. For example, with reference now to FIG. 12A, which shows a view along a length of a thermal management system 100, it can be seen that a particular post 211-A disposed near the outer edge of the array of posts 211 may be configured with a lower height than another post 211-B disposed near the center of the array of posts 211. Posts 211 nearer the center of the array may be configured with a greater height, for example in order to provide increased cooling capacity to associated battery cells 112. Similarly, with reference to FIG. 12B, which shows a view along a width of thermal management system 100, it can be seen that post 211-C is shorter than post 211-D, which in turn is shorter than post 211-E. With reference to FIG. 12C, which shows a perspective view of the array illustrated in FIGS. 12A and 12B, it can be seen that variations in height of posts 211 may be applied across both length and width of thermal management system 100. In this manner, posts 211 in thermal management system 100 may be configured to provide appropriate cooling capacity to associated battery cells 112, particularly in areas located generally in the center of thermal management system 100 where heat loads tend to be greatest.

The heights of posts 211 may vary in a linear manner, a curved manner, a stepwise manner, or any other suitable manner. For example, the heights of posts 211 may have a first value in a first ring-shaped area disposed generally along the outer edge of the array of posts 211, and a second, higher value in the inner area enclosed by the first ring-shaped area. In another example, moving along a length of thermal management system 100, posts 211 may taper up in height, reach a maximum, and at some point thereafter taper back down, resulting in a somewhat triangular and/or trapezoidal cross-section (i.e., as illustrated in FIGS. 12A and 12B).

It will be appreciated that the exemplary embodiments disclosed in FIGS. 8A through 12B are compatible with, and may be used in any suitable combination with, the various system configurations and orientations disclosed in connection with the discussion of FIGS. 1A through 1E.

In an exemplary embodiment, a vapor chamber for transferring heat between the vapor chamber and a heat pump comprises an outer housing, a wicking material contained within the outer housing, and a working fluid at least partially absorbed by the wicking material. The vapor chamber is configured with a plurality of apertures to accept portions of a plurality of battery cells therein. The vapor chamber facilitates close packing of the plurality of battery cells. The battery cells may be disposed less than 1 mm from one another. The vapor chamber is operative to cool the battery cells, regardless of the orientation of the vapor chamber with respect to gravity. A battery cell in the plurality of battery cells has a first end and a second end distal from the first end, the first end and second end having a length therebetween. The wicking material may be in contact with 10% to 50% of the length of the battery cell. The wicking material may be in contact with the battery cell starting at the first end and extending along 5% to 50% of the length of the battery cell. The wicking material may vary in thickness along the length of the battery cell. The wicking material may vary in porosity along the length of the battery cell. The wicking material may be configured as a contact ring having a honeycomb shape. The wicking material may be configured with a parallel weave configuration. The wicking material may be configured with a serial weave configuration. The battery cells may be conductively coupled to a cold plate forming an edge of the vapor chamber. The vapor chamber may be coupled to a heat pump via a cold plate.

In another exemplary embodiment, a method for cooling a battery pack comprising a plurality of battery cells comprises identifying, in the battery pack, a set of battery cells that are edge cells. The method further comprises identifying, in the battery pack, a set of battery cells that are inner cells. The method further comprises identifying, in the battery pack, a set of battery cells that are center cells. The method further comprises coupling the plurality of battery cells to a vapor chamber, disposing a working fluid within the vapor chamber, and disposing a wicking material in the vapor chamber. The method further comprises coupling, to the edge cells, a first amount of the wicking material, coupling, to the inner cells, a second amount of the wicking material different than the first amount, and coupling, to the center cells, a third amount of the wicking material different than the first amount or the second amount. The method may further comprise identifying, in the battery pack, a set of battery cells that are entry cells, and identifying, in the battery pack, a set of battery cells that are exit cells. The method may further comprise configuring the wicking material such that the amount of wicking material coupled to the entry cells differs from the amount of wicking material coupled to the exit cells. The method may further comprise coupling, to the edge cells, a first amount of the wicking material having a first wicking characteristic, coupling, to the inner cells, a second amount of the wicking material having a second wicking characteristic different from the first wicking characteristic, and coupling, to the center cells, a third amount of the wicking material having a third wicking characteristic different from the first wicking characteristic or the second wicking characteristic.

In an exemplary embodiment, a method for thermal regulation of a battery pack comprises disposing a plurality of battery cells at least partially within a vapor chamber, the plurality of battery cells forming a battery pack, and the vapor chamber comprising a housing, a wicking material, and a working fluid; and contacting each of the plurality of battery cells with at least a portion of the wicking material. During charging or discharging of the battery pack, the working fluid changes phase within the vapor chamber in order to carry heat away from the battery cells. The method may further comprise coupling a heat pump to the vapor chamber via a cold plate. The vapor chamber may be operative to carry heat away from the battery cells without regard to the orientation of the vapor chamber with respect to gravity. The method may further comprise monitoring, during charging or discharging of the battery pack, at least one of temperature or pressure within the vapor chamber; and responsive to the monitoring, adding or removing an amount of working fluid to the vapor chamber.

In another exemplary embodiment, a thermal management system for an individual battery cell comprises a coldwell comprising a housing, a wicking material, and a working fluid; and a battery cell disposed at least partially within the coldwell such that the bottom of the battery cell contacts the wicking material. The interface between the battery cell and the housing is sealed to retain the working fluid within the housing, and the working fluid changes phase within the coldwell in order to carry heat away from the battery cell.

In another exemplary embodiment, a thermal management system for a battery pack comprises a vapor chamber comprising a housing, a wicking material, and a working fluid; a cold plate coupling the vapor chamber to a heat pump; the battery pack comprising a plurality of battery cells, each of the plurality of battery cells disposed at least partially within the vapor chamber; a condensation chamber coupled to the cold plate; and a capillary tube linking the vapor chamber and the condensation chamber. Each battery cell contacts a portion of the wicking material, and the working fluid changes phase within the vapor chamber in order to carry heat away from the battery cells.

The wicking material may be configured as a set of posts disposed between the battery cells. The cold plate may be disposed between the vapor chamber and the condensation chamber. The cold plate may be configured with a plurality of apertures therethrough to link the vapor chamber and the condensation chamber. A first portion of the plurality of apertures may be occupied by the wicking material, and a second portion of the plurality of apertures may not be occupied by the wicking material. A portion of the wicking material may comprise a post, and the post passes through an aperture and fully traverses the condensation chamber. A portion of the wicking material may comprise a post, and the post partially occupies one of the plurality of apertures. The capillary tube may be configured with a plurality of intake ends leading to a common portion of the capillary tube. The capillary tube may have an intake end on a first side of the vapor chamber and a return end on an opposing side of the vapor chamber. The capillary tube may be configured with an inner diameter of between 1 mm and 12 mm. Evaporation of the working fluid from the wicking material may cause vapor to flow into the capillary tube. The wicking material may be configured as an array of posts, and the array of posts vary in height from one another. The array of posts may vary in height in a stepwise manner as viewed along a length of the array of posts.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C"

is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A thermal management system, comprising:
a vapor chamber comprising a housing, a wicking material, and a working fluid;
a battery pack comprising a plurality of battery cells, each of the plurality of battery cells disposed at least partially within the vapor chamber; and
a capillary tube having an intake end at a first height within the vapor chamber and a return end at a second, lower height within the vapor chamber, wherein the working fluid condenses from vapor to liquid form within the capillary tube,
wherein each battery cell contacts a portion of the wicking material, and
wherein the working fluid changes phase within the vapor chamber in order to carry heat away from the battery cells.

2. The system of claim 1, further comprising a heat pump coupled to the vapor chamber via a cold plate.

3. The system of claim 1, wherein the wicking material comprises a post disposed at least partially between the battery cells.

4. The system of claim 3, wherein the post is configured with an inner aperture to allow vapor passage therethrough.

5. The system of claim 3, wherein the post extends from a first side of the vapor chamber to a second, opposite side of the vapor chamber.

6. The system of claim 3, wherein the battery cells in the battery pack touch one another, and wherein the wicking material comprises a set of posts disposed in the spaces between the battery cells.

7. The system of claim 1, wherein the wicking material is configured with at least one of a honeycomb pattern, a serial weave pattern, or a parallel weave pattern.

8. The system of claim 1, wherein the wicking material contacts less than 90% of the surface area of a battery cell that is disposed within the vapor chamber.

9. The system of claim 1, wherein the wicking material extends along less than 90% of the length of a battery cell that is disposed within the vapor chamber.

10. The system of claim 1, wherein the wicking material extends partially along the length of a battery cell that is disposed within the vapor chamber, and wherein the wicking material tapers as it extends along the length of the battery cell.

11. The system of claim 1, wherein a first set of battery cells in the plurality of battery cells is partially contained in the vapor chamber by a first percentage, and wherein a second set of battery cells in the plurality of battery cells is partially contained in the vapor chamber by a second percentage that is higher than the first percentage.

12. The system of claim 1, wherein the thermal management system is operative to provide a level of thermal transfer to each battery cell that is at least 500 watts per meter-Kelvin (W/mK) and up to 2000 W/mK.

13. The system of claim 1, wherein the wicking material is injection moldable, hydrophilic, and stretchable.

14. The system of claim 2, wherein the thermal management system is operative without regard to the orientation of the thermal management system with respect to gravity.

15. The system of claim 1, wherein the battery cells are cylindrical, wherein the wicking material comprises a first wicking portion and a second wicking portion, wherein the first wicking portion is configured to transport the working fluid in a direction generally perpendicular to the cylindrical axes of the battery cells, and wherein the second wicking portion is configured to facilitate vaporization of the working fluid.

16. The system of claim 1, wherein evaporation of the working fluid from the wicking material provides a force to cause working fluid to exit the capillary tube at the return end.

17. The system of claim 2, further comprising:
a condensation chamber coupled to the cold plate;
a capillary tube having an intake end at a first location within the vapor chamber and a return end at a second, different location within the vapor chamber, wherein the capillary tube passes at least partially through the condensation chamber.

* * * * *